(12) United States Patent
Devaraj et al.

(10) Patent No.: US 10,425,781 B1
(45) Date of Patent: *Sep. 24, 2019

(54) OUTPUTTING NOTIFICATIONS USING DEVICE GROUPS

(71) Applicant: Amazon Technologies, Inc., Seattle, WA (US)

(72) Inventors: Christo Frank Devaraj, Seattle, WA (US); Vikram Kumar Gundeti, Bellevue, WA (US); James Marvin Freeman, II, Seattle, WA (US); Benjamin Jones, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/902,788

(22) Filed: Feb. 22, 2018

(51) Int. Cl.
*H04W 4/12* (2009.01)
*H04W 4/08* (2009.01)
(Continued)

(52) U.S. Cl.
CPC .............. *H04W 4/12* (2013.01); *H04W 4/025* (2013.01); *H04W 4/08* (2013.01); *H04W 8/02* (2013.01); *H04W 8/18* (2013.01); *H04W 8/22* (2013.01)

(58) Field of Classification Search
CPC ......... G10L 15/32; G10L 15/22; G10L 17/04; G10L 2015/223; G10L 2015/088; G10L 25/51; G10L 25/60; G10L 2021/02161; G10L 2025/783; G10L 15/08; H04L 12/2803; H04L 2012/2849; H04L 12/2807; H04L 67/22; H04L 67/303; H04W 4/12; H04W 4/08; H04W 4/025; H04W 8/02;
(Continued)

(56) References Cited

U.S. PATENT DOCUMENTS

2017/0083285 A1* 3/2017 Meyers ................ G10L 15/063
2018/0061419 A1* 3/2018 Melendo Casado .... G10L 15/22
(Continued)

OTHER PUBLICATIONS

The Examiner's attention is hereby drawn to the specification and file history of co-pending U.S. Appl. No. 15/902,762, entitled "Outputting Notifications Using Device Groups", filed Feb. 22, 2018, which may contain information relevant to the present application.

(Continued)

*Primary Examiner* — Quoc Thai N Vu
(74) *Attorney, Agent, or Firm* — Pierce Atwood LLP

(57) ABSTRACT

A system that determines that devices are co-located in an acoustic region and selects a single device to which to send incoming notifications for the acoustic region. The system may group devices into separate acoustic regions based on selection data that selects between similar audio data received from multiple devices. The system may select the best device for each acoustic region based on a frequency that the device was selected previously, input/output capabilities of the device, a proximity to a user, or the like. The system may send a notification to a single device in each of the acoustic regions so that a user receives a single notification instead of multiple unsynchronized notifications. The system may also determine that acoustic regions are associated with different locations and select acoustic regions to which to send a notification based on location.

22 Claims, 25 Drawing Sheets

(51) Int. Cl.
  *H04W 4/02* (2018.01)
  *H04W 8/22* (2009.01)
  *H04W 8/02* (2009.01)
  *H04W 8/18* (2009.01)
(58) Field of Classification Search
  CPC .. H04W 8/18; H04W 8/22; G06T 7/80; G06F 3/167; H04M 2250/74
  See application file for complete search history.

(56) References Cited

U.S. PATENT DOCUMENTS

2018/0122378 A1    3/2018  Mixter
2018/0108351 A1*   4/2018  Beckhardt ............... G06F 3/167

OTHER PUBLICATIONS

The Examiner's attention is hereby drawn to the specification and file history of co-pending U.S. Appl. No. 15/902,850, entitled "Outputting Notifications Using Device Groups", filed Feb. 22, 2018, which may contain information relevant to the present application.

* cited by examiner

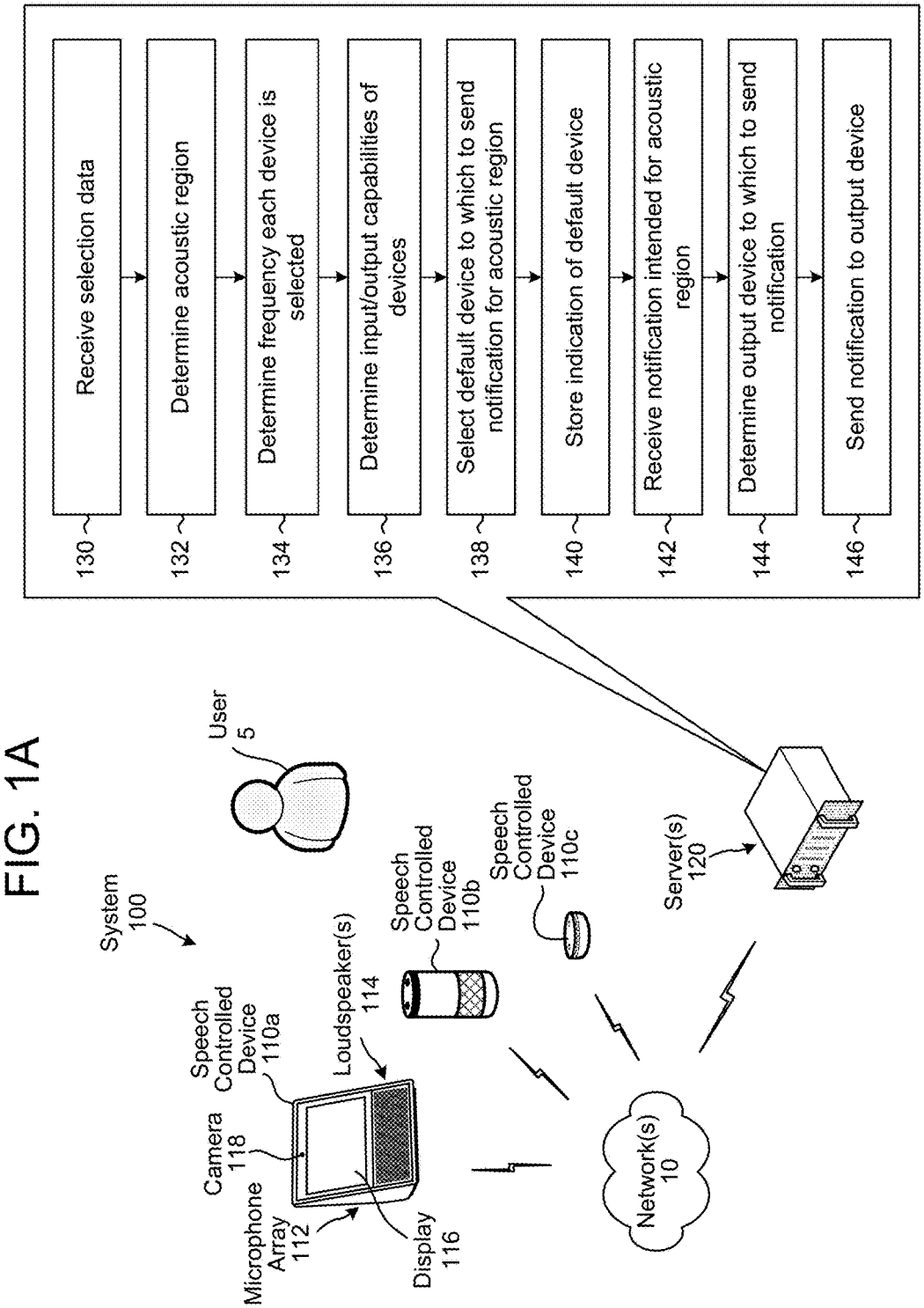

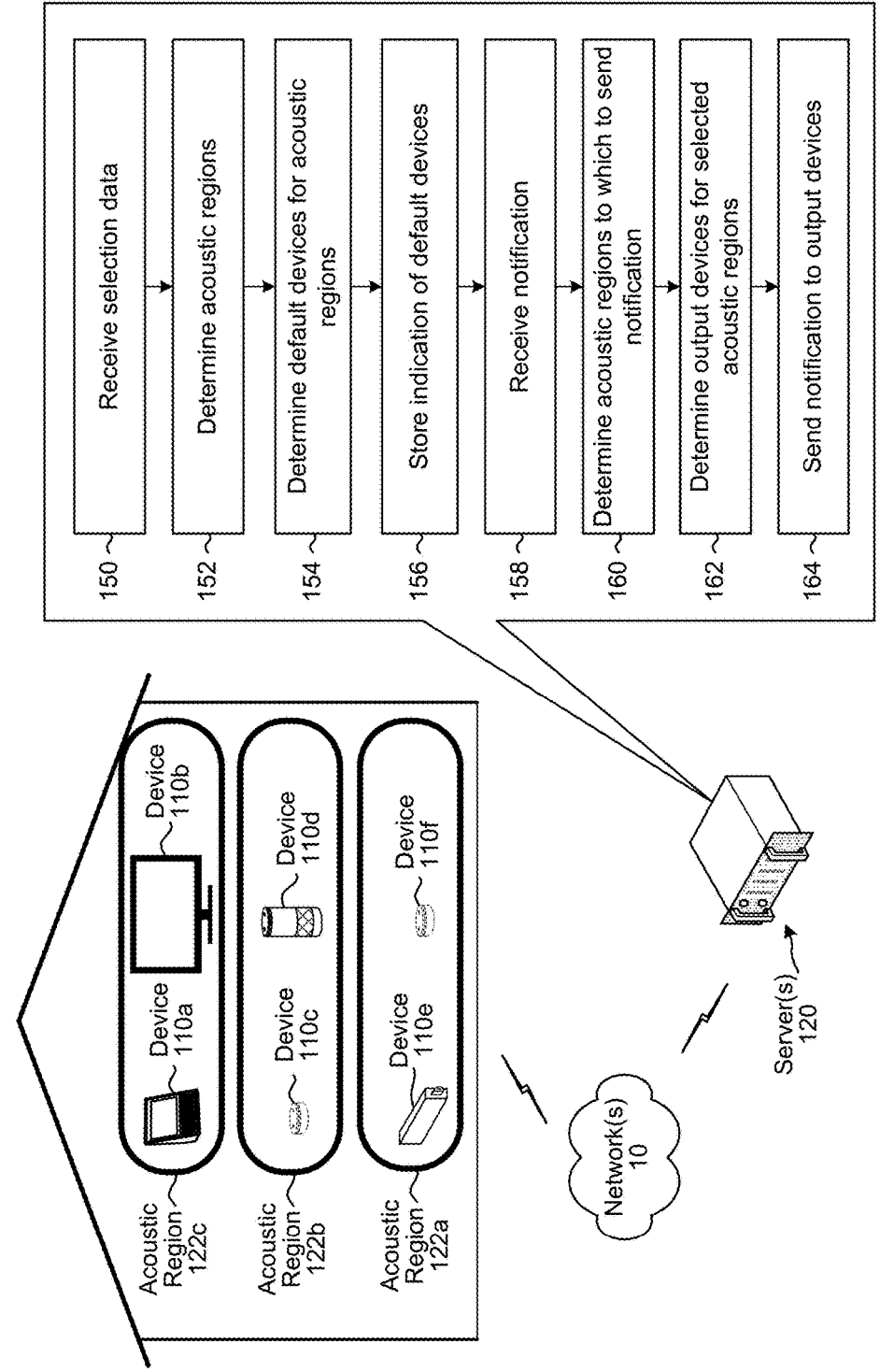

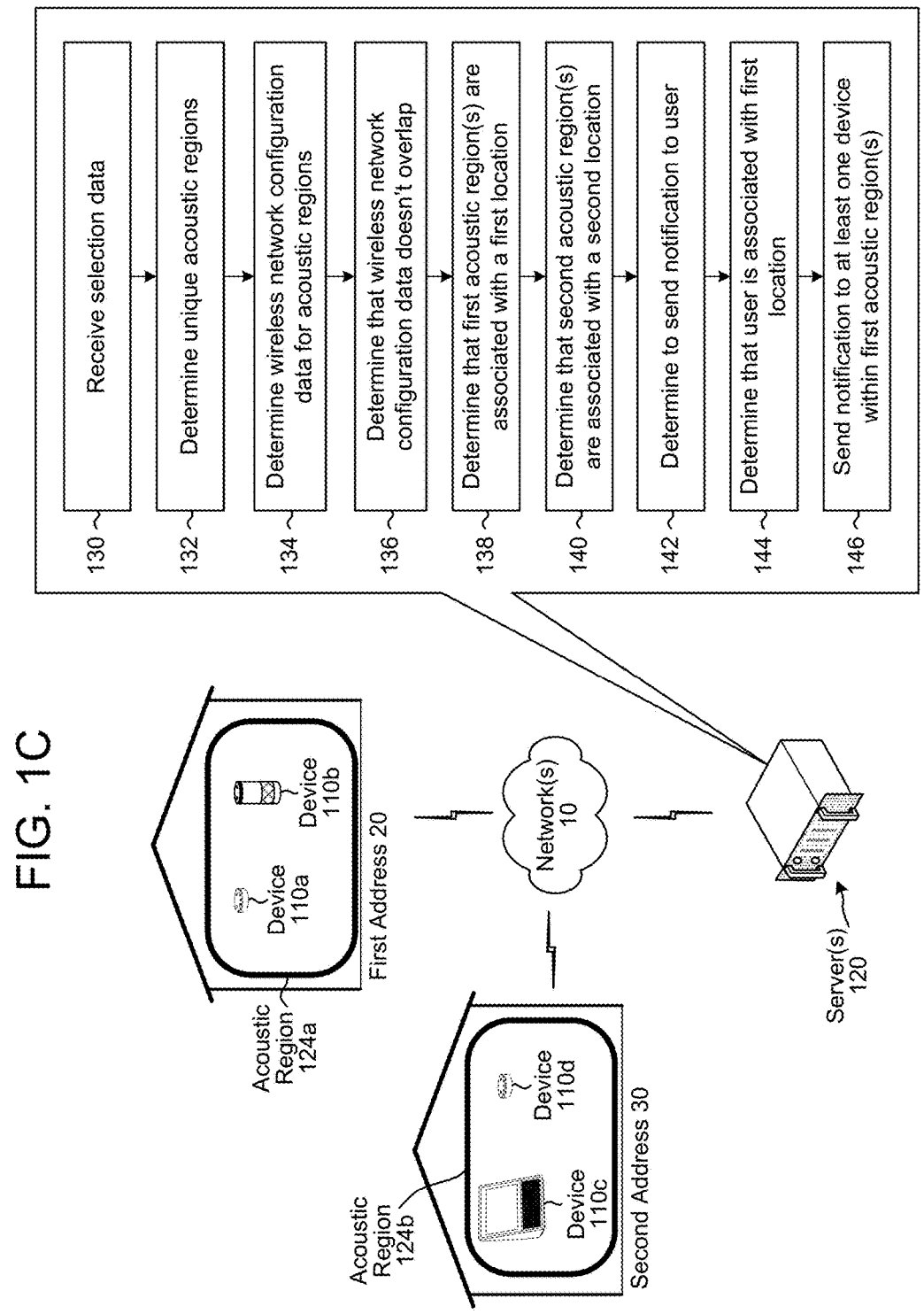

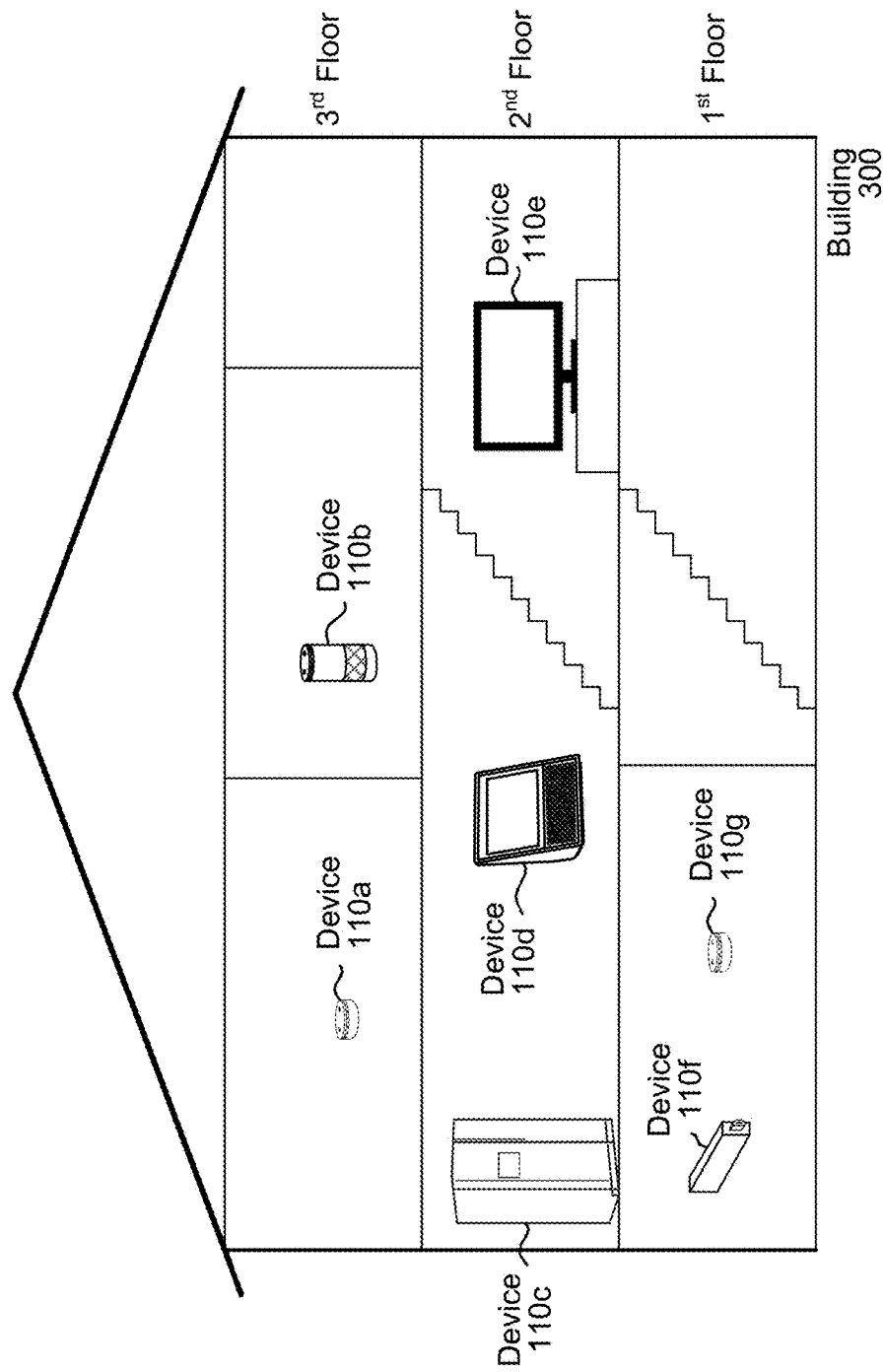

FIG. 3B

| Candidates | Arbitration Outcome |
|---|---|
| A, B | A: 75%  B: 25% |
| C, D | C: 20%  D: 80% |
| D, E | D: 70%  E: 30% |
| C,D,E | C: 10%  D: 70%  E: 20% |
| F,G | F: 25%  G: 75% |

Selection Data
310

| Acoustic Region | Devices | Default Device |
|---|---|---|
| 1 | A, B | A |
| 2 | C,D,E | D |
| 3 | F,G | G |

Acoustic Region Data
320

FIG. 3C

| Device | Speakers | Display | Camera |
|--------|----------|---------|--------|
| A | Basic | No | No |
| B | Premium | No | No |
| C | Basic | Yes | No |
| D | Premium | Yes | Yes |
| E | Basic | Yes | No |
| F | Passes | Passes | No |
| G | Basic | No | No |

Output Capability Data
330

| Acoustic Region | Devices | Default Device | Reason |
|-----------------|---------|----------------|--------|
| 1 | A, B | B | Override Location due to Premium Speakers |
| 2 | C, D, E | D | Location, Premium Speakers, Display |
| 3 | F, G | G | Location, Independent |

Acoustic Region Data
340

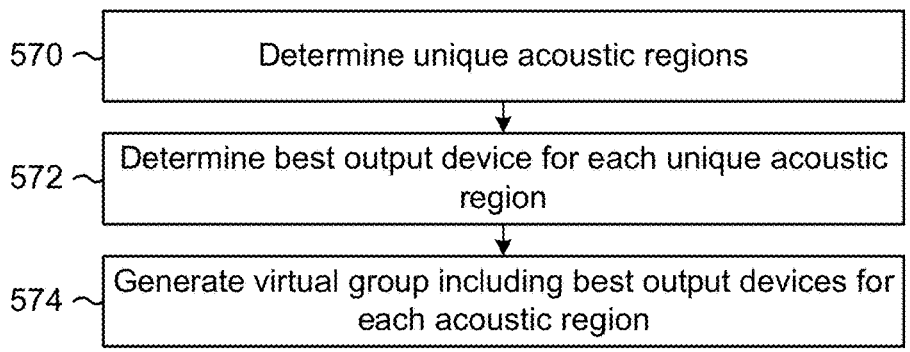
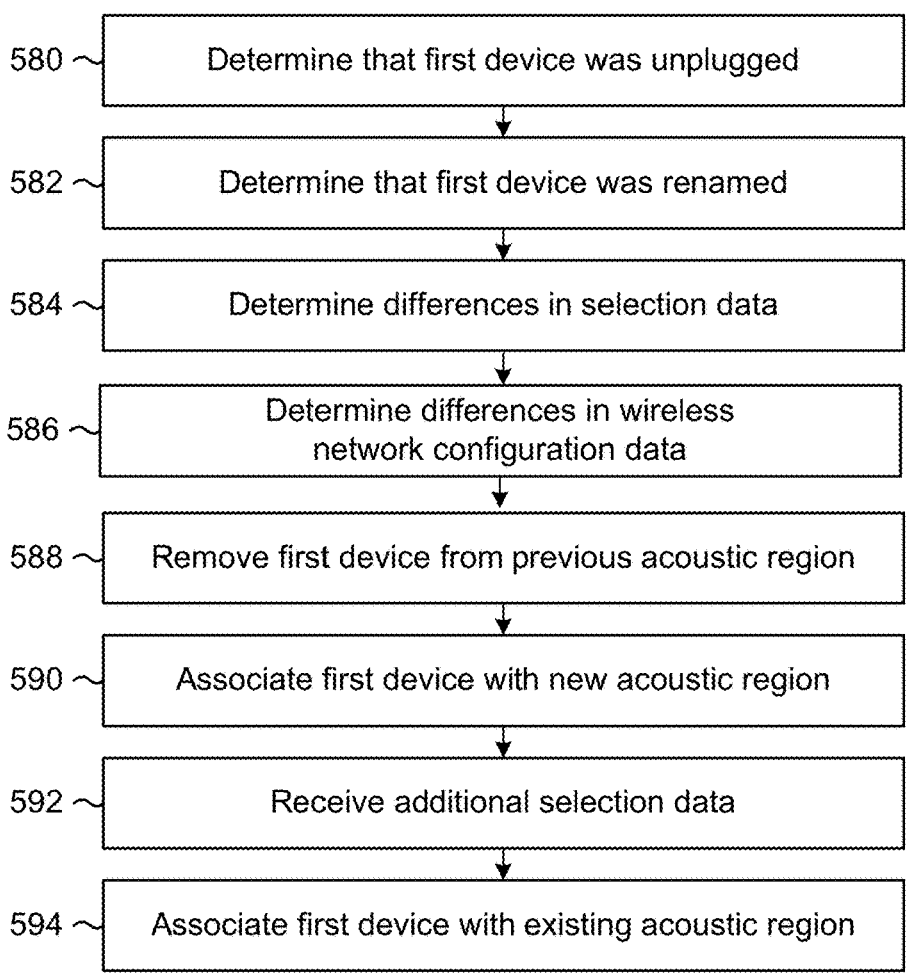

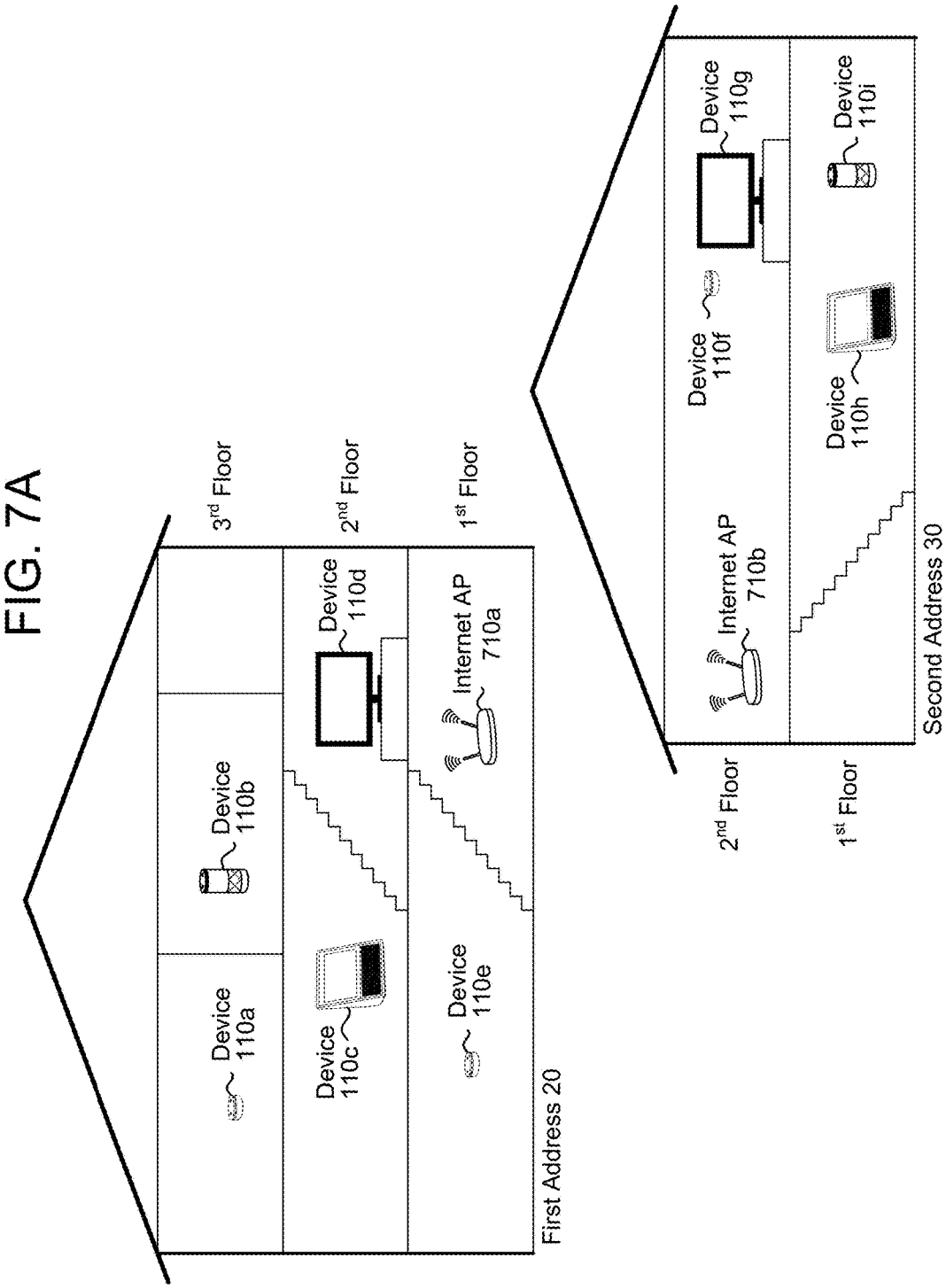

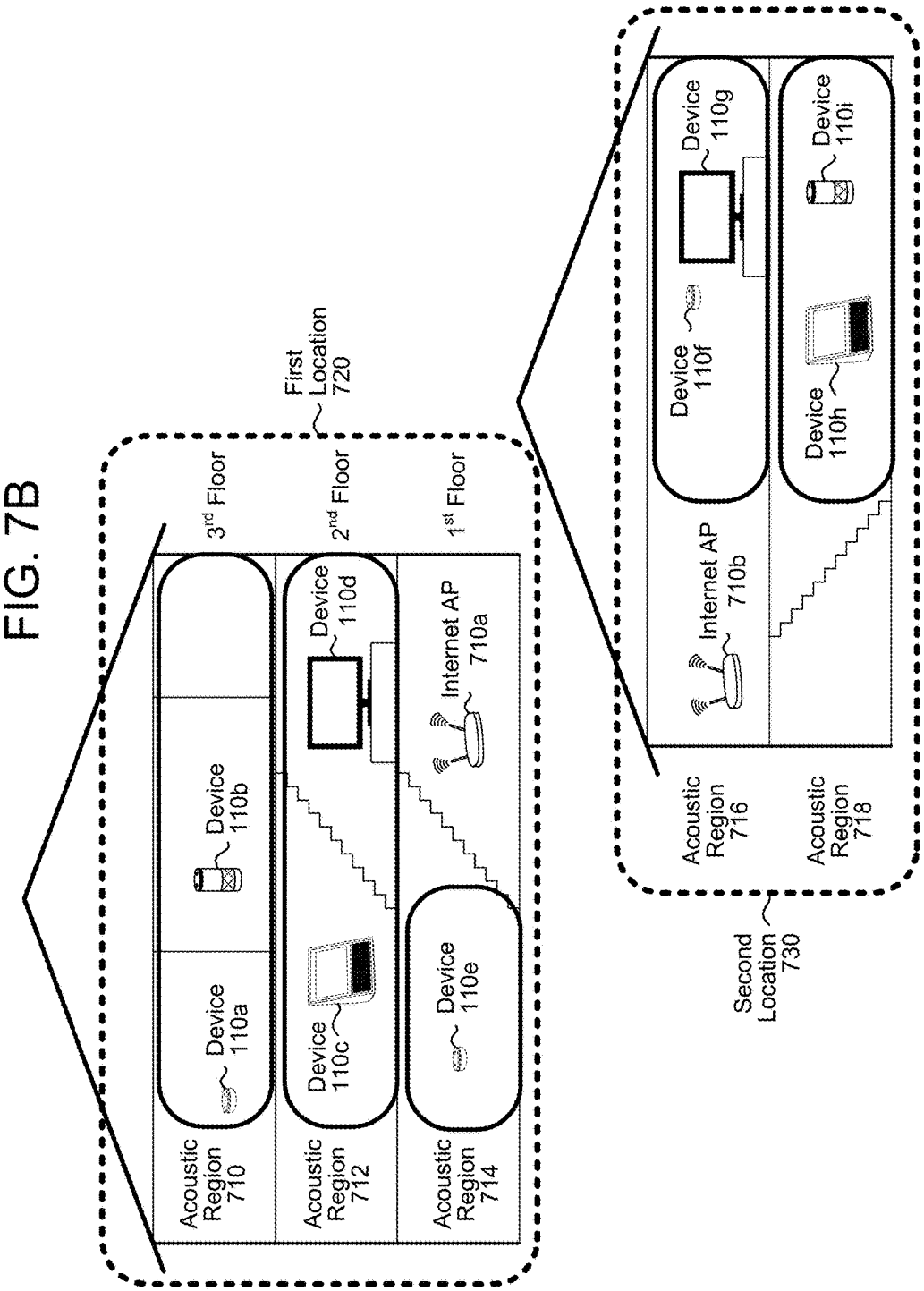

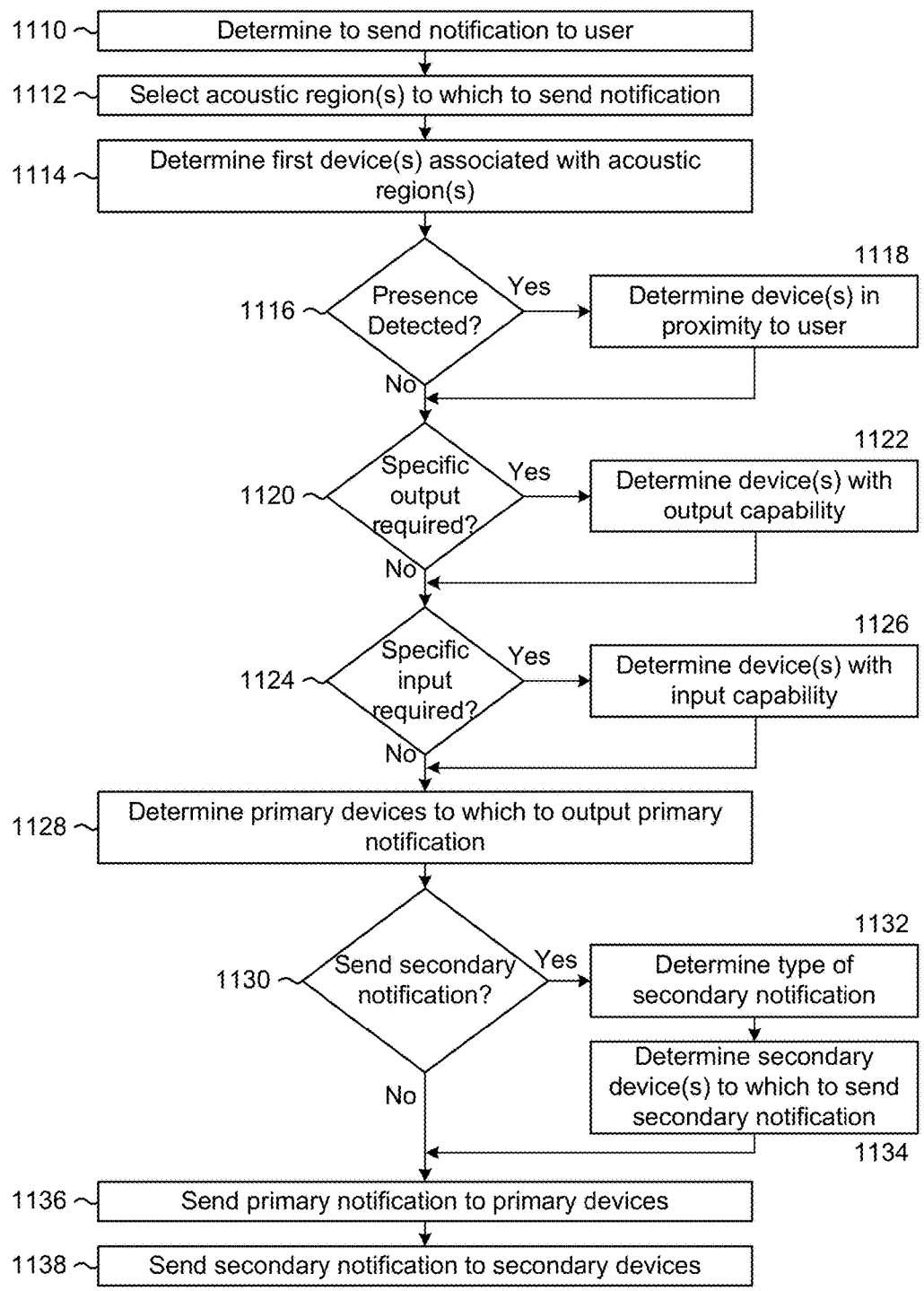

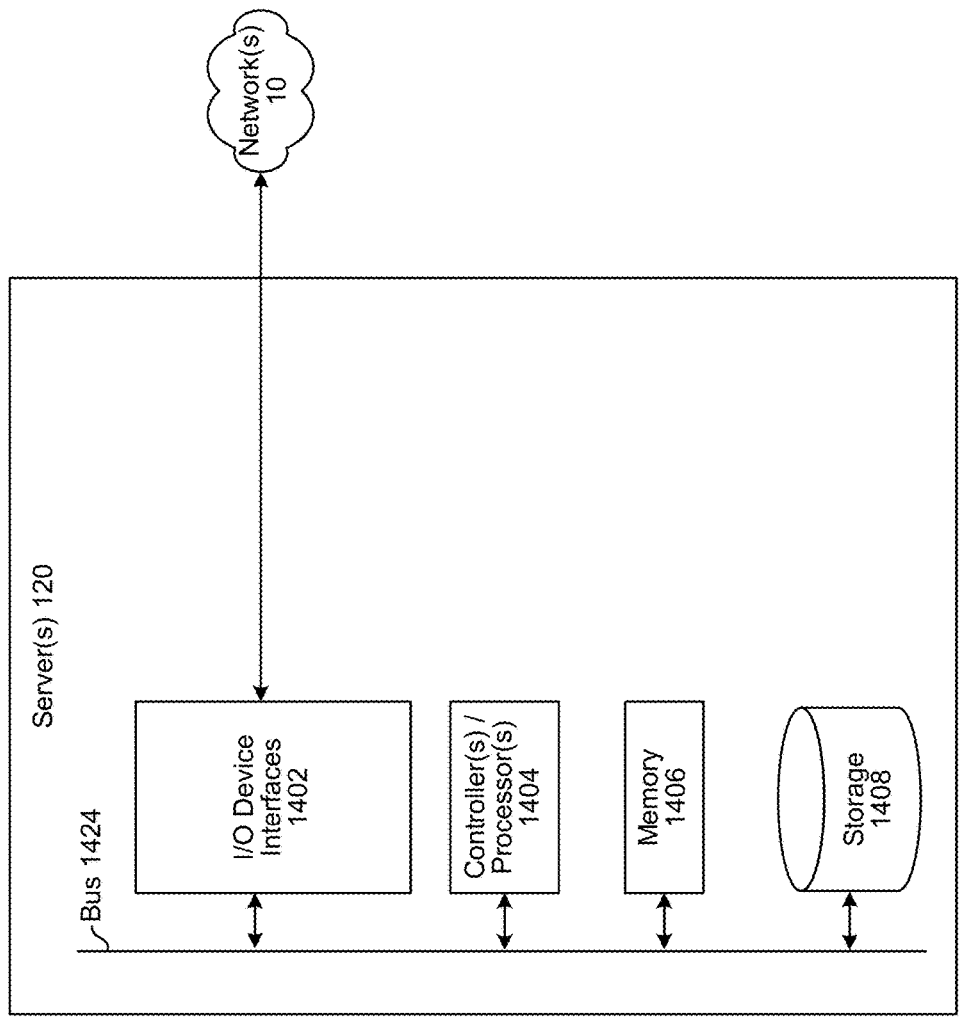

OUTPUTTING NOTIFICATIONS USING DEVICE GROUPS

BACKGROUND

With the advancement of technology, the use and popularity of electronic devices has increased considerably. Electronic devices are commonly used to capture and process audio data. Devices are also used to notify the user when there is an incoming communication or other message. Described herein are technological improvements to such systems, among other things.

BRIEF DESCRIPTION OF DRAWINGS

For a more complete understanding of the present disclosure, reference is now made to the following description taken in conjunction with the accompanying drawings.

FIGS. 1A-1C illustrate a system for grouping devices into acoustic regions and sending notifications to the acoustic regions according to embodiments of the present disclosure.

FIGS. 3A-3C illustrate examples of a three story building with multiple devices, determining acoustic regions based on selection data, and determining default devices for the acoustic regions according to embodiments of the present disclosure.

FIGS. 5A-5D are flowcharts conceptually illustrating example methods for determining acoustic region(s) and generating virtual group(s) according to embodiments of the present disclosure.

FIGS. 7A-7B illustrate an example of determining that acoustic regions are associated with separate locations according to embodiments of the present disclosure.

FIG. 11 is a flowchart conceptually illustrating an example method for overriding a default selection and sending a secondary notification according to embodiments of the present disclosure.

FIG. 14A-14B are block diagrams conceptually illustrating example components of a system according to embodiments of the present disclosure.

DETAILED DESCRIPTION

Figure 2A:
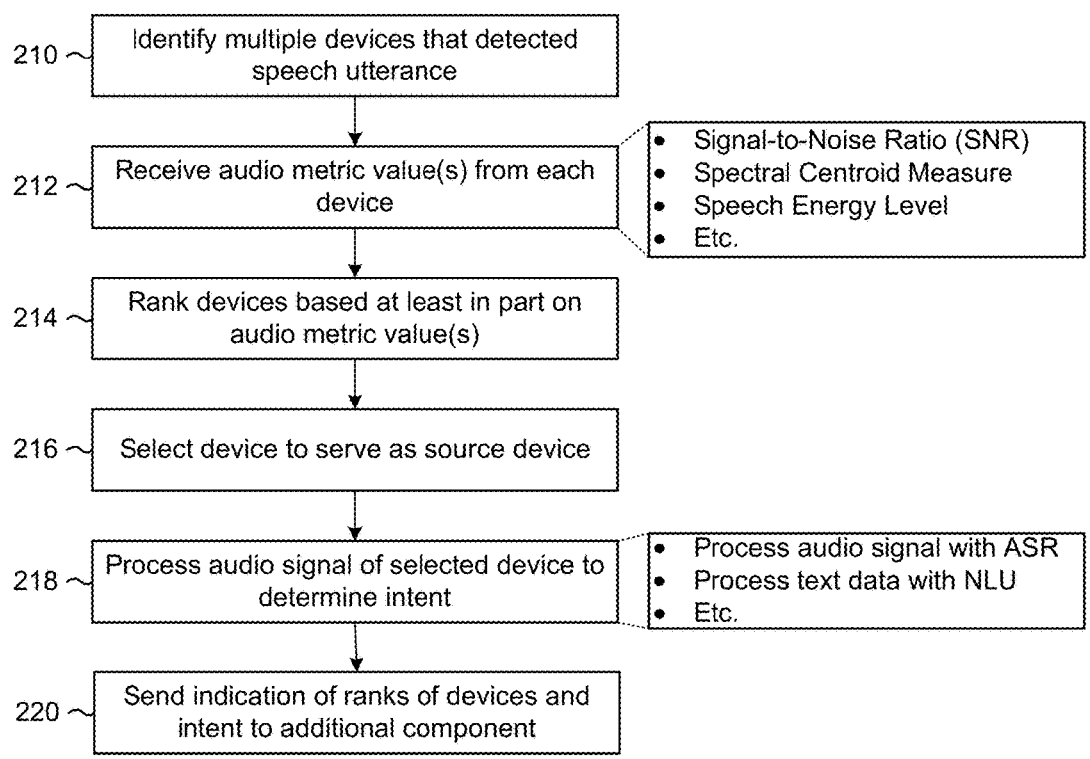
FIGS. 2A-2B are flowcharts conceptually illustrating example methods for ranking devices based on various audio signal metrics and arbitrating between multiple devices according to embodiments of the present disclosure.

Electronic devices may be used to capture audio data and generate audio. For example, an electronic device may generate audio using loudspeakers and may capture audio data using one or more microphones. If multiple electronic devices are located in proximity to each other (e.g., capable of capturing the same audio), a remote device may receive similar audio data from each of the electronic devices. The remote device may perform arbitration decisions (e.g., represented in selection data) to select a single microphone input with which to further process. If the remote device sends a notification to each of the electronic devices at the same time, due to the close proximity with each other and that the notification is output without synchronization, it may sound out of synchronization to the user.

To improve sound quality and reduce the sound of duplicate notifications, devices, systems and methods are disclosed that use selection data to associate devices with an acoustic region and select a single device to which to send the notification for the acoustic region. For example, the selection data may indicate arbitration decisions between multiple devices previously made by, for example, a speech processing system that provides a voice user interface for the devices. The selection data may include the devices among which a selection was made as well as the device that was selected. The notification system may use the selection data to identify a single device for each of the acoustic regions, enabling the system to send a notification to the acoustic region without echoing or other distortion caused by multiple notifications being output without synchronization. The system may also use wireless network configuration data, location data, or the like to distinguish between first devices located in a first location and second devices located in a second location.

FIG. 1A illustrates a system for grouping devices into an acoustic region and sending a notification to the acoustic region according to embodiments of the present disclosure. As illustrated in FIG. 1, a system 100 may include a plurality of devices 110, such as speech controlled device 110a, speech controlled device 110b, and speech controlled device 110c (e.g., voice-enabled devices 110). While FIG. 1A illustrates each of the devices being a speech controlled device, the disclosure is not limited thereto and the system 100 may include any smart device capable of connecting to a wireless network. As illustrated in FIG. 1A, the speech controlled device 110a may include a microphone array 112, one or more loudspeaker(s) 114 and a display 116. In contrast, speech controlled devices 110b/110c may include a microphone array 112 and one or more loudspeaker(s) 114, but do not include the display 116.

To detect user speech or other audio, each device 110 may use one or more microphones in the microphone array 112 to generate microphone audio data that captures audio in a room (e.g., an environment) in which the device 110 is located. For example, if the devices 110a/110b/110c are located within earshot of a user 5, the devices 110a/110b/110c may capture audio data representing speech generated by the user 5. As is known and as used herein, "capturing" an audio signal includes a microphone transducing audio waves (e.g., sound waves) of captured sound to an electrical signal and a codec digitizing the signal to generate the microphone audio data.

The devices 110a/110b/110c may store the microphone audio data and/or send the microphone audio data to one or more server(s) 120 via network(s) 10. For example, the devices 110a/110b/110c may be connected to a wireless router and may send the microphone audio data to the server(s) 120 via the wireless router. As the server(s) 120 received microphone audio data from each of the devices 110a/110b/110c, the server(s) 120 may select microphone audio data from a single device for additional processing. Thus, the server(s) 120 may perform an arbitration decision to select which of the devices 110*a*/110*b*/110*c* has the best microphone audio data and may use the best microphone audio data to determine a voice command or other processing.

The server(s) 120 may track a plurality of arbitration decisions between the devices 110*a*/110*b*/110*c* and generate selection data. The selection data may indicate individual arbitration decisions (e.g., which of the devices 110*a*/110*b*/110*c* were included in a particular arbitration decision and which of the devices 110*a*/110*b*/110*c* was chosen by the arbitration decision) and/or statistics associated with collective arbitration decisions (e.g., which of the devices 110*a*/110*b*/110*c* were selected between and statistics of how frequently each of the devices 110*a*/110*b*/110*c* was chosen).

To illustrate some examples, the first device 110*a* and the second device 110*b* may both generate microphone audio data at a first time, so the server(s) 120 may perform a first arbitration decision to select between the first device 110*a* and the second device 110*b* (but not the third device 110*c*, which did not generate microphone audio data), selecting the first device 110*a*. The selection data may indicate that the first arbitration decision included devices 110*a*/110*b* and that the first device 110*a* was chosen. Meanwhile, each of the devices 110*a*/110*b*/110*c* may generate microphone audio data at a second time, so the server(s) 120 may perform a second arbitration decision to select between the devices 110*a*/110*b*/110*c*, selecting the second device 110*b*. The selection data may indicate that the second arbitration decision included devices 110*a*/110*b*/110*c* and that the second device 110*b* was chosen.

After performing a number of arbitration decisions, the selection data may indicate that there were 10 arbitration decisions between the first device 110*a* and the second device 110*b*, and that the first device 110*a* was chosen 7 times (e.g., 70% of the time) compared to the second device 110*b* being chosen 3 times (e.g., 30%). The selection data may also indicate that there were 30 arbitration decisions between the devices 110*a*/110*b*/110*c*, and that the first device 110*a* was chosen 15 times (e.g., 50%), the second device 110*b* was chosen 10 times (e.g., 33%) and the third device 110*c* was chosen 5 times (e.g., 17%). While the examples above illustrate arbitration decisions involving the first device 110*a* and the second device 110*b* (e.g., A-B) or arbitration decisions involving all three of the devices 110*a*/110*b*/110*c* (e.g., A-B-C), this is intended for illustrative purposes only and the disclosure is not limited thereto. Instead, the selection data may include arbitration decisions associated with any combination of the devices (e.g., A-B, A-C, B-C, A-B-C) without departing from the disclosure. Thus, if more devices 110 are within proximity of the devices 110*a*/110*b*/110*c*, the selection data may include statistics for each of the combinations of the devices.

Typically, this selection data is used by the server(s) 120 to select the best microphone audio data (e.g., strongest signal corresponding to speech generated by the user 5) for further processing and nothing more. For example, the server(s) 120 may perform speech processing on the best microphone audio data to determine a voice command and may perform an action corresponding to the voice command and/or send an instruction/command to a device (e.g., one or more of the devices 110*a*/110*b*/110*c*, a remote device, etc.) to perform an action.

As illustrated in FIG. 1A, the server(s) 120 may use the selection data to identify that certain devices are grouped together (e.g., co-located) in an acoustic region (e.g., specific room or area of a building). For example, as the selection data includes arbitration decisions between each of the devices 110*a*/110*b*/110*c*, the server(s) 120 may group the devices 110*a*/110*b*/110*c* together as a first acoustic region. Similarly, other arbitration decisions may indicate selections between other devices, which may be grouped together as a second acoustic region. Thus, the server(s) 120 may automatically identify acoustic regions and devices 110 that correspond to the acoustic regions and store this information as acoustic region data.

In conventional systems (e.g., smart home system, multi-room audio systems, etc.), the user 5 has to send an explicit instruction/command (e.g., via a user interface, such as a web interface, an application on a smartphone, or the like) to generate a sound zone (or other grouping of devices), with the user 5 selecting individual devices to include in the sound zone. In some examples, the server(s) 120 may use information associated with the user-created sound zones to improve the acoustic region data, such as by adding/removing devices 110 to/from an acoustic region, associating additional information with an acoustic region (e.g., user preferences, geolocation, etc.), or the like.

To facilitate creating sound zones, in some examples the server(s) 120 may use the acoustic region data to suggest sound zones or "spaces" to the user 5. For example, the server(s) 120 may suggest that a first sound zone includes devices 110*a*/110*b*/110*c* and the user 5 may accept the suggestion without having to specifically select the devices 110*a*/110*b*/110*c*. Additionally or alternatively, the user 5 may use the suggestion as a starting point and may add or remove devices 110 to the first sound zone.

In some examples, the server(s) 120 may automatically generate sound zones based on the acoustic regions. For example, the server(s) 120 may identify that devices 110*a*/110*b*/110*c* are in proximity to each other based on the acoustic region data and may generate a first sound zone that includes the devices 110*a*/110*b*/110*c*. Thus, the server(s) 120 may provide additional functionality to the user 5, such as enabling the user 5 to control each of the devices 110*a*/110*b*/110*c* with a single command (e.g., receiving a voice command from the first device 110*a* but using the voice command to perform actions on each of the devices 110*a*/110*b*/110*c*), or the like.

In addition, the server(s) 120 may use the acoustic region data to provide additional features and/or improve existing features for the user 5. For example, instead of sending notification data to each of the devices 110*a*/110*b*/110*c* (e.g., multiple notifications), which may result in the devices 110*a*/110*b*/110*c* generating sounds in an unsynchronized and discordant fashion, the server(s) 120 may send notification data to only a single device (e.g., first device 110*a*) in the acoustic region (e.g., single notification). Thus, the user 5 may still hear the notification within the acoustic region, but from a single device, which may improve an audio quality and allow the user 5 to better understand the notification.

The server(s) 120 may select the single device (e.g., default device) to which to send notifications for the acoustic region using several different techniques. For example, the server(s) 120 may use the selection data to determine which device is selected most frequently during the arbitration decisions. As discussed above, a single arbitration decision corresponds to multiple devices 110 being within audible range of the user 5 when the user 5 outputs speech corresponding to a voice command. Thus, each of the multiple devices 110 generates input audio data corresponding to the speech and sends the input audio data to the server(s) 120.

The server(s) 120 may determine signal strength values associated with each of the multiple devices 110 and may select the highest signal strength value as the device to continue capturing the speech (e.g., input device). The server(s) 120 may send a first instruction/command to the selected device 110 to continue capturing the speech and a second instruction/command to the remaining devices 110 to stop capturing the speech. Thus, the arbitration decision corresponds to which of the devices 110 were within audible range of the user 5, signal strength values associated with each of the devices 110, which device 110 was selected as the input device, and/or the like. Collectively, the selection data may indicate which device 110 was selected and corresponding signal strength values associated with input audio data for multiple arbitration decisions.

For each arbitration decision, the selection data indicates which of the devices 110 are in proximity to the user 5 (e.g., within an audible range or a certain distance to each other, although the disclosure is not limited thereto) at a given time, with the selected device being in closest proximity to the user 5. Thus, the most frequently selected device may be commonly located in the user's house (e.g., in a central location, capturing audio from multiple locations), may be in proximity to a busy area (e.g., user 5 spends a lot of time in proximity to the device, so the device frequently captures audio from a single location), or the like. As the default device is closer to the user 5 than the other devices a majority of the time, the default device is the best device in the acoustic region to which to send the notification data, as the user 5 is likely to hear a notification output by the default device.

In some examples, the most frequently selected device may have an ideal location that is frequently in proximity to the user 5, but may lack the output capabilities of a nearby device (e.g., based on an existence, size and/or quality of the loudspeaker(s) 114, the display 116, or the like). For example, the third device 110c may be in an ideal location but second loudspeaker(s) 114b included in the second device 110b may be superior to third loudspeaker(s) 114c included in the third device 110c. Therefore, the server(s) 120 may select the second device 110b as the default device, despite the third device 110c being selected more frequently in the selection data, as the second device 110b may improve an audio quality of the notifications. Additionally or alternatively, the server(s) 120 may select the first device 110a as the default device, as the first device 110a includes a display 116 that is lacking from the second device 110b and the third device 110c. For example, the notifications may include image data that may be displayed on the display 116 (e.g., an image). Therefore, the server(s) 120 may select the default device based on the selection data and output capabilities of the devices 110 or just based on the output capabilities of the devices 110 without departing from the disclosure.

Additionally or alternatively, the server(s) 120 may select the default device based on input capabilities of the devices 110. In some examples, the most frequently selected device may have an ideal location that is frequently in proximity to the user 5, but may lack the input capabilities of a nearby device (e.g., based on an existence, size and/or quality of the microphone array 112, a camera 118, or the like). For example, the third device 110c may be in an ideal location but a second microphone array 112b included in the second device 110b may be superior to a third microphone array 112c included in the third device 110c. Therefore, the server(s) 120 may select the second device 110b as the default device, despite the third device 110c being selected more frequently in the selection data, as the second device 110b may improve an audio quality of incoming audio data. Additionally or alternatively, the server(s) 120 may select the first device 110a as the default device as the first device 110a includes a camera 118 that is lacking from the second device 110b and the third device 110c. Therefore, the server(s) 120 may select the default device based on the selection data, the output capabilities of the devices 110, and/or the input capabilities of the devices 110 without departing from the disclosure.

After selecting the default device, the server(s) 120 may send notifications intended for one or more devices 110 within the acoustic region to the default device and not the other devices 110 included in the acoustic region. For example, if the second device 110b is the default device, the server(s) 120 may send notifications intended for any of the devices 110a/110b/110c to the second device 110b and not to the first device 110a or the third device 110c.

As used herein, a notification may correspond to an incoming notification, announcement, message, call, call ring, query, voice prompt, or the like that is intended for the user 5 (e.g., intended for a user profile associated with the user 5). For example, the server(s) 120 may determine to send a notification to the user 5 to alert the user 5 that an action was performed (e.g., the server(s) 120 performed a voice command, sent an instruction/command to a device based on the voice command, etc.), that a message was received (e.g., email, text message, audio data, image data, etc.), information about incoming or missed calls (e.g., telephone call, video call, etc.), information about an upcoming event (e.g., calendar entries, meetings, or the like), information about current events (e.g., news, breaking stories, relevant stories, etc.), to request additional information from the user 5 (e.g., clarification question to the user 5 associated with a previous voice command), or the like. As used herein, sending a notification to the user 5 corresponds to the server(s) 120 sending notification data to one or more devices 110, wherein the notification data includes text data, audio data, image data, video data, and/or the like that may be used by the device 110 to generate the notification intended for the user 5. For example, the device 110 may generate audio including synthesized speech based on the audio data and/or may display an image based on the text data, the image data, and/or the video data. For ease of explanation, subsequent references to video data are omitted, as references to image data are intended to encompass videos as well as still images. In addition, sending the notification to the user 5 corresponds to sending the notification data to one or more devices 110 and does not require that the user 5 actually receive the notification. For example, the server(s) 120 may "send the notification to the user 5" by sending notification data to the second device 110b and the second device 110b generating the notification based on the notification data, even if the user 5 is not in proximity to the second device 110b when the notification is generated.

In some examples, the server(s) 120 may override the default device based on proximity to the user 5. For example, the third device 110c may be the default device, but the user 5 may be in proximity to the first device 110a. Therefore, the server(s) 120 may send the notification data to the first device 110a instead of the default device. As the first device 110a is in proximity to the user 5, sending the notification data to the first device 110a may increase the likelihood that the user 5 hears and understands the notification. In some examples, the server(s) 120 may use the proximity override when outputting notification data associated with an incoming telephone call, as the closer proximity between the first device 110a and the user 5 may improve an audio quality of the input audio data received by the server(s) 120 (e.g., device 110 closest to the user 5 may generate the strongest/clearest speech signal, with reduced noise compared to devices 110 that are further away).

The server(s) 120 may determine which device is in proximity to the user 5 based on presence detection (e.g., based on audio data captured by the microphone array 112, motion detected by the camera 118, sensor data generated by motion sensors, such as a Light Detection and Ranging (LIDAR) sensor, etc.), voice recognition, facial recognition (e.g., using image data captured by the camera 118), a signal strength value of input audio data (e.g., a first signal strength value associated with first input audio data from the first device 110a is higher than a second signal strength value associated with second input audio data from the third device 110c), a most recent interaction with the user 5 (e.g., the first device 110a most recently received an input from the user 5, such as a button press, input on a touchscreen display, or the like), a most recently performed action (e.g., the server(s) 120 sent an instruction/command to the first device 110a to perform an action), sensor information (e.g., footstep detector), proximity to a mobile device associated with the user 5, and/or the like. In some examples, the server(s) 120 may determine an identity of the user 5 and may use user preferences associated with the identity (e.g., user profile) in order to select the output device to which to send the notification data. However, the disclosure is not limited thereto, and the server(s) 120 may use common user preferences, account user preferences, or the like.

Additionally or alternatively, the server(s) 120 may override the default device based on input/output capabilities of the devices 110. For example, the third device 110c may be the default device, but the notification may be associated with an incoming telephone call. Therefore, the server(s) 120 may send the notification data to the second device 110b instead of the default device, as the second device 110b may have a higher quality microphone array 112 (e.g., input capability) and/or loudspeaker(s) 114 (e.g., output capability) relative to the third device 110c. Similarly, the notification may be associated with an incoming video call and the server(s) 120 may send the notification data to the first device 110a instead of the default device, as the first device 110a may have a camera 118 (e.g., input capability) and/or a display 116 (e.g., output capability) relative to the second device 110b and the third device 110c. As another example, the notification may be associated with incoming media (e.g., image data), and the server(s) 120 may send the notification data to the first device 110a instead of the default device, as the first device 110a has the display 116 (e.g., output capability). However, these examples are provided as illustrative examples and the disclosure is not limited thereto.

In some examples, the server(s) 120 may override the default device based on a secondary device that is paired with one of the devices 110. For example, the first device 110a may be paired with a secondary device (not illustrated), such as a device connected to a television to stream content to the television, and the server(s) 120 may override the default device to select the first device 110a.

In some examples, the server(s) 120 may override the default device based on which devices 110 are currently responsive (e.g., powered on, connected to the server(s) 120 via the network(s) 10, and/or responsive to communication from the server(s) 120). For example, if the default device is not responsive to communication from the server(s) 120, the server(s) 120 may select a different device to which to send the notification. As used herein, the devices that are responsive to the communication from the server(s) 120 may be considered to be "online" and the devices that are unresponsive to communication from the server(s) 120 are considered to be "offline."

Additionally or alternatively, the server(s) 120 may override the default device based on which devices 110 are current available (e.g., responsive to the server(s) 120 and currently not in use) and/or currently unavailable (e.g., responsive to the server(s) 120 and currently in use) without departing from the disclosure. For example, the server(s) 120 may determine usage information indicating which of the devices 110 are currently "active" (e.g., performing an action, generating audio, displaying content, and/or the like, indicating that a user is interacting with the device 110) or "idle" (e.g., not performing an action, generating audio, displaying content and/or the like) and may select the first devices based on the usage information. In some examples, the server(s) 120 may override the default device if the default device is currently in use or "active." For example, if the default device is displaying content on a display, the server(s) 120 may send the notification to different device that is idle. In other examples, the server(s) 120 may override the default device if the default device is currently idle to prioritize the devices 110 that are currently in use. For example, if the default device is idle and a nearby device is displaying content on the display, the server(s) 120 may send the notification to the nearby device to be output to a user viewing the content being displayed.

If a device is unresponsive and/or unavailable, the server(s) 120 may select the next best device as the device to which to send the notification data. In some examples, the default device may vary over time without departing from the disclosure. For example, the server(s) 120 may determine to send the notification to the first acoustic region and may determine the first device based on the notification data to be sent and/or additional information. Thus, the server(s) 120 may determine the default device (e.g., best device) based on the type of notification to be sent, input/output capabilities of each of the devices 110 included in the first acoustic region, which devices 110 of the first acoustic region are in proximity to a user, which devices 110 are currently available (e.g., powered on and responsive to communication from the server(s) 120 via the network(s) 10), which devices 110 are currently "active" (e.g., performing an action, generating audio, displaying content, and/or the like, indicating that a user is interacting with the device 110) or "idle" (e.g., not performing an action, generating audio, displaying content and/or the like), and/or the like without departing from the disclosure. While the example illustrated above is directed to determining the first device for the first acoustic region, the server(s) 120 may repeat the steps to determine the best device for each of the acoustic regions to which the server(s) 120 will send the notification data.

While the above example illustrates the server(s) 120 sending the notification data to the default device (e.g., the second device 110b), the disclosure is not limited thereto. Instead, the server(s) 120 may send the notification data to the first device 110a, the second device 110b, the third device 110c, each of the devices 110a/110b/110c, any combination of the devices 110a/110b/110c, the acoustic region in general, or the like, without departing from the disclosure.

In some examples, the server(s) 120 may send multiple notifications, such as sending notification data to two or more devices 110. For example, instead of explicitly overriding the default device (e.g., sending the notification data to the first device 110a instead of the third device 110c because the first device 110a is in proximity to the user 5), the server(s) 120 may send the notification data to both the first device 110a and the third device 110c. Thus, the default device (e.g., output device within the acoustic region from which the user 5 is accustomed to hearing notifications) may output the notification concurrently with the third device (e.g., device in proximity to the user 5) to ensure that the user 5 receives the notification.

In some examples, the server(s) 120 may send one or more primary notifications to one or more first devices (e.g., second device 110b) and one or more secondary notifications to one or more second devices (e.g., third device 110c, first device 110a, etc.). For example, the primary notification may include audio data and may instruct the first device(s) to output synthesized speech corresponding to the audio data in order to read an announcement to the user 5, whereas the secondary notification may include an instruction/command to perform an action (e.g., display content such as an image, display an indicator light, etc.). Thus, the server(s) 120 may send the primary notification to the second device 110b and the second device 110b may generate the synthesized speech. In addition, the server(s) 120 may send secondary notification(s) to the first device 110a and the third device 110c, and the first device 110a may display an image on the display 116 while the third device 110c displays an indicator light (e.g., lights up rings) on the outside of the third device 110c. Therefore, the user 5 may receive a visual notification that the notification (e.g., synthesized speech) is being output. Additionally or alternatively, the secondary notification(s) may include audio data to be output at a lower volume than the primary notifications. For example, the primary notification may be output at a first volume level and the secondary notification(s) may be output at a second volume level that is lower than the first volume level.

In the example described above, the devices 110a/110b/110c are fixed devices located within the acoustic region. However, the disclosure is not limited thereto, and the server(s) 120 may send notifications to mobile devices (e.g., smartphones, tablet computers, etc.) without departing from the disclosure. For example, while a mobile device (e.g., smartphone) associated with the user 5 is located within the acoustic region, the server(s) 120 may send a primary notification (e.g., an instruction/command to vibrate and/or generate an audible sound) to the mobile device and may also send secondary notification(s) (e.g., an instruction/command to generate an audible sound, display content, and/or turn on indicator light(s) or other visual indicators) to the fixed devices associated with the acoustic region. Therefore, the user 5 may receive an audio notification and/or a vibrating notification from the mobile device while also receiving visual notifications from the fixed devices.

Additionally or alternatively, the server(s) 120 may send first notification data (e.g., an instruction/command to vibrate and/or generate an audible sound) to the mobile device, second notification data (e.g., an instruction/command to generate an audible sound at a first volume level, which corresponds to a first audio notification, and/or to display content, turn on indicator light(s) or other visual indicators, and/or the like, which corresponds to a first visual notification) to second device(s) of the fixed devices, and third notification data (e.g., an instruction/command to generate an audible sound at a second volume level, which corresponds to a second audio notification, and/or to display content, turn on indicator light(s) or other visual indicators, and/or the like, which corresponds to a second visual notification) to the remaining devices of the fixed devices without departing from the disclosure.

As illustrated in FIG. 1A, the server(s) 120 may receive (130) selection data indicating one or more selections (e.g., arbitration decisions) between a particular combination of the devices 110a/110b/110c. For example, the selection data may indicate individual arbitration decisions (e.g., which of the devices 110a/110b/110c were included in a particular arbitration decision and which of the devices 110a/110b/110c was chosen by the arbitration decision) and/or statistics associated with collective arbitration decisions (e.g., which of the devices 110a/110b/110c were selected between and statistics of how frequently each of the devices 110a/110b/110c was chosen). In some examples, the selection data may correspond to devices 110 that are associated with a user profile, although the disclosure is not limited thereto.

The server(s) 120 may use the selection data to determine (132) an acoustic region that includes a number of devices 110 that are in proximity to each other. Thus, the selection data may indicate that multiple devices 110 captured speech from the user 5 at the same time, which corresponds to the multiple devices 110 being within earshot of the user 5. For example, first selection(s) between the first device 110a and the second device 110b may indicate to the server(s) 120 that the first device 110a is in proximity to the second device 110b, and second selection(s) between the second device 110b and the third device 110c may indicate to the server(s) 120 that the second device 110b is in proximity to the third device 110c. Thus, the server(s) 120 may generate a first acoustic region that includes the first device 110a, the second device 110b, and the third device 110c based on the first selection(s) and the second selection(s). Additionally or alternatively, third selection(s) between the first device 110a, the second device 110b, and the third device 110c may indicate to the server(s) 120 that the devices 110a/110b/110c are in proximity to each other and the server(s) 120 may generate the first acoustic region based on the third selection(s).

In some examples, the server(s) 120 may select all of the devices 110 included in overlapping arbitration decisions as part of an acoustic region. For example, if a first arbitration decision of the selection data includes three devices 110a-110c, the server(s) 120 may group the three devices 110a-110c in a first acoustic region. In addition, if one or more of the three devices 110a-110c are included in a second arbitration decision of the selection data, the server(s) 120 may add additional devices to the first acoustic region. For example, a second arbitration decision may involve four devices 110b-110e, including devices 110b-110c, and the server(s) 120 may add the devices 110d-110e to the first acoustic region.

However, the disclosure is not limited thereto and the server(s) 120 may not select all of the devices 110 included in an arbitration decision as part of a single acoustic region. For example, the selection data may include an indication of signal strength associated with each of the arbitration decisions, enabling the server(s) 120 to distinguish between a strong signal and a weak signal. Thus, the server(s) 120 may identify that the three devices included in the first arbitration decision are associated with a strong signal strength value and include all three devices 110a-110c in the first acoustic region, but may determine that the two additional devices 110d-110e are associated with a weak signal strength value and may not include them in the first acoustic region. Thus, despite the devices 110d-110e being included in the second arbitration decision, the server(s) 120 may not include them in the same acoustic region as devices 110a-110c.

The server(s) 120 may determine (134) a frequency that each device is selected, may determine (136) input/output capabilities associated with the devices, may select (138) a default device to which to send future notifications for the acoustic region, and may store (140) an indication of the default device for the acoustic region. For example, if the first selection(s) between the first device 110a and the second device 110b indicate that the first device 110a was selected 8 out of 10 times, the server(s) 120 may associate a first frequency (e.g., 80%) with the first device 110a and a second frequency (e.g., 20%) with the second device 110b. Similarly, if the second selection(s) between the second device 110b and the third device 110c indicate that the second device 110b was selected 7 out of 10 times, the server(s) 120 may associate a first frequency (e.g., 70%) with the second device 110b and a second frequency (e.g., 30%) with the third device 110c. Additionally or alternatively, if the third selection(s) between the devices 110a/110b/110c indicates that the first device 110a was selected 15 times, the second device 110b was selected 10 times, and the third device 110c was selected 5 times, the server(s) 120 may associate a first frequency (e.g., 50%) with the first device 110a, a second frequency (e.g., 33%) with the second device 110b, and a third frequency (e.g., 17%) with the third device 110c.

In some examples, the server(s) 120 may determine composite frequencies based on a weighted average of the first selection(s), the second selection(s), and/or the third selection(s). For example, there are 10 first selection(s), 10 second selection(s), and 30 third selection(s), for a combined 50 selection decisions. Thus, the 80:10 frequencies associated with the first selection(s) have weighted values of 16:4 (e.g., based on 10 selections out of 50 total selections), the 70:30 frequencies associated with the second selection(s) have weighted values 14:6 (e.g., ⅕ based on 10 selections out of 50 total selections), and the 50:33:17 frequencies associated with the third selection(s) have weighted values of 30:20:10 (e.g., ⅗ based on 30 selections out of 50 total selections). Thus, the server(s) 120 may associate a first composite frequency (e.g., 46% or 23 out of 50) with the first device 110a, a second composite frequency (e.g., 38% or 19 out of 50) with the second device 110b, and a third composite frequency (e.g., 16% or 8 out of 50) with the third device 110c. Based on the above-described selection data, the most frequently selected device is the first device 110a, which is selected 46% of the time. While the above example illustrates an example method for the server(s) 120 to determine composite frequencies based on a weighted average, the disclosure is not limited thereto and the server(s) 120 may use other techniques to determine composite frequencies and/or may not determine composite frequencies without departing from the disclosure.

The server(s) 120 may determine the input/output capabilities of the devices 110 included within the acoustic region based on information provided by the devices 110 and/or information previously stored by the server(s) 120. For example, the server(s) 120 may determine input/output capabilities associated with each device 110 as the device 110 registers with the server(s) 120 and may store the input/output capabilities for future use. However, the disclosure is not limited thereto and the server(s) 120 may determine the input/output capabilities using any techniques known to one of skill in the art.

The server(s) 120 may select the default device to which to send future notifications for the acoustic region based on the frequency that each device is selected, whether the device 110 is independent of other components, and/or the input/output capabilities of the devices. In the example described above, the server(s) 120 may select the first device 110a as the default device because the first device 110a is the most selected device (e.g., selected 46% of the time) and has the best input/output capabilities of the devices 110a/110b/110c (e.g., high quality microphone array 112, high quality loudspeaker(s) 114, a display 116, and a camera 118). Thus, the server(s) 120 may store an indication that the first device 110a is the default device for the acoustic region.

The server(s) 120 may receive (142) a notification intended for the acoustic region, may determine (144) an output device to which to send the notification, and may send (146) the notification to the output device. For example, the server(s) 120 may receive a notification intended for one or more of the devices 110a/110b/110c located within the acoustic region and may select a single output device to which to send the notification. The notification may be intended for specific devices 110 or may be intended for devices 110 associated with a user profile that corresponds to the user 5 without departing from the disclosure. In some examples, the server(s) 120 may select the default device (e.g., first device 110a) as the output device, as the default device is a compromise between the most frequently selected device and the device with the best input/output capabilities of the devices 110a/110b/110c. However, the disclosure is not limited thereto, and in other examples the server(s) 120 may override the default selection based on a proximity to the user 5 (e.g., select device 110 closest to a position of the user 5), based on output capabilities of the device 110 that are required by the notification (e.g., improved loudspeaker(s) 114 for audio data, included display 118 for image data, etc.), based on input capabilities of the device 110 that may be required by a subsequent action following the notification (e.g., improved microphone array 112 for capturing audio data during a telephone call or a videoconference, a camera 116 for capturing image data during a videoconference, etc.), or the like.

Using the example method illustrated in FIG. 1A, the system 100 may determine that multiple devices 110 are in proximity to each other based on selection data and may associate the multiple devices 110 with an acoustic region. Based on information about devices included in the acoustic region, the system 100 may identify a single output device within the acoustic region to which to send a notification, reducing an amount of unsynchronized notifications being output to the user 5. A default device for each acoustic region may be selected based on the selection data and/or input/output capabilities of the devices 110, although the system 100 may override the default selection for individual notifications based on a proximity to the user, input/output capabilities of the devices 110, or the like.

As illustrated in FIG. 1B, the system 100 may use the selection data to identify a plurality of acoustic regions. For example, the system 100 may repeat the same steps described above to determine that a group of devices 110 are in proximity to each other and associate the group of devices with an acoustic region for each of the plurality of acoustic regions. After identifying the plurality of acoustic regions, the system 100 may determine a default device (e.g., best output device to which to send notifications intended for the acoustic region) for each of the plurality of acoustic regions and may store an indication of the plurality of default devices. Thus, instead of sending future notifications to each device included in the plurality of acoustic regions, the system 100 may send future notifications to the plurality of default devices such that a single device outputs the notification in each acoustic region. Additionally or alternatively, for a particular notification the server(s) 120 may override the default selection and determine an output device for each acoustic region based on information associated with the notification, a proximity to the user 5, and/or the like.

FIG. 1B illustrates a simplified example of six devices 110 being located within a three story house, with two devices 110 on each floor. For example, a first device 110a and a second device 110b are located on a third story of the house, a third device 110c and a fourth device 110d are located on a second story of the house, and a fifth device 110e and a sixth device 110f are located on a first story of the house. In this simplified example, it is assumed that sound carries along each floor but not between the floors. Thus, the server(s) 120 performed arbitration decisions between devices 110 on each floor but not between devices 110 on separate floors. For example, the first device 110a and the second device 110b may both capture first audio generated on the third floor but not second audio generated on the second floor or third audio generated on the first floor, the third device 110c and the fourth device 110d may both capture the second audio but not the first audio or the third audio, and the fifth device 110e and the sixth device 110f may both capture the third audio but not the first audio or the second audio.

In this scenario, the selection data would indicate first arbitration decisions between the first device 110a and the second device 110b, second arbitration decisions between the third device 110c and the fourth device 110d, and third arbitration decisions between the fifth device 110e and the sixth device 110f. Thus, the server(s) 120 may analyze the selection data and generate three separate acoustic regions; a first acoustic region 122a for the first floor (e.g., including the fifth device 110e and the sixth device 110f), a second acoustic region 122b for the second floor (e.g., including the third device 110c and the fourth device 110d), and a third acoustic region 122c for the third floor (e.g., including the first device 110a and the second device 110b).

The server(s) 120 may use the acoustic regions 122a/122b/122c in various ways. In some examples, the server(s) 120 may use the acoustic regions 122a/122b/122c to suggest sound zones to the user 5 when the user 5 is configuring multi-room audio zones or the like. Additionally or alternatively, the server(s) 120 may use the acoustic regions 122a/122b/122c to enable functionality for the user 5, such as playing music over multiple devices within a single acoustic region in response to a user instruction (e.g., voice command), or selecting a single device 110 within each of the acoustic regions 122a/122b/122c to which to send the music in order to reduce an echo and improve an audio quality. As a first example, the user 5 may instruct the server(s) 120 to play music on the first floor and the server(s) 120 may identify that the first acoustic region 122a is associated with the first floor and may send audio data to each device included in the first acoustic region 122a (e.g., fifth device 110e and sixth device 110f). As a second example, the user 5 may instruct the server(s) 120 to play music throughout the house and the server(s) 120 may identify that the house includes three separate acoustic regions 122a/122b/122c, may select a single device 110 for each acoustic region (e.g., first device 110a, fourth device 110d, sixth device 110g), and may send audio data to the selected devices 110a/110d/110g.

In some examples, the server(s) 120 may select a default device for playback of notifications or other audio for each of the acoustic regions 122a/122b/122c, as discussed in greater detail above. For example, the server(s) 120 may select the first device 110a as the default device for the third acoustic region 122c, the fourth device 110d as the default device for the second acoustic region 122b, and the sixth device 110f as the default device for the first acoustic region 122a. Thus, when the server(s) 120 receive a notification intended for the user 5 (e.g., intended for one or more devices 110 in each of the acoustic regions 122a/122b/122c and/or intended for a user profile associated with the user 5), the server(s) 120 may send the notification data to the default devices 110a/110d/110f. As a result, the user 5 only receives the notification from a single device in each of the acoustic regions 122a/122b/122c. Additionally or alternatively, for a particular notification the server(s) 120 may override the default selection and determine an output device for each acoustic region 122a/122b/122c based on information associated with the notification, a proximity to the user 5, and/or the like.

As illustrated in FIG. 1B, the server(s) 120 may receive (150) selection data indicating one or more selections (e.g., arbitration decisions) between a particular combination of the devices 110. For example, the selection data may indicate individual arbitration decisions (e.g., which of the devices 110 were included in a particular arbitration decision and which of the devices 110 was chosen by the arbitration decision) and/or statistics associated with collective arbitration decisions (e.g., which of the devices 110 were selected between and statistics of how frequently each of the devices 110 was chosen).

The server(s) 120 may use the selection data to determine (152) acoustic regions that each include a number of devices 110 that are in proximity to each other, may determine (154) default devices for each of the acoustic regions, and may store (156) an indication of the default devices. Thus, the selection data may indicate that multiple devices 110 captured speech from the user 5 at the same time, which corresponds to the multiple devices 110 being within earshot of the user 5. For example, first selection(s) between the first device 110a and the second device 110b may indicate to the server(s) 120 that the first device 110a is in proximity to the second device 110b, second selection(s) between the third device 110c and the fourth device 110d may indicate to the server(s) 120 that the third device 110c is in proximity to the fourth device 110d, and third selection(s) between the fifth device 110e and the sixth device 110f may indicate to the server(s) 120 that the fifth device 110e is in proximity to the sixth device 110f. Thus, the server(s) 120 may generate the first acoustic region 122a, the second acoustic region 122b and the third acoustic region 122c.

In some examples, the server(s) 120 may select all of the devices 110 included in overlapping arbitration decisions as part of an acoustic region. For example, if a first arbitration decision of the selection data includes three devices 110a-110c, the server(s) 120 may group the three devices 110a-110c in a first acoustic region. In addition, if one or more of the three devices 110a-110c are included in a second arbitration decision of the selection data, the server(s) 120 may add additional devices to the first acoustic region. For example, a second arbitration decision may involve four devices 110b-110e, including devices 110b-110c, and the server(s) 120 may add the devices 110d-110e to the first acoustic region.

However, the disclosure is not limited thereto and the server(s) 120 may not select all of the devices 110 included in an arbitration decision as part of a single acoustic region. For example, the selection data may include an indication of signal strength associated with each of the arbitration decisions, enabling the server(s) 120 to distinguish between a strong signal and a weak signal. Thus, the server(s) 120 may identify that the three devices included in the first arbitration decision are associated with a strong signal strength value and include all three devices 110a-110c in the first acoustic region, but may determine that the two additional devices 110d-110e are associated with a weak signal strength value and may not include them in the first acoustic region. Thus, despite the devices 110d-110e being included in the second arbitration decision, the server(s) 120 may not include them in the same acoustic region as devices 110a-110c.

Additionally or alternatively, the server(s) 120 may use the signal strength values included in the selection data to determine context between separate acoustic regions, such as which acoustic regions are near each other or the like. For example, the server(s) 120 may determine that one or more devices included in a first acoustic region are present in arbitration decisions with one or more devices included in a second acoustic region, indicating that the first acoustic region and the second acoustic region are in proximity to each other. Based on the selection data (e.g., specifically overlap between devices 110 in arbitration decisions), the server(s) 120 may infer a topography or general layout of an environment. For example, the server(s) 120 may determine that the first acoustic region (e.g., kitchen) is in proximity to the second acoustic region (e.g., living room), that the second acoustic region is in proximity to a third acoustic region (e.g., office), that the second acoustic region is in proximity to a fourth acoustic region (e.g., a room on a different level of the building), and so on.

Using a combination of the selection data and other data input by the user (e.g., user-created groups, device names, etc.), the server(s) 120 may generate a layout of the environment. For example, based on a user-created device name (e.g., Kitchen Echo) for a first device, the server(s) 120 may infer that an acoustic region including the first device is associated with a kitchen. The server(s) 120 may use the layout to arbitrate between devices and/or as contextual information to understand a voice command. For example, if the server(s) 120 determine that the kitchen is adjacent to a living room that includes a television, the server(s) 120 may interpret a voice command (e.g., "Play a movie on the TV") that is received in the kitchen as a command to control the television in the living room.

The server(s) 120 may determine the default devices for each of the acoustic regions based on a frequency that each device 110 is selected, whether the device 110 is independent of other components, and/or input/output capabilities associated with the devices 110, as discussed in greater detail above with regard to FIG. 1A. In the example illustrated in FIG. 1B, the server(s) 120 may select the sixth device 110g as the default device for the first acoustic region 122a as the sixth device 110g is independent of other components whereas the fifth device 110e is dependent on a television (e.g., the fifth device 110e can only output notifications if the television is powered on and set to the correct input). Similarly, the server(s) 120 may select the fourth device 110d as the default device for the second acoustic region 122b as the fourth device 110d has better output capabilities (e.g., better loudspeaker(s) 114) than the third device 110c. Finally, the server(s) 120 may select the first device 110a as the default device for the third acoustic region 122c as the first device 110a has better input capabilities (e.g., camera 118) and output capabilities (e.g., better loudspeaker(s) 114) than the second device 110b. Thus, the server(s) 120 may store an indication that the sixth device 110f is the default device for the first acoustic region 122a, that the fourth device 110d is the default device for the second acoustic region 122b, and that the first device 110a is the default device for the third acoustic region 122c.

The server(s) 120 may receive (158) a notification, may determine (160) acoustic regions to which to send the notification, may determine (162) output devices to which to send the notification for the selected acoustic regions, and may send (164) the notification to the output devices. For example, the server(s) 120 may receive a notification intended for one or more of the devices 110 located within the acoustic regions 122a/122b/122c (e.g., intended for one or mode devices associated with a user profile that corresponds to the user 5) and may select a single output device for each of the acoustic regions 122a/122b/122c to which to send the notification. In some examples, the server(s) 120 may select the default devices as the output devices, as the default devices are a compromise between the most frequently selected device and the device with the best input/output capabilities for each acoustic region 122a/122b/122c. However, the disclosure is not limited thereto, and in other examples the server(s) 120 may override the default selection based on a proximity to the user 5 (e.g., select a device 110 associated with input audio data having a highest signal strength value, which may indicate that the device 110 is closest to a position of the user 5), based on output capabilities of the device 110 that are required by the notification (e.g., improved loudspeaker(s) 114 for audio data, included display 118 for image data, etc.), based on input capabilities of the device 110 that may be required by a subsequent action following the notification (e.g., improved microphone array 112 for capturing audio data during a telephone call or a videoconference, a camera 116 for capturing image data during a videoconference, etc.), or the like.

In some examples, the server(s) 120 may determine that a notification originated in an acoustic region and may output the notification only to the other acoustic regions. For example, if the user 5 wants to make an announcement (e.g., "Dinner is ready!" or "We're leaving!") to multiple rooms in a house, the user 5 may input the announcement to a first device 110a in a first acoustic region (e.g., kitchen). The server(s) 120 may determine that the announcement originated in the first acoustic region and may send the announcement only to the second acoustic region and the third acoustic region. Thus, the announcement is not sent to the first acoustic region.

As illustrated in FIG. 1B, the system 100 may use the selection data to identify a plurality of acoustic regions. In some examples, the devices 110 and resulting acoustic regions associated with a user 5 and/or an account may be associated with different locations (e.g., located in different buildings having different addresses). Using the selection data and/or additional information, the server(s) 120 distinguish between devices 110 and/or acoustic regions in the different locations.

FIG. 1C illustrates a simplified example of four devices 110 being located in two different locations, with a first device 110a and a second device 110b associated with a first address 20 and a third device 110c and a fourth device 110d associated with a second address 30. As described in greater detail above, the server(s) 120 may use the selection data to determine that the first device 110a and the second device 110b are associated with a first acoustic region 124a and that the third device 110c and the fourth device 110d are associated with a second acoustic region 124b.

After determining the unique acoustic regions 124, the server(s) 120 may determine whether the acoustic regions 124 are in a single location or multiple locations based on various inputs, such as wireless network configuration data, geolocation data, or the like. For example, the server(s) 120 may determine first wireless network configuration data associated with the first acoustic region 124*a* (e.g., first plurality of wireless signal sources), determine second wireless network configuration data associated with the second acoustic region 124*b* (e.g., second plurality of wireless signal sources), and determine whether the first wireless network configuration data overlaps the second wireless network configuration data (e.g., a first wireless signal source is included in both the first wireless network configuration data and the second wireless network configuration data). If they overlap, the server(s) 120 may determine that the first acoustic region 124*a* and the second acoustic region 124*b* are located in a single location. However, in the example illustrated in FIG. 1C, the server(s) 120 would determine that the first wireless network configuration data does not overlap the second wireless network configuration data (e.g., none of the wireless signal sources included in the first wireless network configuration data are also included in the second wireless network configuration data) and therefore associate the first acoustic region 124*a* with a first location and the second acoustic region 124*b* with a second location.

As another example, the server(s) 120 may receive first location data from any of the devices 110 included in the first acoustic region 124*a*, may receive second location data from any of the devices 110 included in the second acoustic region 124*b*, and may determine that the first location data is different than the second location data. For example, the devices 110 may include sensors that determine a precise geolocation and may send the geolocation to the server(s) 120.

In some examples, the fixed devices 110 associated with the acoustic regions 124 may not be configured to determine a precise geolocation. However, the server(s) 120 may determine a precise geolocation associated with an individual acoustic region 124 using information received from a mobile device 110 (e.g., smartphone) when the mobile device 110 is in proximity to the acoustic region 124. For example, the server(s) 120 may determine that the mobile device 110 is in proximity to the first acoustic region 124*a* based on the selection data, wireless network configuration data, or using other techniques known of one of skill in the art. The server(s) 120 may receive first location data (e.g., global positioning system (GPS) coordinates) from the mobile device 110 (e.g., using an application or process running on the mobile device) and may associate the first location data with the first acoustic region 124*a*. At a second time, the server(s) 120 may determine that the mobile device 110 is in proximity to the second acoustic region 124*b*, may receive second location data from the mobile device 110, and may associate the second location data with the second acoustic region 124*b*.

In some examples, the server(s) 120 may determine the first address 20 associated with the first location and the second address 30 associated with the second location, but the disclosure is not limited thereto. Instead, the server(s) 120 may not have precise location information but may distinguish between the first acoustic region 124*a* associated with the first location and the second acoustic region 124*b* associated with the second location.

By distinguishing between the first location and the second location, the server(s) 120 may enable additional functionality, such as directing notifications to a particular location based on the user's location, a time of day, user preferences, information about the notification, or the like. For example, if the server(s) 120 receives a notification for the user 5 late at night, the server(s) 120 may send the notification to acoustic regions associated with the first location (e.g., residential house) but not to acoustic regions associated with the second location (e.g., office).

As illustrated in FIG. 1C, the server(s) 120 may receive (130) selection data and may determine (132) unique acoustic regions, as discussed in greater detail above with regard to FIGS. 1A-1B. The server(s) 120 may determine (134) wireless network configuration data for each of the acoustic regions and may determine (136) that wireless network configuration data doesn't overlap for some of the acoustic regions. Based on the wireless network configuration data, the server(s) 120 may determine (138) that first acoustic region(s) are associated with a first location and determine (140) that second acoustic region(s) are associated with a second location.

The server(s) 120 may determine (142) to send a notification to the user 5, may determine (144) that the user is associated with the first location (e.g., user 5 is at home), and may send (146) the notification to at least one device within the first acoustic region(s). For example, the server(s) 120 may determine that the user 5 is associated with the first location based on a user location (e.g., precise geolocation received from a smartphone or the like), presence detection data (e.g., first device 110*a* detects human presence), voice recognition data, facial recognition data, calendar entries (e.g., meetings, scheduled appointments, etc.), historical data (e.g., high likelihood that the user 5 is in the first location at this time of day), or the like. Thus, the server(s) 120 may distinguish between the first location and the second location without initialization by the user 5, enabling the server(s) 120 to intelligently select devices 110 to which to send notifications.

Figure 2B:
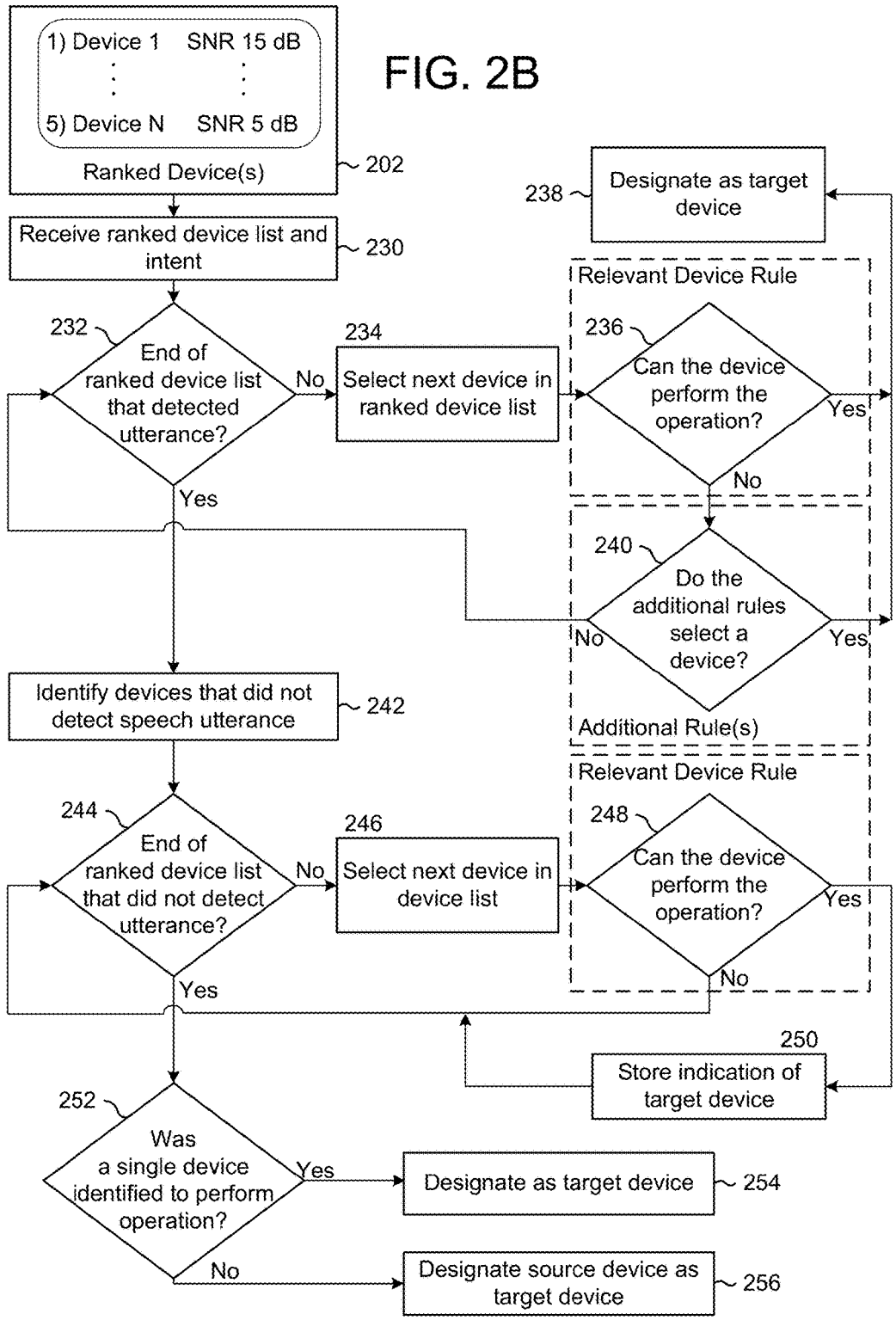

FIGS. 2A-2B are flowcharts conceptually illustrating example methods for ranking devices based on various audio signal metrics and arbitrating between multiple devices according to embodiments of the present disclosure. For example, FIG. 2A is a flowchart conceptually illustrating an example method 200 for ranking devices 110 which detected a speech utterance of a user 5 based on various audio signal metric values of audio signals captured by each device 110.

A device 110 may detect the speech utterance of the user 5 based on the utterance including a wakeword (e.g., keyword). For example, an audio capture component (e.g., microphone array 112) of the device 110 may receive or capture sound corresponding to the speech utterance of the user 5 via one or more microphones of the microphone array 112. In some examples, the speech utterance may include or be preceded by a wakeword or other trigger expression or event that is spoken by the user 5 to indicate that subsequent user speech is intended to be received and acted upon by the device(s) 110 and/or the server(s) 120. The device 110 may detect the wakeword and begin streaming audio signals to the server(s) 120. In some instances, the device 110 may operate in a low-functionality mode and analyze sound using Automatic Speech Recognition (ASR) processing. When the wakeword is detected using ASR, the device 110 may begin streaming the audio signal, and other data, to the server(s) 120.

The wakeword may be a reserved keyword that is detected locally by the device 110, although the disclosure is not limited thereto and the device 110 may stream audio data to the server(s) 120 and the server(s) 120 may be configured to detect the wakeword without departing from the disclosure. Additionally or alternatively, the server(s) 120 may be configured to perform secondary wakeword detection without departing from the disclosure. To detect the wakeword locally, the device 110 may use an expression detector that analyzes audio signals produced by the microphones of the device 110 using ASR techniques to detect the wakeword, which generally may be a predefined word, phrase, or other sound. Such an expression detector may be implemented using keyword spotting technology, as an example. A keyword spotter is a functional component or algorithm that evaluates an audio signal to detect the presence a predefined word or expression in the audio signal. Rather than producing a transcription of the words of the speech, a keyword spotter generates a true/false output to indicate whether or not the predefined word or expression was represented in the audio signal.

In certain embodiments, an expression detector of the device 110 may be configured to analyze the audio signal to produce a score indicating a likelihood that the wakeword is represented in the audio signal. The expression detector then compares the score to a threshold to determine whether the wakeword will be declared as having been spoken. For instance, the ASR techniques may involve using a Hidden Markov Model (HMM) recognizer that performs acoustic modeling of the audio signal and compares the HMM model of the audio signal to one or more reference HMM models that have been created by training for a specific trigger expression. An HMM model represents a word as a series of states. Generally, a portion of an audio signal is analyzed by comparing its HMM model to an HMM model of the trigger expression, yielding a feature score that represents the similarity of the audio signal model to the trigger expression model. In practice, an HMM recognizer may produce multiple feature scores, corresponding to different features of the HMM models. The wakeword detection may also use a support vector machine (SVM) classifier that receives the one or more feature scores produced by the HMM recognizer. The SVM classifier produces a confidence score indicating the likelihood that an audio signal contains the trigger expression.

In some examples, the device 110 may also include imaging devices which take images of the environment of the user 5. For instance, upon detecting a wakeword or other wake event, the device 110 may collect image data using the imaging devices. The imaging devices may include a camera, thermal imaging device, or any other type of imaging device to capture images of the environment. The imaging devices may generate image data, which in turn may be used as metadata for purposes of arbitration (e.g., used to determine that the user 5 is in proximity to a first device and selecting the first device for arbitration).

Following detection of a wakeword, the device 110 may send an audio signal corresponding to the speech utterance to the server(s) 120. If multiple devices 110 detect a single utterance (e.g., wakeword and subsequent voice command), the server(s) 120 may receive audio data from each of the multiple devices 110 as each of the multiple devices 110 will attempt to independently process and respond to the voice command. To prevent redundant processing by the multiple devices 110 and/or the server(s) 120, the server(s) 120 may arbitrate between the multiple devices in order to select a single device 110 that has the best audio data, is closest to the user 5, is best suited to process the voice command, or the like.

As illustrated in FIG. 2A, the server(s) 120 may identify (210) multiple devices 110 that detected the speech utterance. This may include identifying (or determining) a first device 110 and a second device 110 that received audio input at substantially a same time (within a threshold amount of time of each other) from a single utterance.

The server(s) 120 may receive (212) one or more audio signal metric values from each device 110. An audio signal metric value may be for a beamformed audio signal associated with audio input that is received at a device 110. An audio signal metric value may include a signal-to-noise ratio, a spectral centroid measure, a speech energy level (e.g., a 4 Hz modulation energy), a spectral flux, a particular percentile frequency (e.g., $90^{th}$ percentile frequency), a periodicity, a clarity, a harmonicity, a confidence level associated with a wakeword, and so on. In one example, the step 212 may include receiving an audio signal metric value that has a best value from among a plurality of audio signal metric values, where each of the plurality of audio signal metric values is associated with a different beamformed audio signal determined by a device 110. The audio signal metric value with the best value may be the audio signal with the highest (greatest) value. Alternatively, the audio signal metric value with the best value may be the audio signal with the lowest (smallest) value. In another example, step 212 may include receiving an average audio signal metric value from among a plurality of audio signal metric values for a device 110. In yet another example, step 212 may include receiving a plurality of audio signal metric values for a device 110. In some instances, an audio signal metric value may be weighted, such as by a difference between an audio signal metric value with a best value (highest value or, in some instances, lowest value) and an audio signal metric value with a worst value (lowest value or, in some instances, highest value) from among a plurality of audio signal metric values for a device 110.

The audio signal metric may be normalized across the devices 110 and may be sent as metadata with input audio data sent from the device 110 to the server(s) 120. The server(s) 120 may determine that input audio data is received from two or more devices 110 within a predetermined period of time (e.g., within half a second) of each other and may generate an arbitration decision by selecting one of the devices 110 as a source device. Thus, the device 110 selected as the source device should "listen" to the utterance and the remaining devices 110 should stop capturing and sending audio data to the server(s) 120 for the duration of the utterance.

The server(s) 120 may rank (214) the multiple devices 110 to create a ranked list of devices 202. Step 214 may be based on audio signal metric values for individual ones of the multiple devices 110. In some instances, a device 110 may be ranked multiple times for different audio signal metric values, different techniques of ranking, and so on. In some examples, other types of data other than audio metric values may be used to rank the devices. For instance, rather than detecting a wake-word, a device 110 may receive another input (e.g., a push of a button, a gesture, etc.) which may affect a ranking of the device 110 that received the input. For instance, a device 110 which received a button input may have an additional weighting factor applied to its rank to increase its rank as a button input indicates that the user 5 wants that particular device 110 to perform the action for the voice command. In various examples, other types of data may be used to rank the devices 110. For example, proximity data detected using proximity detection devices may be used and devices 110 may be ranked higher or lower based on a distance between each of the devices 110 and the user 5. Further, image data obtained by the imaging device may be used to rank the devices 110. For instance, it may be determined that image data captured by one of the devices 110 shows the face of the user 5 facing the particular device 110 (e.g., using object recognition techniques). The particular device 110 that the user 5 is facing may have its ranked increased based on the user 5 facing the particular device 110. Other types of data may be used here to rank the devices in addition, or in lieu of, the audio metric values.

The server(s) 120 may select (216) a device 110 to serve as a source device. As one example, the server(s) 120 may select a device 110 that appears at the top of the ranked list of devices 202. As another example, the server(s) 120 may select a device 110 that appears most in a top N number of places in the ranked list of devices 202, where N is an integer greater than 2.

In some examples, once the source device is selected, the other devices 110 which detected the speech utterance may be instructed to stop streaming audio data corresponding to the speech utterance. Thus, the source device may continue streaming the audio signal or audio data representing the speech utterance to the speech processing system 110 as a conversation or other sound is detected in the environment. However, once a source device is identified, the other devices 110 which previously were streaming audio signals corresponding to the sound may be "turned off" or instructed to stop sending the audio data. In this way, the source device may send additional or more audio data than the other devices 110 which detected the speech utterance. The audio data or signals sent from the other devices 110 (not the source device) may have sent audio signals that represent a portion of the sound in the environment 102, but less than all of the sound captured in the audio signal of the source device. In some examples, the source device may stream audio signals which are easier to use or more effective to use when performing automatic speech recognition (ASR) and/or natural language understanding (NLU).

The server(s) 120 may process (218) an audio signal of a selected device 110. In some instances, the server(s) 120 may call or otherwise cause an ASR component and/or an NLU component to process the audio signal to determine an intent expressed in the speech utterance represented by the audio signal.

The server(s) 120 may send (220) an indication of ranks of devices 110 (e.g., ranked list of devices 202) and the intent to an additional component for further processing. For example, the further processing may determine which of the devices 108 is to respond or perform an action responsive to the speech utterance.

The server(s) 120 may use the intent determined by the NLU component, device states for each of the devices 110, the ranked list of devices 202, and potentially other data to determine which one of the devices 110 is to perform a response to the speech utterance. For example, the server(s) 120 may iteratively move through the ranked list of devices 202 and determine whether one of the devices 110 is capable of performing a response to the speech utterance using various rules. For example, device 110*a* may be a top ranked device on the ranked list of devices 202, or the source device, and the server(s) 120 may analyze the intent expressed in the speech utterance, as well as the device state of the device 110*a*, to determine whether the device 110*a* is capable of responding to the command in the speech utterance. For example, if the speech utterance is to "please stop," the intent may map to devices states which are capable of "stopping" their device state, such as device states of steaming audio, conducting a phone call, outputting an alarm sound, etc. Using the first rule, if the intent of the speech utterance maps to the device state of the source device, or is "relevant" to the device state of the source device, the server(s) 120 may determine that the source device is capable of performing the response to the command and select the source device as the device that is to respond to the command in the speech utterance ("target device").

If the intent expressed in the speech utterance does not map to the device state of the device 110*a*, the server(s) 120 may proceed to the next rule and determine if the device 110*a* is part of a device cluster of devices that has a device state to which the intent maps, or otherwise corresponds. In some examples, the server(s) 120 may analyze a user registry to determine if the device 110*a* is part of a cluster of devices. If the server(s) 120 determines that the intent of the speech utterance maps to the device state of the cluster of devices, or is "relevant" to the device state of the cluster of devices, the server(s) 120 may determine that the cluster of devices can perform the response to the command and select the cluster of devices as the target device. The user registry may store indications of virtual clusters of devices for different user and/or household accounts.

Alternatively, if the server(s) 120 determines that the device 110*a* is not included in a cluster of devices, or if the cluster of devices in which the device 110*a* is included is not capable of performing the respond to the command in the speech utterance, the server(s) 120 may apply a third rule and determine whether the source device is associated with a secondary device (e.g., remote device paired to the device 110*a*) that is capable of performing the response to the command.

If the server(s) 120 determines that the device 110*a* is not associated with a secondary device, or if the secondary device with which the device 110*a* is associated is not capable of performing the command, the server(s) 120 may determine that the device 110*a* is not the target device. Upon determining that the source device is not the target device, the server(s) 120 may iteratively use the above described rules to determine whether the other devices 108(2) indicated in the ranked list 202 are the target device. The server(s) 120 may move through the ranked list 202 of devices in order to determine whether any of the devices 110 which detected the speech utterance are the target device.

In some examples, the server(s) 120 may determine that the target device is not included in the ranked list 202 of devices 110 which detected the speech utterance. In this case, the server(s) 120 may identify, via the user registry, all other devices 110 associated with the user and/or household account that did not detect the speech utterance, such as device(s) 110*n*. The server(s) 120 may then determine whether the intent expressed in the speech utterance maps to, or is otherwise associated with, any of the remaining devices 110*n*. If the intent maps to a device state of the device 110*n*, the server(s) 120 may select the device 110*n* as the target device. In one example, the server(s) 120 may determine that the device 110*n* is associated, or is controlling, a secondary device. If the intent indicates that the command in the speech utterance is a command to "change the channel," the server(s) 120 may determine that the intent maps to the device state of the secondary device, which is a television. For instance, the device indications may indicate that a current device state of the secondary device is that the television is presenting video for a channel, and that the television is capable of performing the command "change the channel." In this case, the server(s) 120 may select the device 110*n* as the target device, and provide an indication of the intent, as well as an indication that the device 110*n* is the target device, to a command processor.

FIG. 2B illustrate a flow diagram of an example method 205 for arbitrating, by a speech processing system 100, between multiple devices 110 to determine which device 110 is to respond to a speech utterance of a user 5. The order in which the operations or steps are described is not intended to be construed as a limitation, and any number of the described operations may be combined in any order and/or in parallel to implement method 205.

The server(s) 120 may receive (230) a ranked list of devices 202 and an intent. The ranked list of devices 202 may be ranked based on audio signal metric values. The intent may be determined using an ASR component and/or an NLU component. The ranked list of devices 202 may include devices 110 that detected a speech utterance.

The server(s) 120 may determine (232) whether the method 205 has analyzed all of the devices 110 that detected the speech utterance. If the server(s) 120 determines that the method 205 has not reached the end of the ranked list of devices 202, the server(s) 120 may select (234) the next device in the ranked device list 202. At the beginning of the method 205, the server(s) 120 may select the device 110(1) in the list (e.g., the top ranked device in the ranked list of devices 202, or "source device").

The server(s) 120 may determine (236), during a first iteration and using a first relevant device rule, whether the top ranked device 110(1) ("source device") in the ranked list is capable of responding to the command in the speech utterance. The server(s) 120 may analyze the intent expressed in the speech utterance, as well as the device state, to determine whether the source device is capable of responding to the command in the speech utterance. For example, if the speech utterance is to "please stop," the intent may map to devices states which are capable of "stopping" their device state, such as device states of steaming audio, conducting a phone call, outputting an alarm sound, etc.

In various examples, "mapping" between different data (e.g., intents, device states, device identifiers, etc.) may generally correspond to an association in memory or a database between two pieces of data. For instance, a mapping between a particular intent and a particular device state may indicate that the particular intent and the particular device state are indicated as being associated with each other, via any technique known in the art, in a database or other memory structure (e.g., associated in a table, associated by a pointer, etc.).

In some examples, the server(s) 120 may determine in step 236 that a device 110 is unable to, or is incapable of, responding to the command in the speech utterance. For instance, if the device 110 is in offline (e.g., idle), or in an offline state or idle state, the device 110 may be unable to change volume of audio being output. In some examples, a device 110 may be considered offline when the device 110 is not performing user requested actions (e.g., the device 110 is not outputting audio, outputting video, performing a dialog, etc.).

During step 236, if the intent of the speech utterance maps to the device state of the source device, or is "relevant" to the device state of the source device, the server(s) 120 may designate (238) the source device as a target device, and store an indication that the source device is the target device. For example, the server(s) 120 may determine that the source device is capable of performing the response to the command and select the source device as the device 110 that is to respond to the command in the speech utterance ("target device").

Alternatively, if the intent expressed in the speech utterance does not map to the device state of the source device, the server(s) 120 may proceed to one or more additional rules and determine (240) whether the additional rules select a device. In some examples, the additional rules used in step 240 may include determining if the source is device is part of a device "cluster of devices" that has a device state to which the intent maps, or otherwise corresponds. A cluster of devices may correspond to a virtual representation or indication of a group of devices which are synchronized to perform the same action in concert. For instance, the cluster of devices may include multiple devices 110 which are outputting the same audio stream in a uniform fashion such that the different audio streams, which correspond to the same audio content, being output by each of the devices is in sync with each other. The cluster of devices may be stored as a virtual representation such that all of the devices in the cluster appear to be a single device from the perspective of the server(s) 120. Accordingly, in a similar fashion to the first rule, the server(s) 120 may determine whether the cluster of devices can respond to the command in the speech utterance.

During step 240, the server(s) 120 may determine if the intent of the speech utterance maps to the device state of the cluster of devices, or is "relevant" to the device state of the cluster of devices. If the server(s) 120 determines that the cluster of devices can perform the response to the command, the server(s) 120 may select the cluster of devices as the target device in step 238.

While several examples of additional rules that could be used during step 240 to identify a device are described, any other type of rules for determining whether a device is to respond to a command based on device state data and intent data may be used.

Alternatively, if the server(s) 120 determine during step 240 that the source device is not included in a cluster of devices, or that the cluster of devices in which the source device is included is not capable of performing the response to the command in the speech utterance, the server(s) 120 may, during step 240, apply a third rule and determine whether the source device is associated with a secondary device (e.g., remote device that is paired with the source device) that is capable of performing the response to the command. As described herein, a secondary device may comprise another device that is controlled, or otherwise associated with, a device 110. For example, types of secondary devices may include, but are not limited to, televisions, lamps/lights, garage doors, door locks, thermostats, garbage disposals, etc.

During step 240, if the server(s) 120 determines at that the source device is associated with a secondary device, the server(s) 120 may determine whether the intent maps to a device state of the secondary device. If the server(s) 120 determines that the secondary device is capable of performing the response to the command, the server(s) 120 may select the source device as the target device in step 238. For example, if the source device is associated with a secondary device, such as controlling a television based on voice commands from a user 5, and the command is "next channel," the server(s) 120 may select the source device as the target device in step 238 because the secondary device with which the source device is associated is capable of performing the command in the speech utterance.

However, if the server(s) 120 determines in step 240 that the source device is not associated with a secondary device, or that a secondary device with which the source device is associated is not capable of performing the command, the server(s) 120 may determine that the source device is not the target device.

If the server(s) 120 determines that the source device is not the target device, the server(s) 120 may return to step 232 and determine whether all of the devices 110 have been analyzed. If the server(s) 120 determines that not all of the devices on the ranked list of devices 202 have been analyzed, the server(s) 120 may iteratively use the above described steps 234-240 of method 205 to determine whether the other devices 110 indicated in the ranked list 202 are the target device. The server(s) 120 may move through the ranked list of devices 202 in order to determine whether any of the devices 110 which detected the speech utterance are the target device.

If the server(s) 120 determines at step 232 that all of the devices 110 on the ranked list of devices 202 have been analyzed, the server(s) 120 may identify (242) all other devices 110 associated with the user and/or household account that did not detect the speech utterance. For instance, the server(s) 120 may analyze the user registry to identify devices in the device indications to identify devices associated with the user and/or household account that did not detect the speech utterance.

The server(s) 120 may determine (244) whether all of the other devices 110 have been analyzed to determine whether they are capable of responding to the command in the speech utterance. If not, the server(s) 120 may select (246) a next device in the device list of the other devices 110 which did not detect the speech utterance.

If the server(s) 120 determines that other devices 110 remain to be analyzed in step 244 and select the next device in step 246, the server(s) 120 may determine (248) whether the selected device can perform the operation. For example, the server(s) 120 may determine whether the intent expressed in the speech utterance maps to, or is otherwise associated with, the selected device 110. If the intent maps to a device state of the selected device 110, the server(s) 120 may store (250) an indication that the device 110 is a target device.

The server(s) 120 may then iteratively move through steps 244-250 for each of the remaining devices 110 that did not detect the speech utterance, and store indications during step 250 that a particular device 110 is a target device.

If the server(s) 120 determines at 244 that all of the other devices 110 which did not detect the speech utterance have been analyzed, the server(s) 120 may determine (252) whether a single device was identified to perform the operation. If only a single device was identified as being capable of performing the operation or command, the server(s) 120 may designate (254) this device 110 as the target device.

Alternatively, if the server(s) 120 determines that more than one device 110 has been indicated as being capable of performing the operation, the server(s) 120 may designate (256) the source device as the target device. The server(s) 120 may then generate output audio data to be sent to the source device which indicates to the user 5 that the speech processing system 100 was unable to determine how to perform the requested operation.

Thus, the techniques described herein include analyzing contextual data using various rules for to determine which device is intended and/or capable of responding to a command issued in a speech utterance of a user 5.

Once the server(s) 120 has determined the target device, the server(s) 120 may provide an indication of the target device to a command processor. The command processor may use the intent and the indication of the target device to determine a response for the processed speech utterance. For instance, the command processor may work in conjunction with one or more speechlets that are configured to determine a response for the processed query, determine locations of relevant information for servicing a request from the user 5 and/or generate and store the information if it is not already created, as well as route the identified intents to the appropriate destination command processor. The destination command processor may be determined based on the intent determined using the NLU. For example, if the NLU output includes a command to play music (play music intent), the destination command processor may be a music playing application, such as one located on the target device 110, or in a music playing appliance, configured to execute a music playing command. The command processor may then cause the determined command to be sent to the target device to cause the target device to perform the appropriate response for the command.

The command processor may include one or more domain speechlets which determine and generate a response for the voice-enabled device 110 to perform. In some examples, the command processor may route identified intents to the appropriate speechlets. For example, the speechlets may be specialized software, domains, and/or devices for responding based on various intents, such as a music domain (e.g., Amazon Music, Pandora, Spotify, etc.), a video domain (e.g., Amazon Video, HBO, Netflix, Hulu, etc.) household organization domain (e.g., calendars, reminders, timers, alarms, etc.), and other types of domains. For example, an intent may include a command to play music (play music intent), the command processor may route the intent to a music domain speechlet configured to execute a music playing command.

Once the command processor has generated a command, the command processor 140 may provide the command in a response to the voice-enabled device 110 to cause the secondary device to change the channel.

FIG. 3A illustrates an example of a three story building with multiple devices. As illustrated in FIG. 3A, a first device 110a and a second device 110b may be located on a third floor of a building 300, a third device 110c, a fourth device 110d and a fifth device 110e may be located on a second floor of the building 300, and a sixth device 110f and a seventh device 110g may be located on a first floor of the building 300. Using conventional techniques, the user 5 would need to configure the devices 110 in order to group them or enable advanced functionality. If the server(s) 120 send a notification to the user 5, the server(s) 120 would send notification data to each of the device 110, with multiple notifications being output at a time.

To detect user speech or other audio, each device 110 may use one or more microphones in the microphone array 112 to generate microphone audio data that captures audio in a room (e.g., an environment) in which the device 110 is located. For example, if the devices 110 are located within earshot of a user 5, the devices 110 may capture microphone audio data representing speech generated by the user 5. The devices 110 may store the microphone audio data and/or send the microphone audio data to one or more server(s) 120 via the network(s) 10. As the server(s) 120 received microphone audio data from multiple devices 110 at the same time, the server(s) 120 may select microphone audio data from a single device for additional processing. Thus, the server(s) 120 may perform an arbitration decision to select which of the devices 110 has the best microphone audio data and may use the best microphone audio data to determine a voice command or other processing.

The server(s) 120 may track a plurality of arbitration decisions between the devices 110 and generate selection data. The selection data may indicate individual arbitration decisions (e.g., which of the devices 110 were included in a particular arbitration decision and which of the devices 110 was chosen by the arbitration decision) and/or statistics associated with collective arbitration decisions (e.g., which of the devices 110 were selected between and statistics of how frequently each of the devices 110 was chosen). The selection data may correspond to the ranked list of devices 202, as described in greater detail above, and may include audio signal metric(s), the ranked list of devices 202, and/or additional information associated with the arbitration decisions.

FIGS. 3B-3C illustrate examples of determining acoustic regions based on selection data and determining default devices for the acoustic regions according to embodiments of the present disclosure. As illustrated in FIG. 3B, selection data 310 may include first selections between the first device 110a (e.g., "A") and the second device 110b (e.g., "B"), second selections between the third device 110c (e.g., "C") and the fourth device 110d (e.g., "D"), third selections between the fourth device and the fifth device (e.g., "E"), fourth selections between the third device 110c, the fourth device 110d and the fifth device 110e, and fifth selections between the sixth device 110f (e.g., "F") and the seventh device 110g (e.g., "G"). For example, the selection data 310 indicates that the first selections selected the first device 110a 75% of the time and the second device 110b 25% of the time, the second selections selected the third device 110c 20% of the time and the fourth device 110d 80% of the time, the third selections selected the fourth device 110d 70% of the time and the fifth device 110e 30% of the time, the fourth selections selected the third device 110c 10% of the time, the fourth device 110d 70% of the time, and the fifth device 110e 20% of the time, and the fifth selections selected the sixth device 110f 25% of the time and the seventh device 110g 75% of the time. While the selection data 310 only indicates percentages associated with the arbitration decisions, this is intended for ease of illustration and the disclosure is not limited thereto.

Based on the selection data 310, the server(s) 120 may group the devices 110 into three different acoustic regions, as illustrated in acoustic region data 320. For example, a first acoustic region may include the sixth device 110f and the seventh device 110g, a second acoustic region may include the third device 110c, the fourth device 110d, and the fifth device 110e, and a third acoustic region may include the first device 110a and the second device 110b. Based only on the selection data 310, the server(s) 120 may determine that that the seventh device 110g is the default device for the first acoustic region, that the fourth device 110d is the default device for the second acoustic region, and the first device 110a is the default device for the third acoustic region.

In some examples, the server(s) 120 may determine the default device for an acoustic region based on output capabilities of the devices 110. As illustrated in FIG. 3C, output capability chart 330 illustrates the output capabilities of each of the devices. For example, the first device 110a has basic loudspeaker(s) 114, no display 116, and no camera 118; the second device 110b has premium loudspeaker(s) 114, no display 116, and no camera 118; the third device 110c has basic loudspeaker(s) 114, a display 116, and no camera 118; the fourth device 110d has premium loudspeaker(s) 114, a display 116, and a camera 118; the fifth device 110e has basic loudspeaker(s) 114, a display 116, and no camera 118; the sixth device 110f passes audio data to external loudspeaker(s), passes image data to external display(s), and no camera 118; and the seventh device 110g has basic loudspeaker(s) 114, no display 116, and no camera 118.

Based on the output capability data 330 and/or the selection data 310, the server(s) 120 may determine acoustic region data 340. For example, the server(s) 120 may determine that that the seventh device 110g is the default device for the first acoustic region (e.g., best location based on the selection data, also because it is an independent device that doesn't require a separate component to be powered on), that the fourth device 110d is the default device for the second acoustic region (e.g., best location based on the selection data, premium loudspeaker(s) 114, and a display 116), and the second device 110b is the default device for the third acoustic region (e.g., while it doesn't have the best location based on the selection data, it has premium speakers which improve audio quality for the user 5).

The acoustic region data 340 is intended as an illustrative example and the disclosure is not limited thereto. Instead, the server(s) 120 may select the default device based on other information and/or capabilities without departing from the disclosure.

Figure 4A:
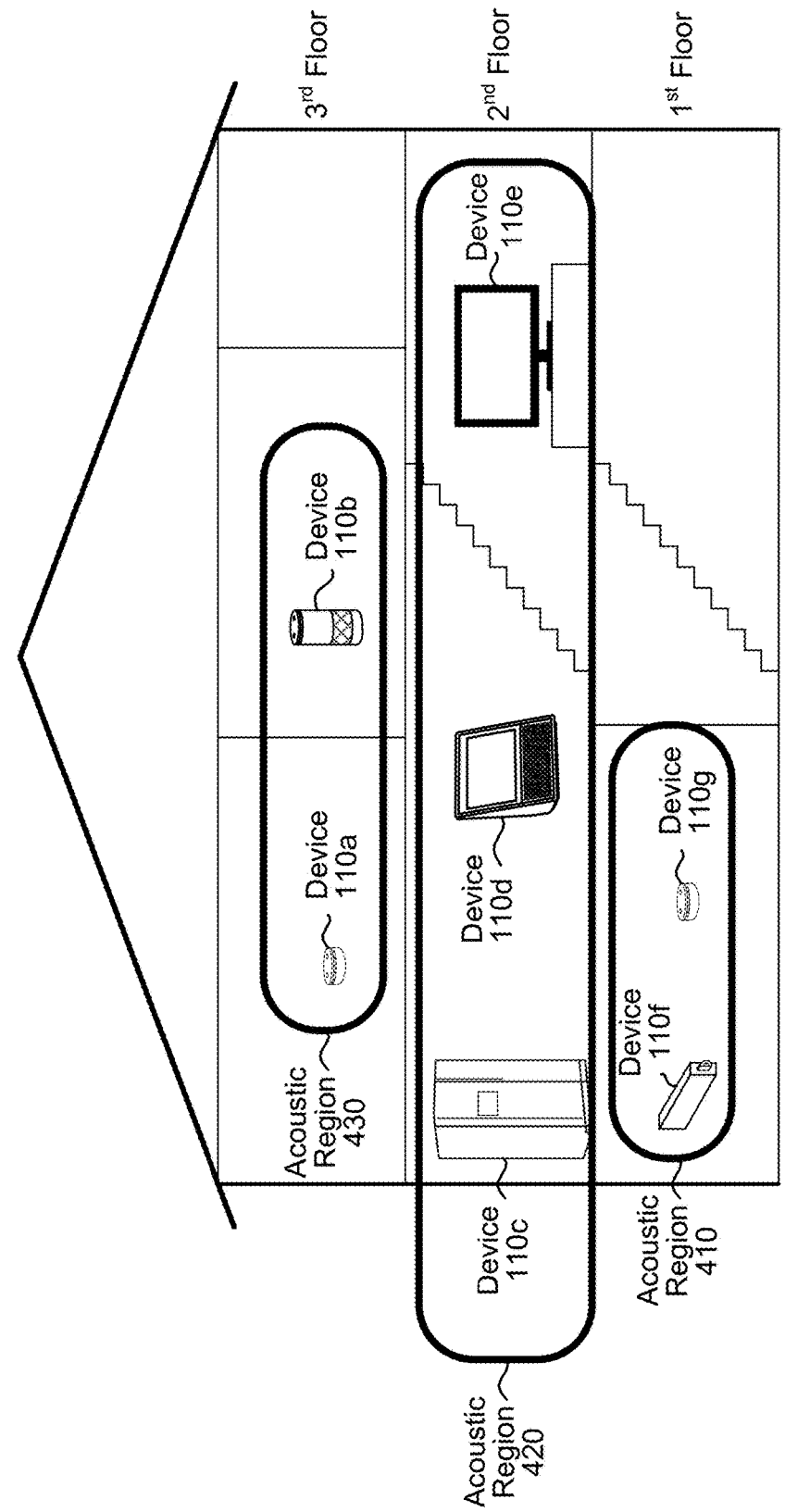
FIGS. 4A-4B illustrate examples of determining acoustic regions and generating virtual group(s) according to embodiments of the present disclosure.
Figure 4B:
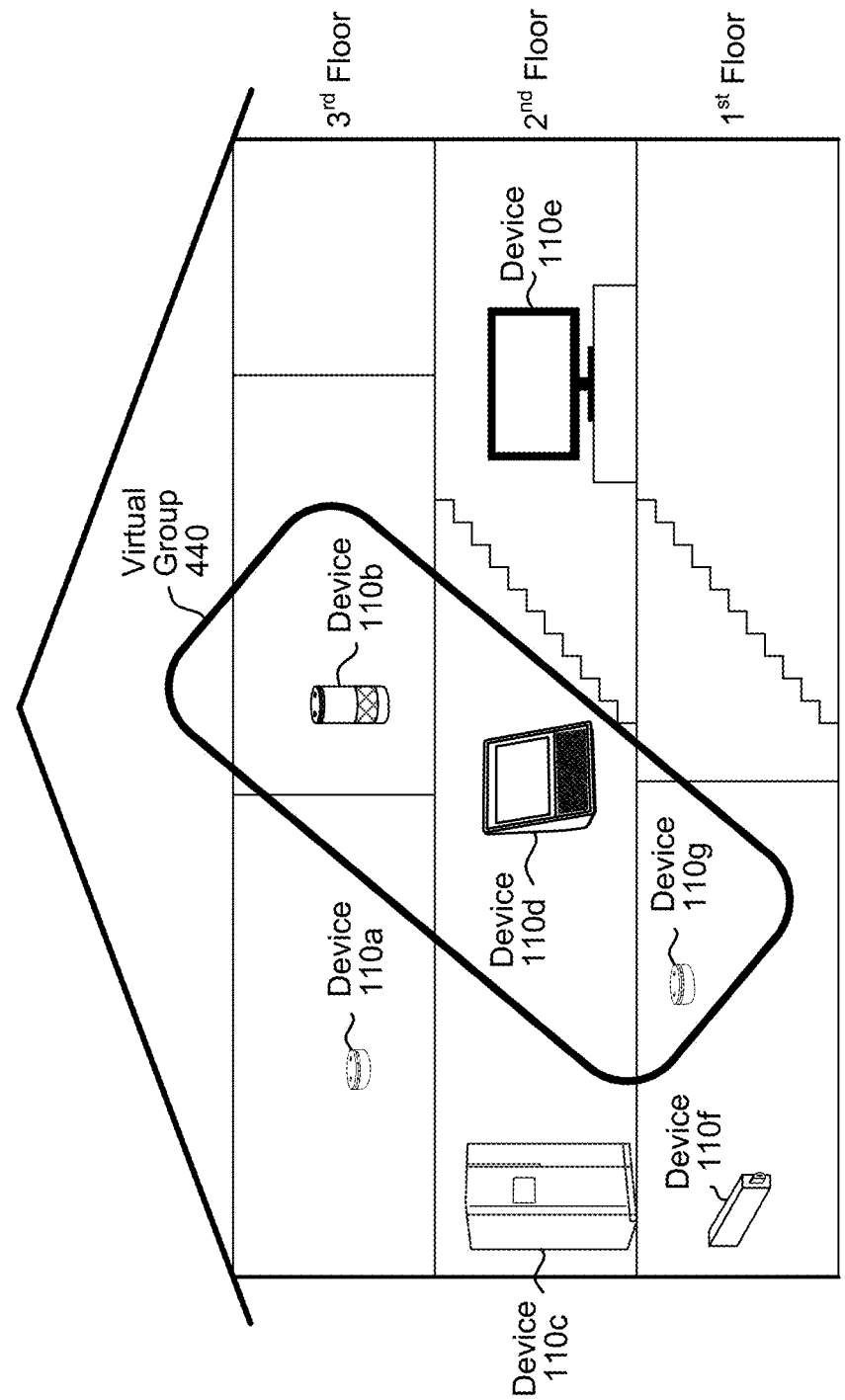

FIGS. 4A-4B illustrate examples of determining acoustic regions and generating virtual group(s) according to embodiments of the present disclosure. As illustrated in FIG. 4A, a first acoustic region 410 includes the sixth device 110f and the seventh device 110g, a second acoustic region 420 includes the third device 110c, the fourth device 110d, and the fifth device 110e, and a third acoustic region 430 includes the first device 110a and the second device 110b.

In some examples, the server(s) 120 may generate a virtual group for each of the acoustic regions 410/420/430. For example, the server(s) 120 may generate a first virtual group for the first acoustic region 410, a second virtual group for the second acoustic region 420, and a third virtual group for the third acoustic region 430. Thus, the server(s) 120 may send data to each device in the first acoustic region 410 by sending the data to the first virtual group, may send data to each device in the second acoustic region 420 by sending the data to the second virtual group, and may send data to each device in the third acoustic region 430 by sending the data to the third virtual group.

The server(s) 120 may select a single device as a "master" device or controller for each of the virtual groups. For example, the server(s) 120 may select the default device for each virtual group as the controller for that virtual group. The controller may control the devices 110 included in the virtual group (e.g., remaining devices in the acoustic region), communicate with other devices in the system 100, such as the server(s) 120, on behalf of the virtual group, and/or relay data from the server(s) 120 to the remaining devices. For example, a first controller (e.g., fourth device 110d) for the second acoustic region 420 (e.g., second virtual group) may control the remaining devices 110c/110e and may send audio data to the remaining devices 110c/110e so that the devices 110c-110e collectively generate output audio that is synchronized. Thus, if the server(s) 120 send data (e.g., notification data, audio data, and/or the like) to the first controller, the first controller may relay the data to the devices 110c/110e. As long as the controller for a virtual group is responsive to communication from the server(s) 120, the server(s) 120 may send data to the virtual group via the controller even if another device 110 within the virtual group is unresponsive to communication from the server(s) 120 (e.g., not connected to the network(s) 10, not powered on, etc.).

To generate a virtual group, the server(s) 120 may determine configuration information such as a device identification (ID) (e.g., unique identifier associated with each device 110), a physical location (e.g., upstairs bedroom, downstairs living room or the like), a network address (e.g., Internet Protocol (IP) address or the like), a type of input device, a type of output device, commands/features associated with the output device, and/or the like. The server(s) 120 may receive the configuration information directly from a device 110, indirectly from the controller (e.g., a controller may send configuration information associated with an acoustic region), via spoken input from the user 5, via a companion application having a graphical user interface (GUI), and/or the like.

As discussed in greater detail above, the server(s) 120 may also determine default devices for each of the acoustic regions 410/420/430. For example, the acoustic region data 340 indicated that the seventh device 110g was the default device for the first acoustic region 410, the fourth device 110d was the default device for the second acoustic region 420, and the second device 110b was the default device for the third acoustic region 430.

In some examples, the server(s) 120 may also generate a virtual group for the default devices. As illustrated in FIG. 4B, the server(s) 120 may generate a virtual group 440 that includes the seventh device 110g associated with the first acoustic region 410, the fourth device 110d associated with the second acoustic region 420, and the second device 110b associated with the third acoustic region 430. By sending data to the virtual group 440, the server(s) 120 may send data to a single device 110 in each of the acoustic regions 410/420/430. For example, the server(s) 120 may send notification data to the virtual group 440 in order for the system 100 to output a single notification in each of the acoustic regions 410/420/430.

The server(s) 120 may select a single device from the default devices as a "master" device or controller for the virtual group 440. For example, the server(s) 120 may select the fourth device 110d as the controller for that virtual group 440. The controller may control the remaining devices 110 included in the virtual group 440 (e.g., devices 110b/110g), communicate with other devices in the system 100, such as the server(s) 120, on behalf of the virtual group 440, and/or relay data from the server(s) 120 to the remaining devices 110b/110g. For example, a first controller (e.g., fourth device 110d) for the virtual group 440 may control the remaining devices 110b/110g and/or send audio data to the remaining devices 110b/110g so that the devices 110b/110d/110g collectively generate output audio that is synchronized. Thus, if the server(s) 120 send data (e.g., notification data, audio data, and/or the like) to the first controller, the first controller may relay the data to the devices 110b/110g.

Prior to sending data to the virtual group 440, however, the server(s) 120 may determine that each of the devices 110 included in the virtual group 440 (e.g., devices 110b/110d/110g) are online (e.g., powered on and responsive to communication from the server(s) 120 via the network(s) 10). For example, if the second device 110b is not responsive to communication from the server(s) 120 (e.g., not connected to the network(s) 10, not powered on, etc.), the third acoustic region 430 would not receive a notification sent to the virtual group 440. Therefore, the server(s) 120 may determine that determine that the second device is offline, may determine an alternative device (e.g., first device 110a) within the third acoustic region 430, and may reconfigure the virtual group 440 to include the first device 110a in place of the second device 110b. As a result, the third acoustic region 430 will receive a notification sent to the reconfigured virtual group 440.

As will be discussed below with regard to FIG. 5D, in some examples the server(s) 120 may determine that a first device 110a has potentially moved from a first acoustic region to a second acoustic region and may reconfigure the acoustic region(s)/virtual group(s) accordingly. For example, the server(s) 120 may determine that the first device 110a has potentially moved based on a number of different criteria, may remove the first device 110a from the first acoustic region, may receive additional selection data, and may associate the first device 110a with an acoustic region (e.g., either the first acoustic region or the second acoustic region) based on the additional selection data.

Figure 5A:
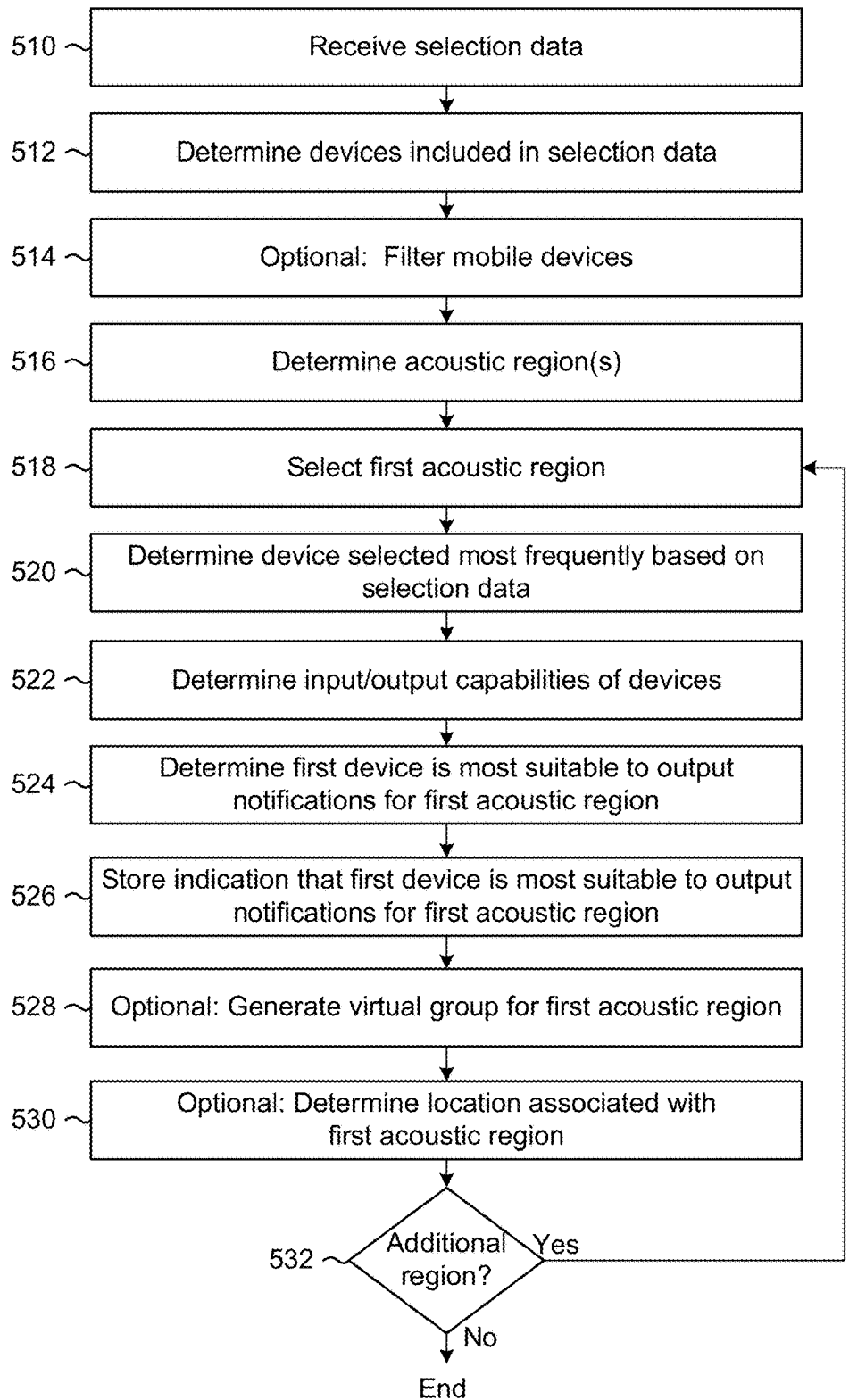

FIGS. 5A-5D are flowcharts conceptually illustrating example methods for determining acoustic region(s) and generating virtual group(s) according to embodiments of the present disclosure. As illustrated in FIG. 5A, the server(s) 120 may receive (510) selection data. As discussed above, the selection data correspond to a plurality of arbitration decisions between the devices 110. For example, the selection data may indicate individual arbitration decisions (e.g., which of the devices 110 were included in a particular arbitration decision and which of the devices 110 was chosen by the arbitration decision) and/or statistics associated with collective arbitration decisions (e.g., which of the devices 110 were selected between and statistics of how frequently each of the devices 110 was chosen). Additionally or alternatively, the selection data may include audio signal metric(s), the ranked list of devices 202, and/or additional information associated with the arbitration decisions.

An audio signal metric value may be for a beamformed audio signal associated with audio input that is received at a device 110. An audio signal metric value may include a signal-to-noise ratio (SNR), a spectral centroid measure, a speech energy level (e.g., a 4 Hz modulation energy), a spectral flux, a particular percentile frequency (e.g., 90th percentile frequency), a periodicity, a clarity, a harmonicity, a confidence level associated with a wakeword, and so on. In some examples, the server(s) 120 may receive an audio signal metric value that has a best value from among a plurality of audio signal metric values, where each of the plurality of audio signal metric values is associated with a different beamformed audio signal determined by a device 110. The audio signal metric value with the best value may be the audio signal with the highest (greatest) value. Alternatively, the audio signal metric value with the best value may be the audio signal with the lowest (smallest) value. In another example, the server(s) 120 may receive an average audio signal metric value from among a plurality of audio signal metric values for a device 110. In yet another example, the server(s) 120 may receive a plurality of audio signal metric values for a device 110. In some instances, an audio signal metric value may be weighted, such as by a difference between an audio signal metric value with a best value (highest value or, in some instances, lowest value) and an audio signal metric value with a worst value (lowest value or, in some instances, highest value) from among a plurality of audio signal metric values for a device 110.

The audio signal metric may be normalized across the devices 110 and may be sent as metadata with input audio data sent from the device 110 to the server(s) 120. The server(s) 120 may determine that input audio data is received from two or more devices 110 within a predetermined period of time (e.g., within half a second) of each other and may generate an arbitration decision by selecting one of the devices 110 as a source device. Thus, the device 110 selected as the source device should "listen" to the utterance and the remaining devices 110 should stop capturing and sending audio data to the server(s) 120 for the duration of the utterance.

As discussed above, the server(s) 120 may rank the multiple devices 110 to create a ranked list of devices 202. The server(s) 120 may rank the devices 110 based on audio signal metric values for individual ones of the multiple devices 110. In some instances, a device 110 may be ranked multiple times for different audio signal metric values, different techniques of ranking, and so on. In some examples, other types of data other than audio metric values may be used to rank the devices. For instance, rather than detecting a wake-word, a device 110 may receive another input (e.g., a push of a button, a gesture, etc.) which may affect a ranking of the device 110 that received the input. For instance, a device 110 which received a button input may have an additional weighting factor applied to its rank to increase its rank as a button input indicates that the user 5 wants that particular device 110 to perform the action for the voice command. In various examples, other types of data may be used to rank the devices 110. For example, proximity data detected using proximity detection devices may be used and devices 110 may be ranked higher or lower based on a distance between each of the devices 110 and the user 5. Further, image data obtained by the imaging device may be used to rank the devices 110. For instance, it may be determined that image data captured by one of the devices 110 shows the face of the user 5 facing the particular device 110 (e.g., using object recognition techniques). The particular device 110 that the user 5 is facing may have its ranked increased based on the user 5 facing the particular device 110. Other types of data may be used here to rank the devices in addition, or in lieu of, the audio metric values.

The selection data may indicate which device 110 was selected to serve as a source device (e.g., outcome of an arbitration decision). As one example, the server(s) 120 may select a device 110 that appears at the top of the ranked list of devices 202. As another example, the server(s) 120 may select a device 110 that appears most in a top N number of places in the ranked list of devices 202, where N is an integer greater than 2.

The server(s) 120 may determine (512) devices included in the selection data, may optionally filter (514) mobile devices from the selection data, and may determine (516) one or more acoustic region(s) by grouping the devices based on the selection data. As mobile devices are not associated with a fixed location, the mobile devices may be included in multiple arbitration decisions involving physically disparate devices. Therefore, the server(s) 120 may optionally filter the mobile devices from the selection data to avoid grouping devices 110 that are not in physical proximity to each other.

In some examples, the server(s) 120 may select all of the devices 110 included in overlapping arbitration decisions as part of an acoustic region. For example, if a first arbitration decision of the selection data includes three devices 110a-110c, the server(s) 120 may group the three devices 110a-110c in a first acoustic region. In addition, if one or more of the three devices 110a-110c are included in a second arbitration decision of the selection data, the server(s) 120 may add additional devices to the first acoustic region. For example, a second arbitration decision may involve four devices 110b-110e, including devices 110b-110c, and the server(s) 120 may add the devices 110d-110e to the first acoustic region.

However, the disclosure is not limited thereto and the server(s) 120 may not select all of the devices 110 included in an arbitration decision as part of a single acoustic region. For example, the selection data may include an indication of signal strength associated with each of the arbitration decisions, enabling the server(s) 120 to distinguish between a strong signal and a weak signal. Thus, the server(s) 120 may identify that the three devices included in the first arbitration decision are associated with a strong signal strength value and include all three devices 110a-110c in the first acoustic region, but may determine that the two additional devices 110d-110e are associated with a weak signal strength value and may not include them in the first acoustic region. Thus, despite the devices 110d-110e being included in the second arbitration decision, the server(s) 120 may not include them in the same acoustic region as devices 110a-110c.

Additionally or alternatively, the server(s) 120 may use the signal strength values included in the selection data to determine context between separate acoustic regions, such as which acoustic regions are near each other or the like. For example, the server(s) 120 may determine that one or more devices included in a first acoustic region are present in arbitration decisions with one or more devices included in a second acoustic region, indicating that the first acoustic region and the second acoustic region are in proximity to each other. Based on the selection data (e.g., specifically overlap between devices 110 in arbitration decisions), the server(s) 120 may infer a topography or general layout of an environment. For example, the server(s) 120 may determine that the first acoustic region (e.g., kitchen) is in proximity to the second acoustic region (e.g., living room), that the second acoustic region is in proximity to a third acoustic region (e.g., office), that the second acoustic region is in proximity to a fourth acoustic region (e.g., a room on a different level of the building), and so on.

Using a combination of the selection data and other data input by the user (e.g., user-created groups, device names, etc.), the server(s) 120 may generate a layout of the environment. For example, based on a user-created device name (e.g., Kitchen Echo) for a first device, the server(s) 120 may infer that an acoustic region including the first device is associated with a kitchen. The server(s) 120 may use the layout to arbitrate between devices and/or as contextual information to understand a voice command. For example, if the server(s) 120 determine that the kitchen is adjacent to a living room that includes a television, the server(s) 120 may interpret a voice command (e.g., "Play a movie on the TV") that is received in the kitchen as a command to control the television in the living room.

The server(s) 120 may select (518) a first acoustic region, may determine (520) a device selected most frequently based on the selection data, may determine (522) input/output capabilities of the devices, may determine (524) that a first device is most suitable to output notifications for the first acoustic region, and may store (526) an indication that the first device is most suitable to output notifications for the first acoustic region. The server(s) 120 may optionally generate (528) a virtual group for the first acoustic region and may optionally determine (530) a location associated with the first acoustic region.

The server(s) 120 may determine whether there is an additional acoustic region, and, if so, may loop to step 518 to repeat steps 518-532 for the additional acoustic region. If there are no additional acoustic regions, the server(s) 120 may end the process.

Figure 5B:
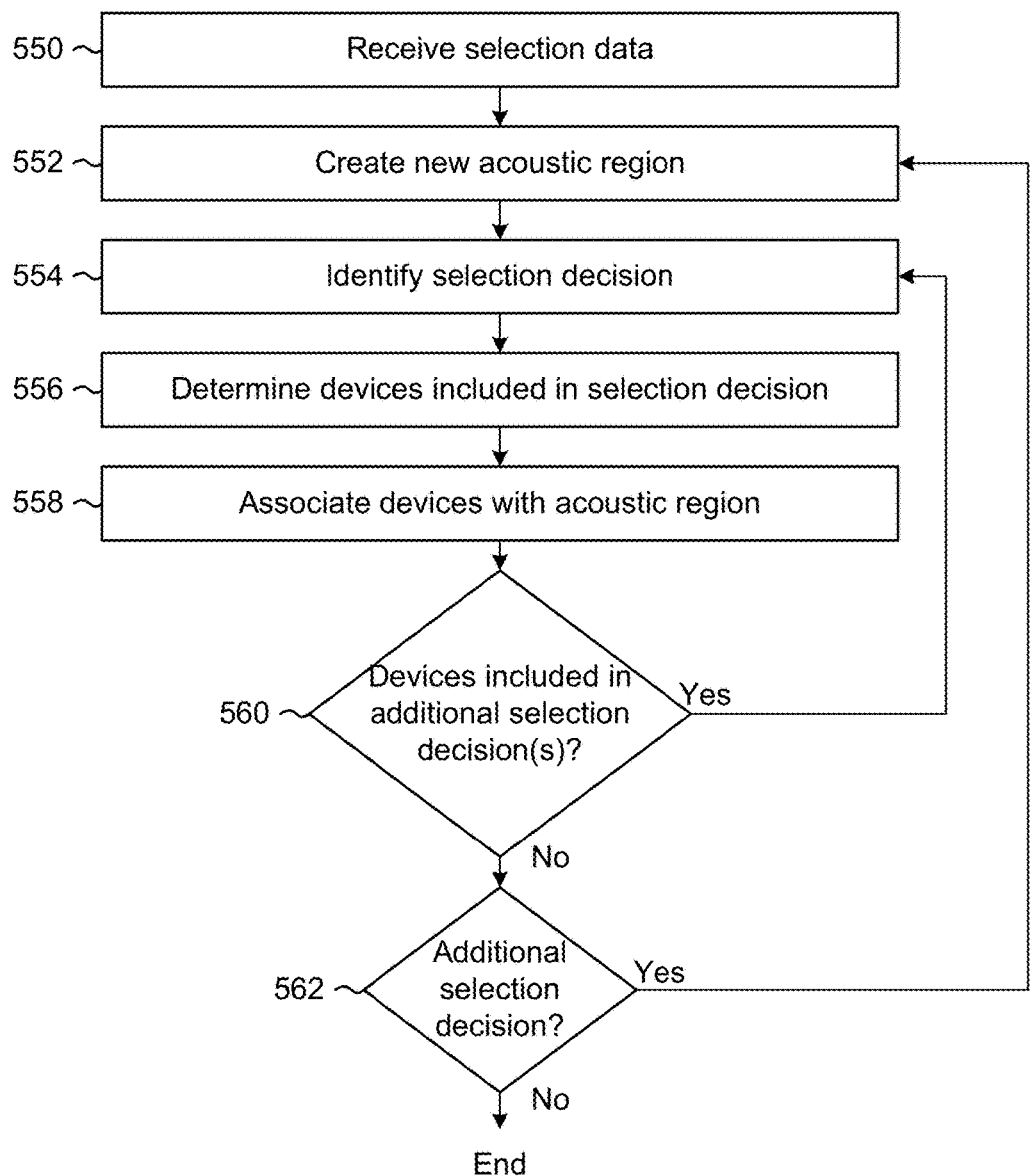

FIG. 5B illustrates an example method for determining one or more acoustic regions based on the selection data according to embodiments of the present disclosure. As illustrated in FIG. 5B, the server(s) 120 may receive (550) selection data and initially may create (552) a new acoustic region. The server(s) 120 may identify (554) a selection decision, may determine (556) devices included in the selection decision and may associate (558) the devices with the acoustic region. The server(s) 120 may then determine (560) whether the devices associated with the acoustic region are included in one or more additional selection decision(s). If the devices are included in an additional selection decision, the server(s) 120 may loop to step 554 and repeat steps 554-560 for the additional selection decision. If the devices are not included in an additional selection decision, the server(s) 120 may determine (562) whether there are additional selection decisions and, if so, may loop to step 552 and repeat steps 552-562 for a new acoustic region. If there are no additional selection decisions, the server(s) 120 may end the process.

In some examples, the server(s) 120 may select all of the devices 110 included in overlapping arbitration decisions as part of an acoustic region. For example, if a first arbitration decision of the selection data includes three devices 110a-110c, the server(s) 120 may group the three devices 110a-110c in a first acoustic region. In addition, if one or more of the three devices 110a-110c are included in a second arbitration decision of the selection data, the server(s) 120 may add additional devices to the first acoustic region. For example, a second arbitration decision may involve four devices 110b-110e, including devices 110b-110c, and the server(s) 120 may add the devices 110d-110e to the first acoustic region.

However, the disclosure is not limited thereto and the server(s) 120 may not select all of the devices 110 included in an arbitration decision as part of a single acoustic region. For example, the selection data may include an indication of signal strength associated with each of the arbitration decisions, enabling the server(s) 120 to distinguish between a strong signal and a weak signal. Thus, the server(s) 120 may identify that the three devices included in the first arbitration decision are associated with a strong signal strength value and include all three devices 110a-110c in the first acoustic region, but may determine that the two additional devices 110d-110e are associated with a weak signal strength value and may not include them in the first acoustic region. Thus, despite the devices 110d-110e being included in the second arbitration decision, the server(s) 120 may not include them in the same acoustic region as devices 110a-110c.

FIG. 5C illustrates an example method for generating a virtual group for the default devices associated with each of the acoustic regions according to embodiments of the present disclosure. As illustrated in FIG. 5C, the server(s) 120 may determine (570) unique acoustic regions, determine (572) a best output device for each unique acoustic region, and may generate (574) a virtual group including the best output devices for each acoustic region.

FIG. 5D illustrates an example method for recalibrating a device according to embodiments of the present disclosure. In some examples, a first device 110a that was previously associated with a first acoustic region may be moved to a second acoustic region. If the server(s) 120 do not identify that the first device 110a was moved, the server(s) 120 may send duplicate notifications to the second acoustic region and/or may fail to send a notification to the first acoustic region. Additionally or alternatively, the first device 110a may output audio or other notifications that are not synchronized with other devices 110 in the second acoustic region. Therefore, the server(s) 120 may be configured to identify that the first device 110a has moved from the first acoustic region and then associate the first device 110a with the second acoustic region.

In some examples, the server(s) 120 may determine that the first device 110a potentially moved due to determining that the first device 110a was unplugged (e.g., disconnected from a power source). For example, the server(s) 120 may receive a notification (e.g., as part of a handshaking procedure) from the first device 110a that the first device 110a was powered off and then powered on again, even when the first device 110a was never disconnected from an electrical outlet. Additionally or alternatively, the server(s) 120 may determine that the first device 110a potentially moved if the first device was renamed (e.g., the user 5 renamed the first device 110a), if selection data changes (e.g., the first device 110a is no longer included in arbitration decisions with other devices within the first acoustic region and/or is suddenly included in arbitration decisions with devices within the second acoustic region), if wireless network configuration data changes (e.g., first wireless networks associated with the first acoustic region are no longer in range and/or second wireless networks associated with the second acoustic region are suddenly in range), and/or the like.

While the server(s) 120 do not explicitly know that the first device 110a was moved to the second acoustic region, the server(s) 120 may temporarily remove the first device 110a from the first acoustic region until additional selection data is received, at which point the server(s) 120 may determine which acoustic region to associate the first device 110a based on the additional selection data. For example, the server(s) 120 may associate the first device 110a with its own unique acoustic region until the additional selection data is received and then may determine that the first device 110a should be associated with the second acoustic region based on the additional selection data.

As illustrated in FIG. 5D, the server(s) 120 may optionally determine (580) that a first device was unplugged, may optionally determine (582) that the first device was renamed, may optionally determine (584) differences in selection data (e.g., different devices included in arbitration decisions), and/or may optionally determine (586) differences in wireless network configuration data (e.g., different wireless networks detected).

The server(s) 120 may remove (588) the first device from the previous acoustic region (e.g., first acoustic region), may associate (590) the first device with a new acoustic region (e.g., unique acoustic region for just the first device 110a), may receive (592) additional selection data, and may associate (594) the first device with an existing acoustic region (e.g., determine that the first device 110a is still included within the first acoustic region or determine that the first device 110a has moved to the second acoustic region).

Figure 6A:
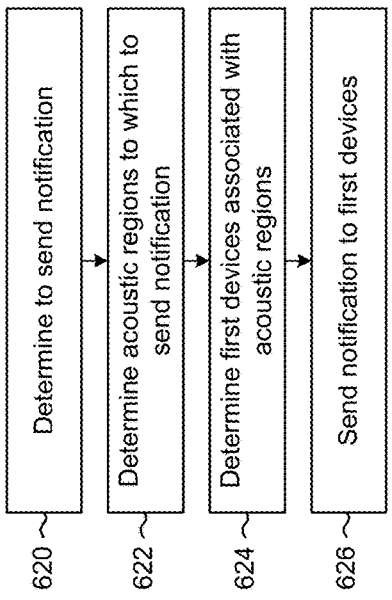
FIGS. 6A-6D are flowcharts conceptually illustrating example methods for sending notifications to acoustic region(s) according to embodiments of the present disclosure.

FIGS. 6A-6D are flowcharts conceptually illustrating example methods for sending notifications to acoustic region(s) according to embodiments of the present disclosure. For example, FIG. 6A illustrates an example method for sending a notification to a single acoustic region via a single device. As illustrated in FIG. 6A, the server(s) 120 may determine (610) to send a notification to a first acoustic region, may determine (612) a first device associated with the first acoustic region, and may send (614) a notification to the first device.

As discussed above, the first device associated with the first acoustic region may be a "best device" or default device selected for the first acoustic region. For example, the server(s) 120 may select the default device to which to send future notifications for the first acoustic region based on the frequency that each device 110 is selected, whether the device 110 is independent of other components, and/or input/output capabilities of the devices 110. In an example described above, the server(s) 120 may select a first device 110a as the default device because the first device 110a is the most selected device (e.g., selected 46% of the time) and has best input/output capabilities of the devices 110a/110b/110c (e.g., high quality microphone array 112, high quality loudspeaker(s) 114, a display 116, and a camera 118). Thus, the server(s) 120 may store an indication that the first device 110a is the default device for the first acoustic region.

However, the disclosure is not limited thereto and the first device may vary over time without departing from the disclosure. For example, the server(s) 120 may determine to send the notification to the first acoustic region and may determine the first device based on the notification data to be sent and/or additional information. Thus, the server(s) 120 may determine the first device (e.g., best device) based on the type of notification to be sent, input/output capabilities of each of the devices 110 included in the first acoustic region, which devices 110 of the first acoustic region are in proximity to a user, which devices 110 are currently available (e.g., powered on and responsive to communication from the server(s) 120 via the network(s) 10), which devices 110 are currently "active" (e.g., performing an action, generating audio, displaying content, and/or the like, indicating that a user is interacting with the device 110) or "idle" (e.g., not performing an action, generating audio, displaying content and/or the like), and/or the like without departing from the disclosure.

Figure 6B:
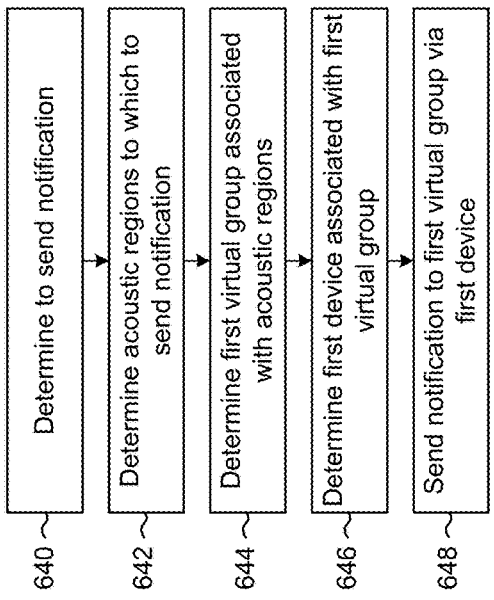

In contrast, FIG. 6B illustrates an example method for sending a notification to multiple acoustic regions via a single device for each of the acoustic regions. As illustrated in FIG. 6B, the server(s) 120 may determine (62) to send a notification, may determine (622) acoustic regions to which to send the notification, may determine (624) first devices associated with the acoustic regions, and may send (626) the notification to the first devices.

As discussed above, the first devices associated with the acoustic regions may be "best devices" or default devices selected for each of the acoustic regions. For example, the server(s) 120 may select the default devices to which to send future notifications for a first acoustic region based on the frequency that each device 110 is selected, whether the device 110 is independent of other components, and/or the input/output capabilities of the devices 110. In the example described above, the server(s) 120 may select a first device 110a as the default device because the first device 110a is the most selected device (e.g., selected 46% of the time) and has best input/output capabilities of the devices 110a/110b/110c (e.g., high quality microphone array 112, high quality loudspeaker(s) 114, a display 116, and a camera 118). Thus, the server(s) 120 may store an indication that the first device 110a is the default device for the first acoustic region.

However, the disclosure is not limited thereto and the first devices may vary over time without departing from the disclosure. For example, the server(s) 120 may determine to send the notification to the first acoustic region and may determine the first device based on the notification data to be sent and/or additional information. Thus, the server(s) 120 may determine the first device (e.g., best device) based on the type of notification to be sent, input/output capabilities of each of the devices 110 included in the first acoustic region, which devices 110 of the first acoustic region are in proximity to a user, which devices 110 are currently available (e.g., powered on and responsive to communication from the server(s) 120 via the network(s) 10), which devices 110 are currently "active" (e.g., performing an action, generating audio, displaying content, and/or the like, indicating that a user is interacting with the device 110) or "idle" (e.g., not performing an action, generating audio, displaying content and/or the like), and/or the like without departing from the disclosure. While the example illustrated above is directed to determining the first device for the first acoustic region, the server(s) 120 may repeat the steps to determine the best device for each of the acoustic regions to which the server(s) 120 will send the notification data.

Figure 6C:
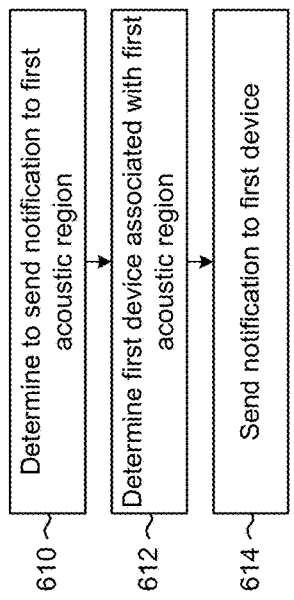

FIG. 6C illustrates an example method for sending a notification to a single acoustic region via a virtual group. As illustrated in FIG. 6C, the server(s) 120 may determine (630) to send a notification to a first acoustic region, may determine (632) a first virtual group associated with the first virtual group, and may send (636) the notification to the first virtual group via the first device.

Figure 6D:
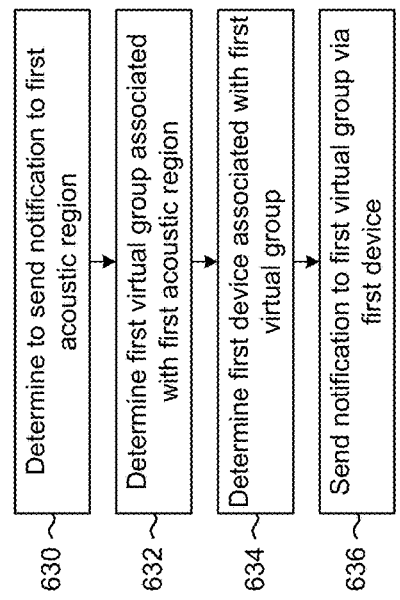

In contrast, FIG. 6D illustrates an example method for sending notifications to multiple acoustic regions via a virtual group. As illustrated in FIG. 6D, the server(s) 120 may determine (640) to send a notification, may determine (642) acoustic regions to which to send the notification, may determine (644) a first virtual group associated with the selected acoustic regions, may determine (646) a first device associated with the first virtual group, and may send (648) the notification to the first virtual group via the first device.

In some examples, the first virtual group may be a fixed group of devices 110 associated with a single acoustic region (e.g., in step 632, the first virtual group corresponds to devices 110 in a first acoustic region) and/or multiple acoustic regions (e.g., in step 642, the first virtual group corresponds to the best devices 110 for multiple acoustic regions). Thus, when the server(s) 120 determine to send the notification, the server(s) 120 may retrieve information about the first virtual group and send the notification to the first virtual group. However, the disclosure is not limited thereto and the server(s) 120 may determine the first virtual group (e.g., which devices are included in the first virtual group and/or which device is the first device of the first virtual group) dynamically based on the type of notification to be sent, input/output capabilities of each of the devices 110, which devices 110 are in proximity to a user, which devices 110 are currently available (e.g., powered on and responsive to communication from the server(s) 120 via the network(s) 10), which devices 110 are currently "active" (e.g., performing an action, generating audio, displaying content, and/or the like, indicating that a user is interacting with the device 110) or "idle" (e.g., not performing an action, generating audio, displaying content and/or the like), and/or the like without departing from the disclosure. For example, each time the server(s) 120 determines to send a notification the server(s) 120 may generate a virtual group based on the devices 110 that are responsive and/or active.

FIGS. 7A-7B illustrate an example of determining that acoustic regions are associated with separate locations according to embodiments of the present disclosure. As illustrated in FIG. 7A, a first group of devices 110 (e.g., first device 110a, second device 110b, third device 110c, fourth device 110d, and fifth device 110e) may be located at a first address 20 and a second group of devices 110 (e.g., sixth device 110f, seventh device 110g, eighth device 110h, ninth device 110i) may be located at a second address 30. In addition, a first internet access point (AP) 710a (e.g., wireless router) may be associated with the first address 20 and a second internet AP 710b may be associated with the second address 30.

As illustrated in FIG. 7B, the server(s) 120 may use the techniques described in greater detail above to associate the devices 110 with acoustic regions based on the selection data and generate virtual groups for each of the acoustic regions. For example, the server(s) 120 may use the selection data to separate the devices 110 into a first acoustic region 710 including the first device 110a and the second device 110b, a second acoustic region 712 including the third device 110c and the fourth device 110d, a third acoustic region 714 including the fifth device 110e, a fourth acoustic region 716 including the sixth device 110f and the seventh device 110g, and a fifth acoustic region 718 including the eighth device 110h and the ninth device 110i.

The server(s) 120 may determine wireless network configuration data associated with each of the acoustic regions and may compare the wireless network configuration data to determine whether the acoustic regions are in the same location. Based on the wireless network configuration data, the server(s) 120 may determine that the first acoustic region 710, the second acoustic region 712, and the third acoustic region 714 are associated with the first internet AP 710a, whereas the fourth acoustic region 716 and the fifth acoustic region 718 are associated with the second internet AP 710b. Therefore, the server(s) 120 may determine that the first acoustic region 710, the second acoustic region 712, and the third acoustic region 714 are associated with a first location 720, whereas the fourth acoustic region 716 and the fifth acoustic region 718 are associated with a second location 730.

Figure 8:
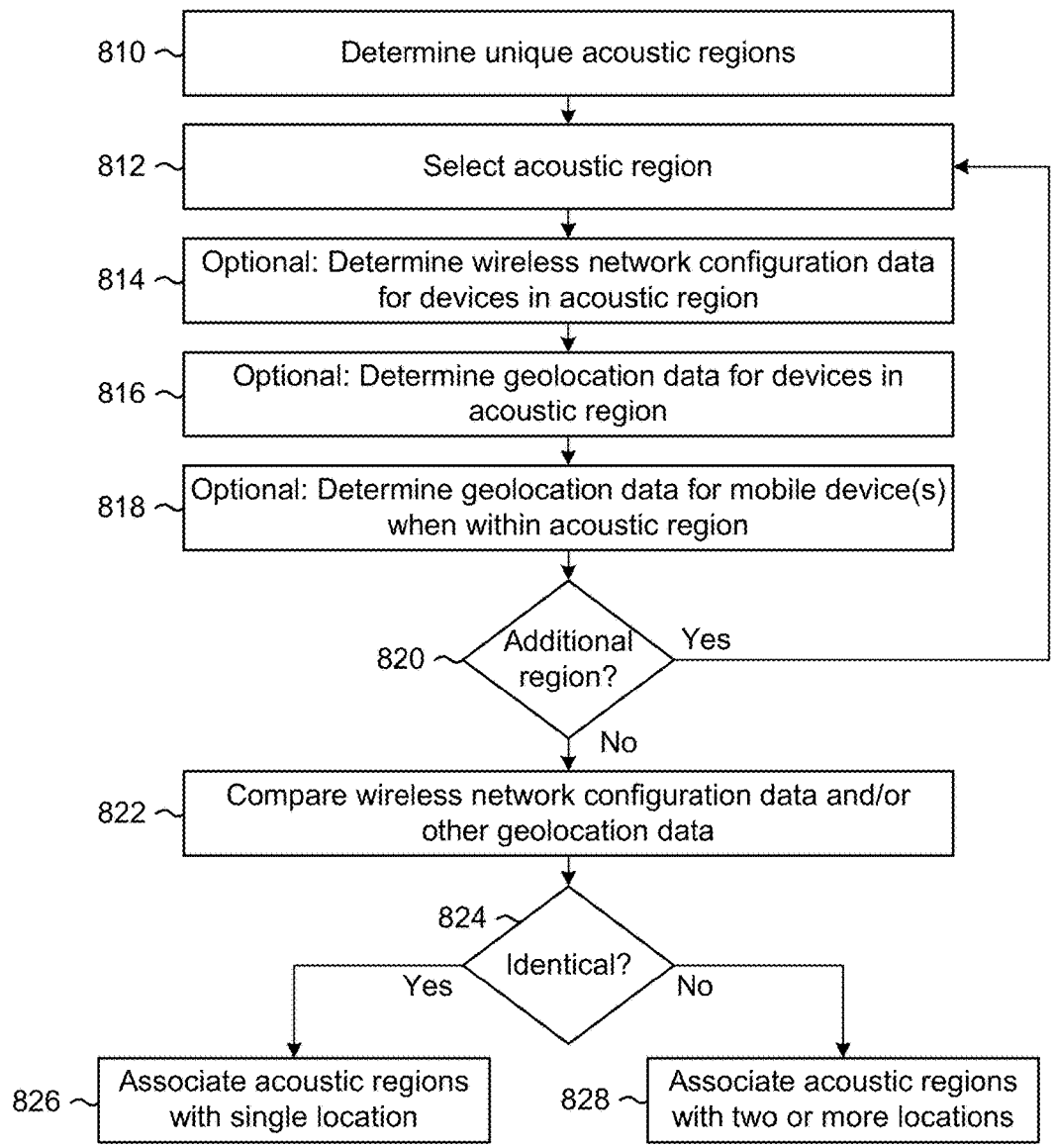
FIG. 8 is a flowchart conceptually illustrating an example method for determining that acoustic regions are associated with different locations according to embodiments of the present disclosure.

FIG. 8 is a flowchart conceptually illustrating an example method for determining that acoustic regions are associated with different locations according to embodiments of the present disclosure. As illustrated in FIG. 8, the server(s) 120 may determine (810) unique acoustic regions and may select (812) an acoustic region.

The server(s) 120 may optionally determine (814) wireless network configuration data for devices associated with the acoustic region, may optionally determine (816) geolocation data for the devices associated with the acoustic region, and may optionally determine (818) geolocation data for a mobile device(s) when the mobile device(s) are within the acoustic region.

In some examples, the server(s) 120 may use the wireless network configuration data for different acoustic regions to determine whether the wireless network configuration data overlaps, indicating that the acoustic regions are in physical proximity at a single location, or doesn't overlap, indicating that the acoustic regions are associated with different locations. While this technique may effectively distinguish between a single location and multiple locations, it doesn't provide any information about the actual geolocation (e.g., address or coordinates). Therefore, the server(s) 120 may additionally or alternatively determine geolocation data for an acoustic region from the devices within the acoustic region. For example, some devices may include sensors configured to determine a location using global positioning system (GPS) coordinates, while other devices may be configured to determine a location using cellular network technologies (e.g., based on base stations, cellular phone towers, or the like). If any device associated with the acoustic region is configured to determine a location, the server(s) 120 may determine the location and associate the acoustic region with this location by receiving geolocation data from the device.

In some examples, none of the devices within an acoustic region may be configured to determine a location. However, mobile devices may be configured to determine a location, so the server(s) 120 may identify when a mobile device is in physical proximity to the acoustic region and determine the location of the acoustic region based on the location of the mobile device. For example, the server(s) 120 may determine that the mobile device is in physical proximity to the acoustic region based on the selection data (e.g., the server(s) 120 makes an arbitration decision between the mobile device and other fixed devices in an acoustic region), based on wireless network configuration data (e.g., when first wireless network configuration data from the mobile device matches second wireless network configuration data of a device within the acoustic region), based on wireless technologies (e.g., a device within the acoustic region detects the mobile device using a wireless sensor), based on commands received from the mobile device (e.g., the user 5 uses the mobile device to control a device within the acoustic region), based on voice commands (e.g., the user 5 inputs a voice command to a device within the acoustic region and the server(s) 120 obtains a location of a mobile device associated with the user 5), based on facial or voice recognition (e.g., device within the acoustic region identifies the user 5 based on facial recognition or voice recognition and the server(s) 120 obtains a location of a mobile device associated with the user 5), and/or the like. The server(s) 120 may receive the wireless network configuration data, the location of the mobile device (e.g., GPS coordinates), and/or other information from an application or process running on the mobile device.

The server(s) 120 may determine (820) whether there are additional acoustic regions, and if so, may loop to step 812 and repeat steps 812-818 for the additional acoustic region. If there are no additional acoustic regions, the server(s) 120 may compare (822) the wireless network configuration data and/or other geolocation data between the acoustic regions. The server(s) 120 may determine (822) whether the wireless network configuration data and/or other geolocation data is identical, in which case the server(s) 120 may associate (826) the acoustic regions with a single location. Otherwise, the server(s) 120 may associate (828) the acoustic regions with two or more locations.

Figure 9A:
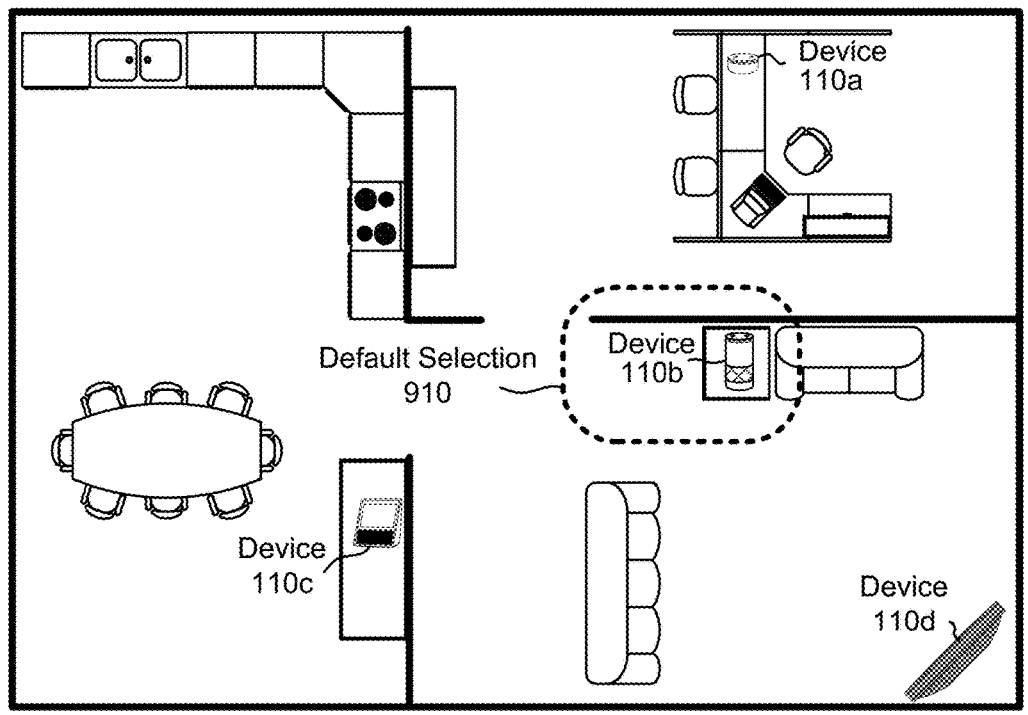
FIGS. 9A-9D illustrate examples of overriding a default selection according to embodiments of the present disclosure.

FIGS. 9A-9D illustrate examples of overriding a default selection according to embodiments of the present disclosure. As illustrated in FIG. 9A, the server(s) 120 may make a default selection 910 based on a most frequently selected device 110 (e.g., second device 110b), which may be centrally located so that it is frequently in proximity to the user 5 when the user 5 is in multiple different locations (e.g., a signal strength value associated with input audio data from the second device 110b is frequently higher than signal strength values associated with other devices 110).

Figure 9B:
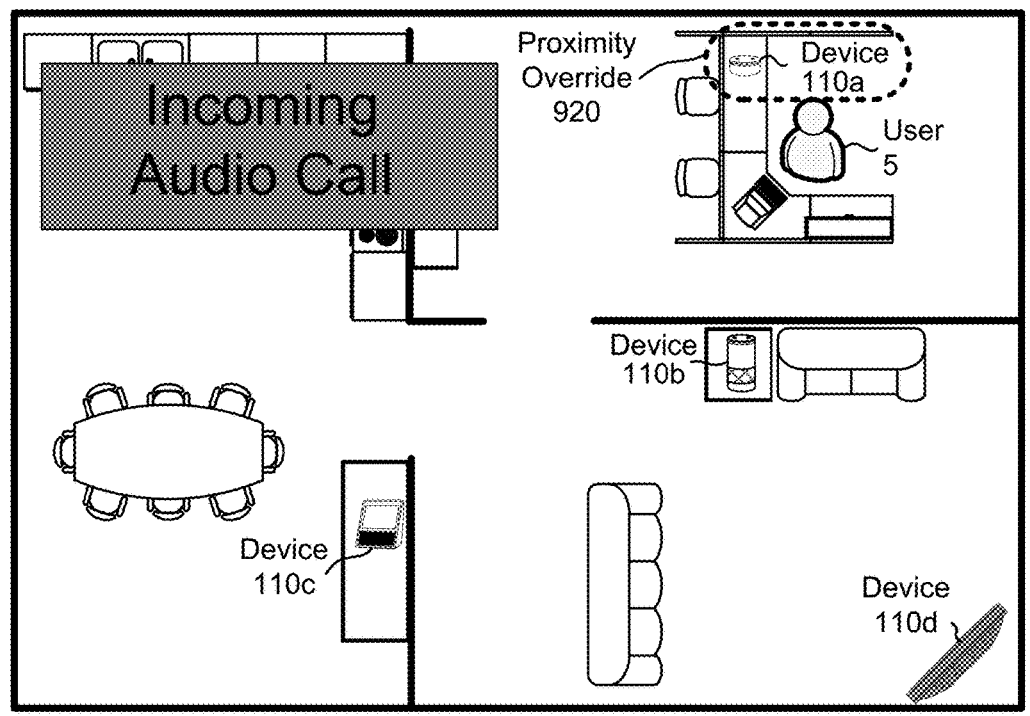

As illustrated in FIG. 9B, the server(s) 120 may override the default selection 910 to select a device 110 in proximity to the user 5. In some examples, the server(s) 120 may determine that the first device 110a is closer to the user 5 than the default device (e.g., second device 110b). For example, if the user 5 generates an utterance and multiple devices 110 generate input audio data corresponding to the utterance, the server(s) 120 may determine signal strength values associated with the input audio data received from each of the multiple devices 110 and may select the device associated with the highest signal strength value (e.g., the server(s) 120 may determine that a first signal strength value associated with first input audio data received from the first device 110a is highest of the signal strength values).

The server(s) 120 may determine that the first device 110a is in proximity to the user 5 based on the signal strength values (e.g., the first signal strength value is higher than a second signal strength value associated with second input audio data from the second device 110b), presence detection (e.g., the first device 110a has a higher confidence level that human presence is detected than the second device 110b), image data (e.g., the user 5 is detected in image data and a position of the user 5 is determined to be closer to the first device 110*a* than the second device 110*b*), a most recent interaction with the user 5 (e.g., the first device 110*a* most recently received an input from the user 5, such as a button press, input on a touchscreen display, or the like), a most recently performed action (e.g., the server(s) 120 sent an instruction/command to the first device 110*a* to perform an action), sensor information (e.g., footstep detector), proximity to a mobile device associated with the user 5, and/or the like. Therefore, the server(s) 120 may perform a proximity override 920 to select the first device 110*a*, sending notification data indicating an incoming audio call or the like to the first device 110*a* instead of the second device 110*b*.

Figure 9C:
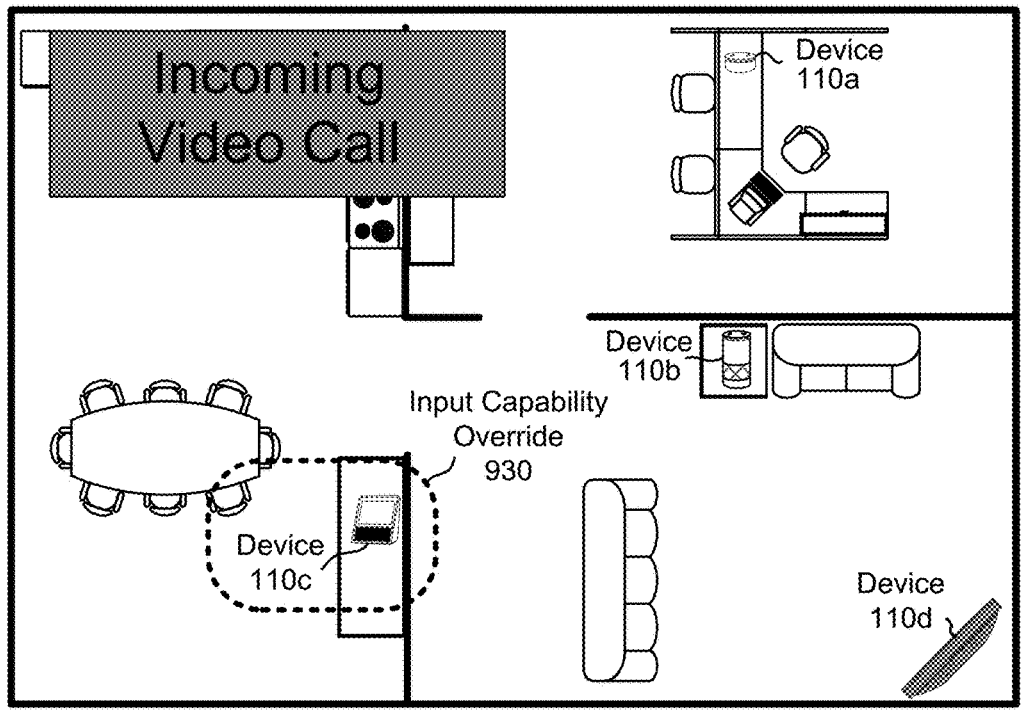

As illustrated in FIG. 9C, the server(s) 120 may override the default selection 910 to select a device 110 based on input capabilities of the device 110. Sometimes, the default device may have an ideal location that is in proximity to the user 5, but may lack the input capabilities of a nearby device (e.g., based on an existence, size and/or quality of the microphone array 112, a camera 118, or the like). For example, the second device 110*b* may be in an ideal location but the server(s) 120 may select the third device 110*c* as the third device 110*c* includes a camera 118 that is lacking from the second device 110*b*. To illustrate an example, the notification data may be associated with image data (e.g., incoming a video call) or the like. Therefore, the server(s) 120 may perform an input capability override 930 to select the third device 110*c* based on the input capabilities of the devices 110, sending the notification data to the third device 110*c* instead of the second device 110*b*.

Figure 9D:
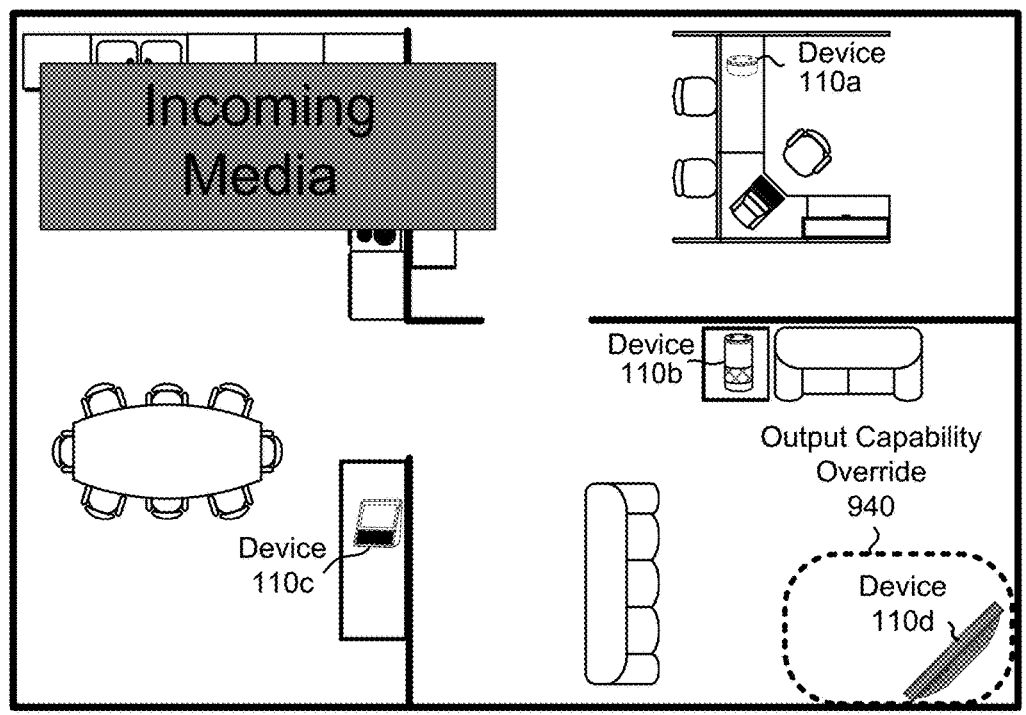

As illustrated in FIG. 9D, the server(s) 120 may override the default selection 910 to select a device 110 based on output capabilities of the device 110. For example, the notification data may include image data that may be displayed on the display 116 (e.g., an image), the notification data may be associated with image data (e.g., a videoconference call), and/or the like. Therefore, the server(s) 120 may perform an output capability override 940 to select the fourth device 110*d* based on the output capabilities of the devices 110, sending the notification data to the fourth device 110*d* instead of the second device 110*b*.

Figure 10A:
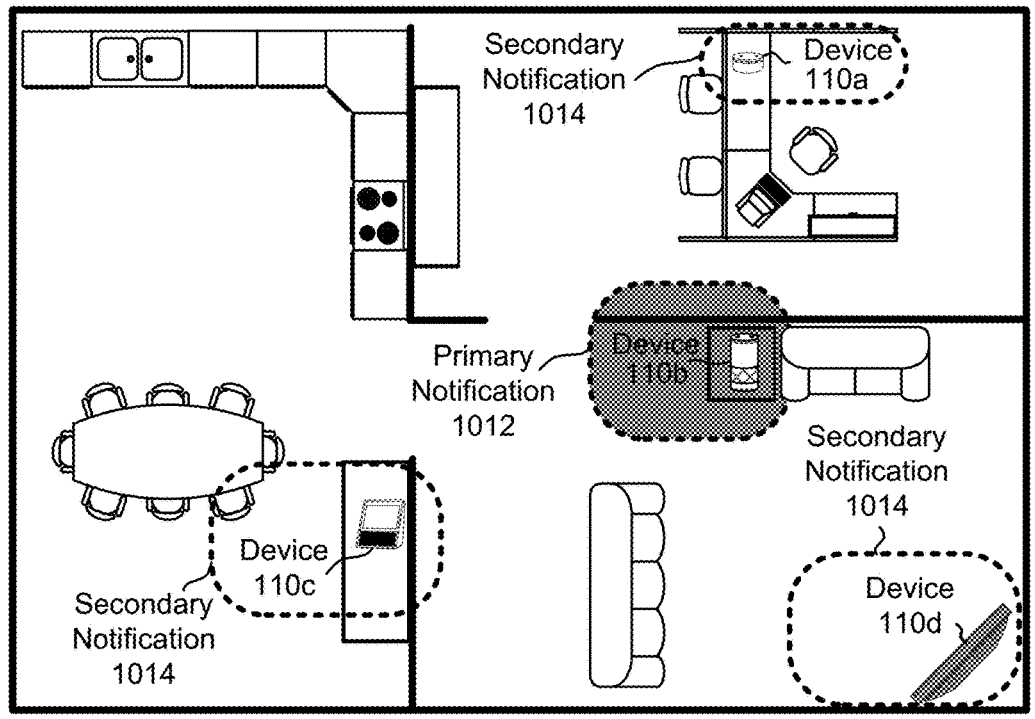
FIGS. 10A-10B illustrate examples of sending secondary notifications in addition to a primary notification according to embodiments of the present disclosure.
Figure 10B:
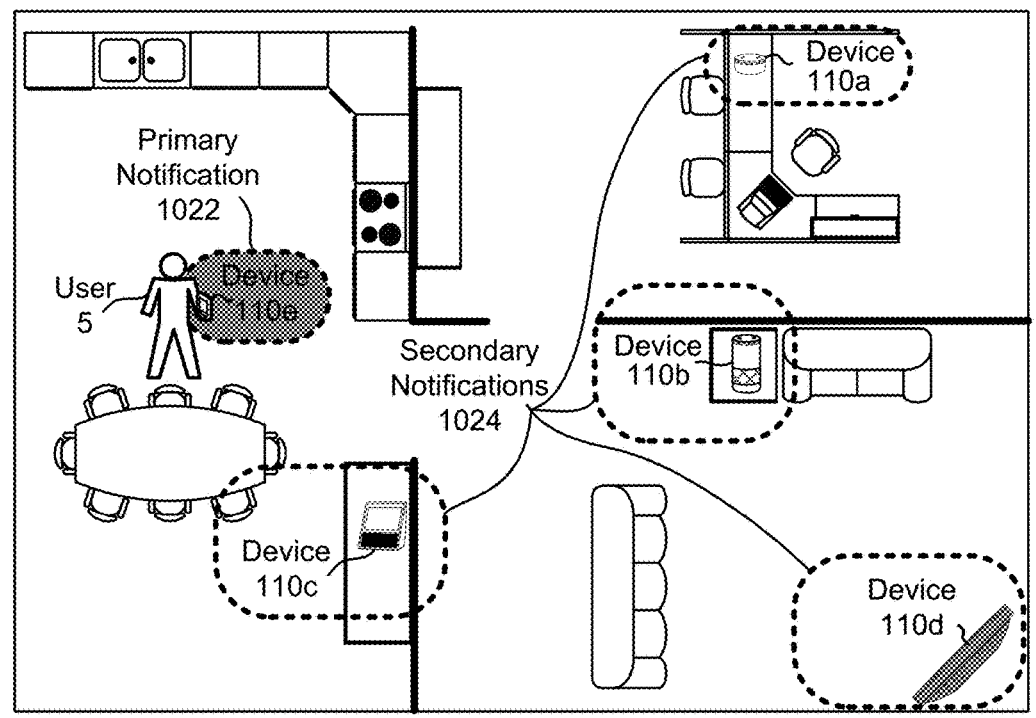

FIGS. 10A-10B illustrate examples of sending secondary notifications in addition to a primary notification according to embodiments of the present disclosure. As illustrated in FIG. 10A, in some examples the server(s) 120 may send at least one primary notification 1012 (e.g., primary notification data) to one or more first devices (e.g., second device 110*b*) and at least one secondary notification 1014 (e.g., secondary notification data) to one or more second devices (e.g., first device 110*a*, third device 110*c*, fourth device 110*d*, etc.). For example, the primary notification 1012 may include audio data and may instruct the second device 110*b* to output synthesized speech corresponding to the audio data in order to read an announcement to the user 5, whereas the secondary notification 1014 may include an instruction/command to perform an action (e.g., display an image, display an indicator light, etc.). Thus, the server(s) 120 may send the primary notification 1012 to the second device 110*b* and the second device 110*b* may generate the synthesized speech. In addition, the server(s) 120 may send the secondary notification 1014 to the first device 110*a*, the third device 110*c*, and/or the fourth device 110*d*, and the first device 110*a* may display an indicator light (e.g., lights up rings) on the outside of the first device 110*a* while the third device 110*c* and the fourth device 110*d* display an image. Therefore, the user 5 may receive a visual notification that the primary notification (e.g., synthesized speech) is being output. Additionally or alternatively, the secondary notification(s) may include audio data to be output at a lower volume than the primary notifications. For example, the primary notification may be output at a first volume level and the secondary notification(s) may be output at a second volume level that is lower than the first volume level.

In the example described above, the devices 110*a*/110*b*/110*c* are fixed devices located within the acoustic region. However, the disclosure is not limited thereto, and the server(s) 120 may send notifications to mobile devices (e.g., smartphones, tablet computers, etc.) without departing from the disclosure. For example, while a mobile device 110*e* (e.g., smartphone) associated with the user 5 is located within the acoustic region, the server(s) 120 may send a primary notification 1022 (e.g., primary notification data) to the mobile device 110*e* and may also send a secondary notification 1024 (e.g., secondary notification data) to the fixed devices associated with the acoustic region (e.g., devices 110*a*-110*d*). Therefore, the user 5 may receive an audio notification and/or a vibrating notification from the mobile device 110*e* while also receiving visual notifications from the fixed devices 110*a*-110*d*.

Additionally or alternatively, the server(s) 120 may combine the examples illustrated in FIGS. 10A-10B and send first notification data (e.g., an instruction/command to vibrate and/or generate an audible sound) to the mobile device 110*e*, second notification data (e.g., an instruction/command to generate an audible sound at a first volume level, which corresponds to a first audio notification, and/or to display content, turn on indicator light(s) or other visual indicators, and/or the like, which corresponds to a first visual notification) to the second device 110*b*, and third notification data (e.g., an instruction/command to generate an audible sound at a second volume level, which corresponds to a second audio notification, and/or to display content, turn on indicator light(s) or other visual indicators, and/or the like, which corresponds to a second visual notification) to the remaining devices 110*a*/110*c*/110*d* without departing from the disclosure.

FIG. 11 is a flowchart conceptually illustrating an example method for overriding a default selection and sending a secondary notification according to embodiments of the present disclosure. As illustrated in FIG. 11, the server(s) 120 may determine (1110) to send a notification to the user 5, may select (1112) acoustic region(s) to which to send the notification, and may determine (1114) first device(s) associated with the selected acoustic region(s). For example, the server(s) 120 may determine to send the notification to only a first location (e.g., user's home) and may omit acoustic regions associated with other locations, and/or the server(s) 120 may determine to send the notification to acoustic regions associated with a first floor of a house (e.g., living room, kitchen, den, dining room, etc.) and not to acoustic regions that are associated with a bedroom.

As part of step 1114, the server(s) 120 may determine which devices 110 associated with the acoustic region(s) are currently responsive (e.g., powered on, connected to the server(s) 120 via the network(s) 10, and/or responsive to communication from the server(s) 120). For example, six different devices 110*a*-110*f* may be associated with a first acoustic region, but at the time the server(s) 120 determines to send the notification to the user in step 1110, the server(s) 120 may determine that only four of the devices (e.g., devices 110*a*-110*d*) are responsive to communication from the server(s) 120. As used herein, the devices that are responsive to the communication from the server(s) 120 (e.g., 110*a*-110*d*) may be considered to be "online" and the devices that are unresponsive to communication from the server(s) 120 (e.g., devices 110e-110f) are considered to be "offline." Thus, the server(s) 120 may select the four online devices as the first devices in step 1114.

Additionally or alternatively, the server(s) 120 may select the first devices based on which devices 110 associated with the acoustic region(s) are current available (e.g., responsive to the server(s) 120 and currently not in use) and/or currently unavailable (e.g., responsive to the server(s) 120 and currently in use) without departing from the disclosure. For example, the server(s) 120 may determine usage information indicating which of the devices 110 are currently "active" (e.g., performing an action, generating audio, displaying content, and/or the like, indicating that a user is interacting with the device 110) or "idle" (e.g., not performing an action, generating audio, displaying content and/or the like) and may select the first devices based on the usage information. In some examples, the server(s) 120 may select the first devices to exclude devices 110 that are currently in use or "active." For example, if a first device 110a is displaying content on a display, the server(s) 120 may send the notification to a second device 110b that is idle. In other examples, the server(s) 120 may select the first devices to prioritize the devices 110 that are currently in use. For example, if the first device 110a is displaying content on the display and the default device is idle, the server(s) 120 may send the notification to the first device 110a to be output to a user viewing the content being displayed.

If a device is unresponsive and/or unavailable, the server(s) 120 may select the next best device as the first device(s). As discussed above, the first devices associated with the acoustic regions may be "best devices" or default devices selected for each of the acoustic regions. For example, the server(s) 120 may select the default devices to which to send future notifications for a first acoustic region based on the frequency that each device 110 is selected, whether the device 110 is independent of other components, and/or the input/output capabilities of the devices 110. In the example described above, the server(s) 120 may select a first device 110a as the default device because the first device 110a is the most selected device (e.g., selected 46% of the time) and has best input/output capabilities of the devices 110a/110b/110c (e.g., high quality microphone array 112, high quality loudspeaker(s) 114, a display 116, and a camera 118). Thus, the server(s) 120 may store an indication that the first device 110a is the default device for the first acoustic region.

However, the disclosure is not limited thereto and the first devices may vary over time without departing from the disclosure. For example, the server(s) 120 may determine to send the notification to the first acoustic region and may determine the first device based on the notification data to be sent and/or additional information. Thus, the server(s) 120 may determine the first devices (e.g., best device) based on the type of notification to be sent, input/output capabilities of each of the devices 110 included in the first acoustic region, which devices 110 of the first acoustic region are in proximity to a user, which devices 110 are currently available (e.g., powered on and responsive to communication from the server(s) 120 via the network(s) 10), which devices 110 are currently "active" (e.g., performing an action, generating audio, displaying content, and/or the like, indicating that a user is interacting with the device 110) or "idle" (e.g., not performing an action, generating audio, displaying content and/or the like), and/or the like without departing from the disclosure. While the example illustrated above is directed to determining the first device for the first acoustic region, the server(s) 120 may repeat the steps to determine the best device for each of the acoustic regions to which the server(s) 120 will send the notification data.

For each acoustic region, the server(s) 120 may determine (1116) whether user presence is detected and, if so, may determine (1118) one or more device(s) in proximity to the user. For example, The server(s) 120 may determine (1120) whether a specific output capability is required for the notification, and if so, may determine (1122) one or more device(s) with the output capability. The server(s) 120 may determine (1124) whether a specific input capability is required and, if so, may determine (1126) one or more device(s) with the specific input capability.

The server(s) 120 may then determine (1128) primary devices to which to output the primary notification. For example, the server(s) 120 may select one or more devices for each acoustic region, such as the default device associated with the acoustic region, a device in proximity to one or more users, and/or a device that has the required input/output capabilities associated with the notification.

The server(s) 120 may determine (1130) whether to send a secondary notification and, if so, may determine (1132) a type of secondary notification (e.g., output audio, display an image, turn on an indicator light, etc.) and determine (1134) secondary device(s) to which to send the secondary notification. The server(s) 120 may then send (1136) the primary notification to the primary devices and may send (1138) the secondary notification to the secondary devices.

Figure 12:
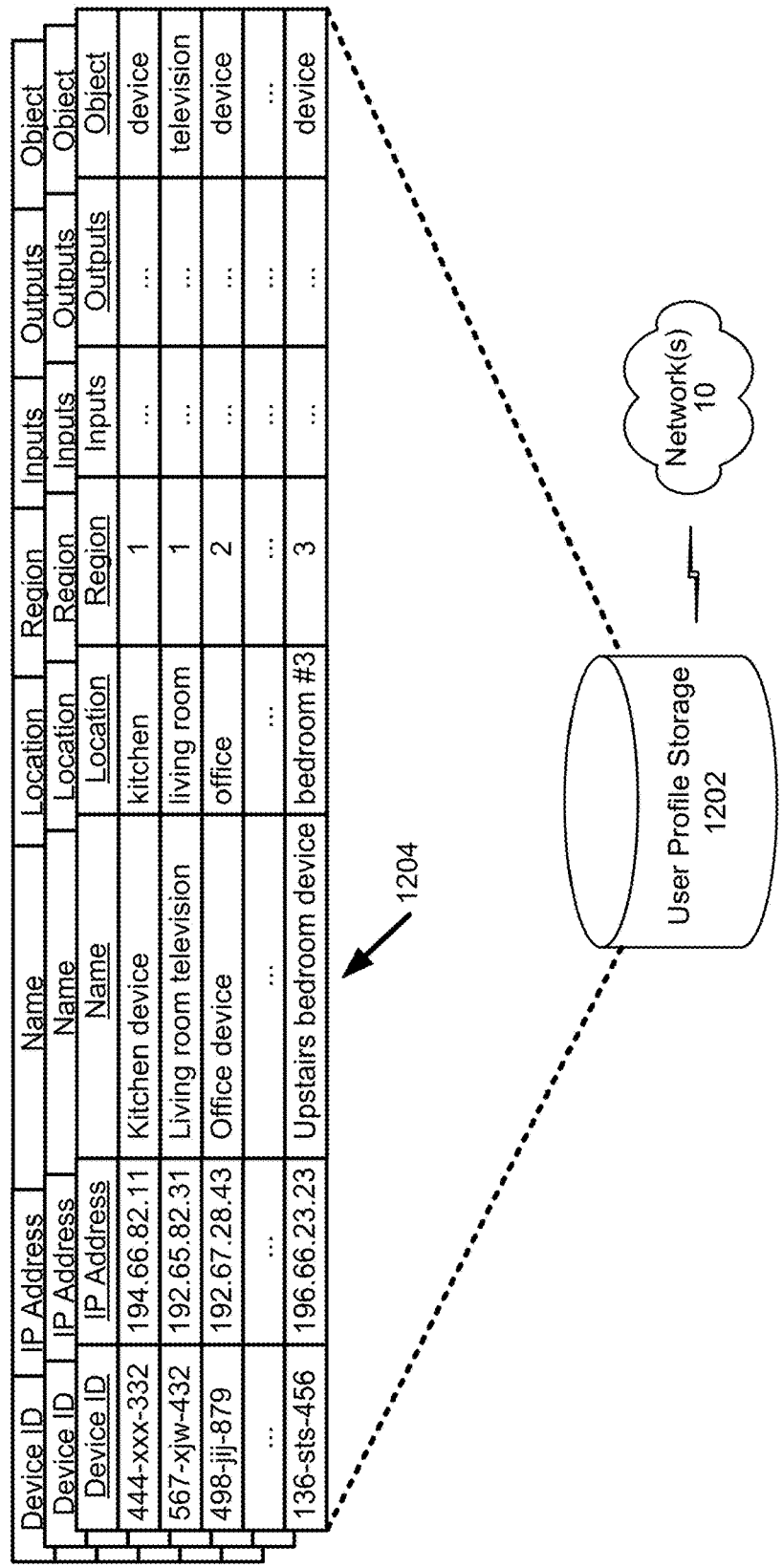
FIG. 12 illustrates data stored and associated with user profiles according to embodiments of the present disclosure.

The server(s) 112 may include or refer to data regarding user accounts, shown by the user profile storage 1202 illustrated in FIG. 12. The user profile storage 1202 may be located proximate to server(s) 112, although the disclosure is not limited thereto, and/or may otherwise be in communication with various components, for example over the network(s) 10. The user profile storage 1202 may include a variety of information related to individual users, user profiles, households, accounts, etc. that interact with the system 100. For illustration, as shown in FIG. 12, the user profile storage 1202 may include data regarding the devices associated with particular individual user accounts 1204 (e.g., user profiles). In an example, the user profile storage 1202 is a cloud-based storage. Such data may include device identifier (ID) and internet protocol (IP) address information for different devices as well as names by which the devices may be referred to by a user. Further qualifiers describing the devices, a location of the device, acoustic region(s) associated with the device, input capabilities of the device, output capabilities of the device, previous selection data, and/or the like may also be listed along with a description of the type of object of the device.

Further, the user account 1204 may include or be associated with different user preferences, such as preferred types of notifications, preferred devices from which to output the notifications, preferred acoustic region(s) and/or locations to which to output the notifications, and/or the like. A device 110 may refer to the user account 1204 and corresponding data (e.g., user preferences) in order to configure settings for an individual user profile of the device 110.

Figure 13:
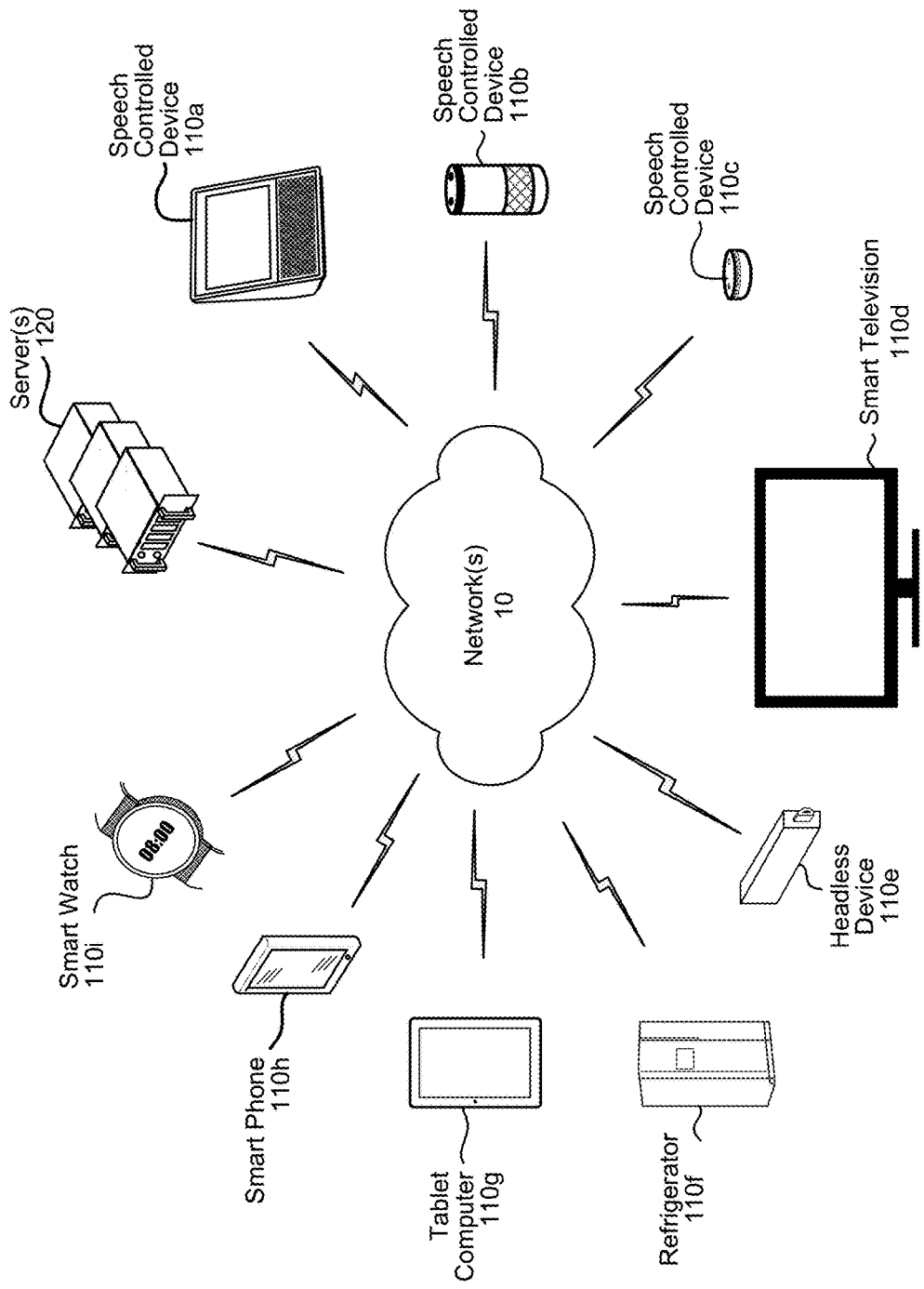
FIG. 13 illustrates an example of a computer network for use with the system.

As illustrated in FIG. 13 devices 110 may contain components of the system 100 and may be connected over network(s) 10. The network(s) 10 may be a local or private network or may be part of a wider network. For example, the network(s) 10 may include a wired local area network (LAN), a wireless local area network (WLAN) (such as WiFi), Bluetooth, and/or wireless network, such as a Long Term Evolution (LTE) network, WiMAX network, 3G network, etc.

Devices 110 may be connected to the network(s) 10 through either wired or wireless connections. For example, a first speech controlled device 110a, a second speech controlled device 110b, a third speech controlled device 110c, a smart television 110d, a headless device 110e connected to a television (not shown), a refrigerator 110f, a tablet computer 110g, a smart phone 110h, and/or a smart watch 110i may be connected to the network(s) 10 through a wired and/or wireless connection. Thus, while the examples illustrated above are sometimes directed to the speech-controlled devices 110a-110c, the disclosure is not limited thereto and the device 110 may be any device configured to send data to the server(s) 120 via the network(s) 10.

Figure 14A:
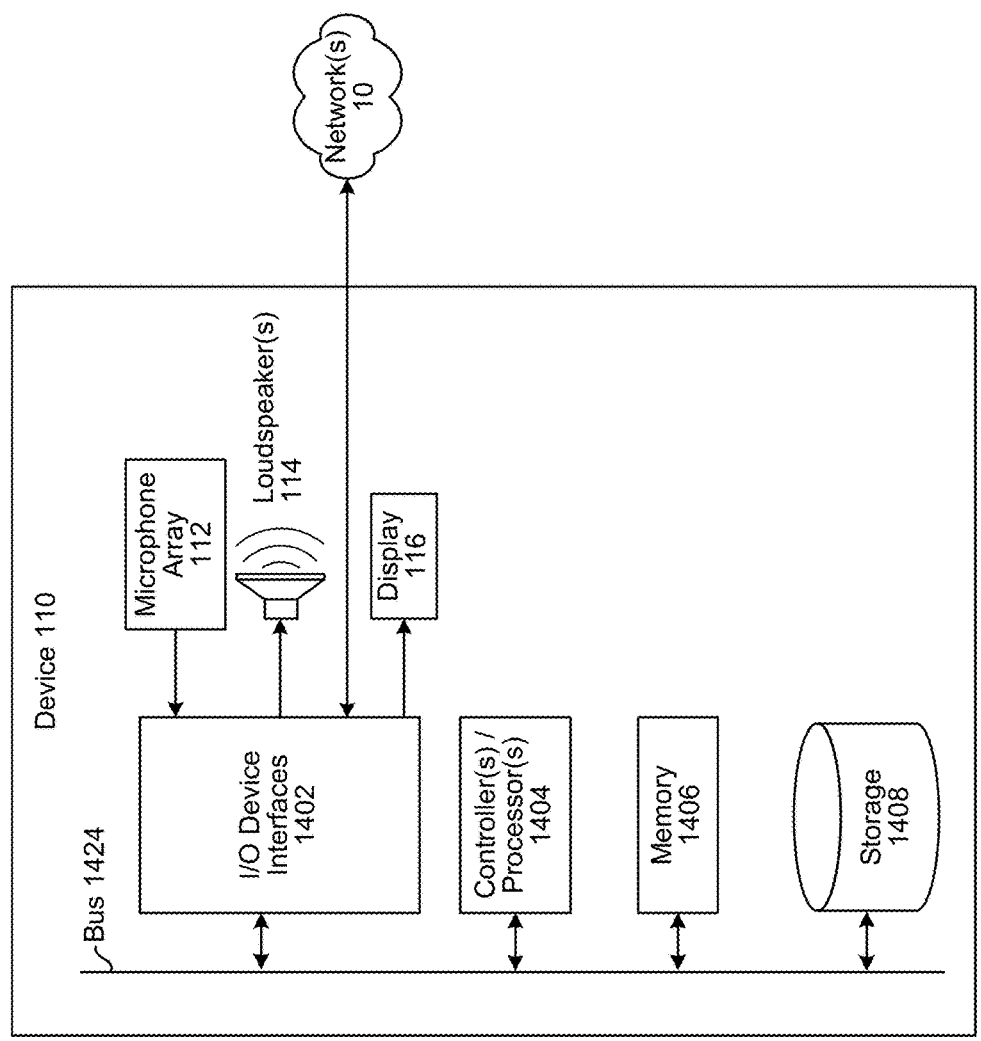

FIGS. 14A-14B are block diagrams conceptually illustrating example components of the system 100. In operation, the system 100 may include computer-readable and computer-executable instructions that reside on the device 110 and/or the server(s) 120, as will be discussed further below.

The device 110 may include one or more audio capture device(s), such as a microphone 112 or an array of microphones 112. The audio capture device(s) may be integrated into the device 110 or may be separate. The device 110 may also include an audio output device for producing sound, such as loudspeaker(s) 114. The audio output device may be integrated into the device 110 or may be separate. In some examples the device 110 may include a display 116, but the disclosure is not limited thereto and the device 110 may not include a display or may be connected to an external device/display without departing from the disclosure.

The device 110 and/or the server(s) 120 may include an address/data bus 1424 for conveying data among components of the device 110 and/or the server(s) 120. Each component within the device 110 and/or the server(s) 120 may also be directly connected to other components in addition to (or instead of) being connected to other components across the bus 1424.

The device 110 and/or the server(s) 120 may include one or more controllers/processors 1404, which may each include a central processing unit (CPU) for processing data and computer-readable instructions, and a memory 1406 for storing data and instructions. The memory 1406 may include volatile random access memory (RAM), non-volatile read only memory (ROM), non-volatile magnetoresistive (MRAM) and/or other types of memory. The device 110 and/or the server(s) 120 may also include a data storage component 1408, for storing data and controller/processor-executable instructions. The data storage component 1408 may include one or more non-volatile storage types such as magnetic storage, optical storage, solid-state storage, etc. The device 110 and/or the server(s) 120 may also be connected to removable or external non-volatile memory and/or storage (such as a removable memory card, memory key drive, networked storage, etc.) through the input/output device interfaces 1402.

Computer instructions for operating the device 110 and/or the server(s) 120 and its various components may be executed by the controller(s)/processor(s) 1404, using the memory 1406 as temporary "working" storage at runtime. The computer instructions may be stored in a non-transitory manner in non-volatile memory 1406, storage 1408, or an external device. Alternatively, some or all of the executable instructions may be embedded in hardware or firmware in addition to or instead of software.

The device 110 and/or the server(s) 120 includes input/output device interfaces 1402. A variety of components may be connected through the input/output device interfaces 1402, such as the microphone array 112, the loudspeaker(s) 114, and/or the display. The input/output interfaces 1402 may include A/D converters for converting the output of the microphone array 112 into microphone audio data, if the microphone array 112 is integrated with or hardwired directly to the device 110. If the microphone array 112 is independent, the A/D converters will be included with the microphone array 112, and may be clocked independent of the clocking of the device 110. Likewise, the input/output interfaces 1402 may include D/A converters for converting playback audio data into an analog current to drive the loudspeakers 114, if the loudspeakers 114 are integrated with or hardwired to the device 110. However, if the loudspeakers 114 are independent, the D/A converters will be included with the loudspeakers 114 and may be clocked independent of the clocking of the device 110 (e.g., conventional Bluetooth loudspeakers).

The input/output device interfaces 1402 may also include an interface for an external peripheral device connection such as universal serial bus (USB), FireWire, Thunderbolt or other connection protocol. The input/output device interfaces 1402 may also include a connection to one or more networks 10 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   receiving first audio data from a first device in response to a wakeword being detected by the first device, the first device associated with a user profile;
   receiving second audio data from a second device in response to the wakeword being detected by the second device, the second device associated with the user profile;
   determining that a first signal strength value of the first audio data is greater than a second signal strength value of the second audio data;
   sending a command to the second device to stop sending the second audio data;
   storing selection data, the selection data including a first arbitration decision indicating the first device, the first signal strength value, the second device, the second signal strength value, and that the first device was selected instead of the second device;
   determining that the selection data includes a second arbitration decision between third audio data from a third device and fourth audio data from a fourth device;
   determining, based on at least the first arbitration decision, that the first device and the second device are within audible range of a first location within a first acoustic region;
   determining, based on at least the second arbitration decision, that the third device and the fourth device are within audible range of a second location within a second acoustic region;
   storing a first indication in the user profile that a future notification intended for the user profile is to be sent to the first device without sending to the second device;
   storing a second indication in the user profile that a future notification intended for the user profile is to be sent to the third device without sending to the fourth device;
   determining that first notification data is intended for the user profile; and
   sending the first notification data to the first device and the third device.

2. The computer-implemented method of claim 1, further comprising:
   determining, based on at least the first arbitration decision, that a first acoustic noise was detected by both the first device and the second device;
   associating the first device and the second device with a first group of devices;
   determining, based on at least the second arbitration decision, that a second acoustic noise was detected by both the third device and the fourth device;
   associating the third device and the fourth device with a second group of devices;
   determining that the first group of devices is distinct from the second group of devices by determining at least one of:
      that the selection data does not include an arbitration decision between any of the first group of devices and any of the second group of devices, or
      that the selection data includes a third arbitration decision between the first device and the third device, and
      the third arbitration decision indicates that a difference between a third signal strength value of third audio data received from the first device and fourth signal strength value of fourth audio data received from the third device is greater than a threshold value;
   associating the first group of devices with the first acoustic region; and
   associating the second group of devices with the second acoustic region.

3. The computer-implemented method of claim 1, further comprising:
   determining a first device identifier associated with the first device;
   determining a second device identifier associated with the second device;
   determining a first network address associated with the first device;
   determining a second network address associated with the second device;
   generating a virtual group associated with the first acoustic region, the virtual group including at least the first device and the second device, wherein the virtual group is generated using the first device identifier, the first network address, the second device identifier and the second network address;
   determining to send a future notification to the virtual group via the first device, wherein the first device is configured to receive the future notification, determine that the future notification is addressed to the virtual group, and send the future notification to at least the second device;
   determining to send second notification data to the first acoustic region; and
   sending the second notification data to the virtual group via the first device, wherein the first device is configured to relay the second notification data to at least the second device.

4. The computer-implemented method of claim 1, further comprising:
   determining a first device identifier associated with the first device;
   determining a second device identifier associated with the third device;
   determining a first network address associated with the first device;
   determining a second network address associated with the third device;
   generating a virtual group including at least the first device and the third device, wherein the first virtual group is generated using the first device identifier, the first network address, the second device identifier and the second network address;
   determining to send a future notification to the virtual group via the first device, wherein the first device is configured to receive the future notification, determine that the future notification is addressed to the first virtual group, and send the future notification to at least the third device;
   associating the virtual group with the first acoustic region and the second acoustic region;
   determining to send second notification data to at least the first acoustic region and the second acoustic region; and
   sending the second notification data to the virtual group via the first device, wherein the first device is configured to relay the second notification data to at least the third device.

5. A computer-implemented method comprising:
   receiving selection data, the selection data indicating a first arbitration decision between at least a first device and a second device and a second arbitration decision between at least a third device and a fourth device, wherein the first arbitration decision corresponds to the first device being selected instead of the second device after the first device detected a first utterance and the second device detected the first utterance and the second arbitration decision corresponds to the third device being selected instead of the fourth device after the third device detected a second utterance and the fourth device detected the second utterance;

based on the selection data, storing first association data associating the first device and the second device with a first acoustic region, the first association data including a first indication that data intended for the first acoustic region is to be sent to the first device without sending to the second device;

based on the selection data, storing second association data associating the third device and the fourth device with a second acoustic region, the second association data including a second indication that data intended for the second acoustic region is to be sent to the third device without sending to the fourth device;

after storing the first and second association data, receiving first notification data;

determining, based on the first indication, that the first notification data is to be sent to the first device within the first acoustic region without sending to the second device;

sending the first notification data to the first device;

determining, based on the second indication, that the first notification data is to be sent to the third device within the second acoustic region without sending to the fourth device; and sending the first notification data to the third device.

6. The computer-implemented method of claim 5, further comprising:

determining that the selection data indicates a third arbitration decision between at least the second device and a fifth device, the third arbitration decision indicating the second device, the fifth device, a first signal metric value of first audio data associated with the second device, a second signal metric value of second audio data associated with the fifth device, and that the second device was selected instead of the fifth device; and determining, based on the first arbitration decision and the third arbitration decision, to associate at least the first device, the second device, and the fifth device with the first acoustic region.

7. The computer-implemented method of claim 5, further comprising:

determining to disassociate the second device from the first acoustic region, wherein the determining comprises at least one of:

receiving an indication from the second device indicating that the second device was disconnected from a power source, determining that a name associated with the second device in the user profile was changed, or determining that wireless connectivity data associated with the second device changed;

determining additional selection data; and determining, based on the additional selection data, to associate the second device with a third acoustic region.

8. The computer-implemented method of claim 5, further comprising:

determining to send the first notification data to the first device, wherein the determining further comprises at least one of:

determining, based on the selection data, a first number of arbitration decisions in which the first device was selected instead of the second device, determining, based on the selection data, a second number of arbitration decisions in which the second device was selected instead of the first device, and determining that the first number is greater than the second number; or determining an output capability requirement associated with the first notification data, determining that first output capabilities associated with the second device do not satisfy the output capability requirement, and determining that second output capabilities associated with the first device satisfy the output capability requirement.

9. The computer-implemented method of claim 5, further comprising:

determining that second notification data is intended for at least one device associated with the first acoustic region;

determining that a user is closer to the second device than the first device; and sending the second notification data to the second device.

10. The computer-implemented method of claim 5, further comprising:

generating, based on the first notification data, second notification data, wherein the first notification data includes a first command to output a first audio indication at a first volume level and the second notification data includes a second command to at least output a second audio indication at a second volume level or output a visual indication; and sending the second notification data to at least the second device and the fourth device.

11. The computer-implemented method of claim 5, further comprising:

determining, based on at least the first arbitration decision, that a first acoustic noise was detected by both the first device and the second device;

associating the first device and the second device with a first group of devices;

determining, based on at least the second arbitration decision, that a second acoustic noise was detected by both the third device and the fourth device;

associating the third device and the fourth device with a second group of devices;

determining that the first group of devices is separate from the second group of devices by determining at least one of:

that the selection data does not include an arbitration decision between any of the first group of devices and any of the second group of devices, or that the selection data includes a third arbitration decision between the first device and the third device, and the third arbitration decision indicates that a difference between a third signal strength value of third audio data received from the first device and fourth signal strength value of fourth audio data received from the third device is greater than a threshold value;

associating the first group of devices with the first acoustic region; and associating the second group of devices with the second acoustic region.

12. The computer-implemented method of claim 5, further comprising:
    determining a first device identifier associated with the first device;
    determining a second device identifier associated with the second device;
    determining a first network address associated with the first device;
    determining a second network address associated with the second device;
    generating a first virtual group associated with the first acoustic region, the first virtual group including at least the first device and the second device, wherein the first virtual group is generated using the first device identifier, the first network address, the second device identifier and the second network address; and
    determining to send a future notification to the virtual group via the first device, wherein the first device is configured to relay the future notification to the second device.

13. The computer-implemented method of claim 5, further comprising:
    determining a first device identifier associated with the first device;
    determining a second device identifier associated with the third device;
    determining a first network address associated with the first device;
    determining a second network address associated with the third device;
    generating a virtual group including at least the first device and the third device wherein the first virtual group is generated using the first device identifier, the first network address, the second device identifier and the second network address;
    determining to send a future notification to the virtual group via the first device, wherein the first device is configured to relay the future notification to the third device;
    associating the virtual group with the first acoustic region and the second acoustic region;
    determining to send second notification data to at least the first acoustic region and the second acoustic region; and
    sending the second notification data to the virtual group via the first device, wherein the first device is configured to relay the second notification data to at least the third device.

14. The computer-implemented method of claim 5, wherein the first notification data comprises an incoming communication request associated with a user profile, the user profile associated with the first acoustic region and the second acoustic region.

15. A system, comprising:
    at least one processor;
    memory including instructions operable to be executed by the at least one processor to cause the system to:
      receive selection data, the selection data indicating a first arbitration decision between at least a first device and a second device and a second arbitration decision between at least a third device and a fourth device, wherein the first arbitration decision corresponds to the first device being selected instead of the second device after the first device detected a first utterance and the second device detected the first utterance and the second arbitration decision corresponds to the third device being selected instead of the fourth device after the third device detected a second utterance and the fourth device detected the second utterance;
      based on the selection data, store first association data associating the first device and the second device with a first acoustic region, the first association data including a first indication that data intended for the first acoustic region is to be sent to the first device without sending to the second device;
      based on the selection data, store second association data associating the third device and the fourth device with a second acoustic region, the second association data including a second indication that data intended for the second acoustic region is to be sent to the third device without sending to the fourth device;
      after storing the first and second association data, receive first notification data;
      determine, based on the first indication, that the first notification data is to be sent to the first device within the first acoustic region without sending to the second device;
      send the first notification data to the first device;
      determine, based on the second indication, that the first notification data is to be sent to the third device within the second acoustic region without sending to the fourth device; and
      send the first notification data to the third device.

16. The system of claim 15, wherein the memory further comprises instructions that, when executed by the at least one processor, further cause the system to:
    determine to send the first notification data to the first device, wherein the determining further comprises at least one of:
      determining, based on the selection data, a first number of arbitration decisions in which the first device was selected instead of the second device,
      determining, based on the selection data, a second number of arbitration decisions in which the second device was selected instead of the first device, and
      determining that the first number is greater than the second number; or
      determining an output capability requirement associated with the first notification data,
      determining that first output capabilities associated with the second device do not satisfy the output capability requirement, and
    determining that second output capabilities associated with the first device satisfy the output capability requirement.

17. The system of claim 15, wherein the memory further comprises instructions that, when executed by the at least one processor, further cause the system to:
    determine that second notification data is intended for at least one device associated with the first acoustic region;
    determine that a user is closer to the second device than the first device; and
    send the second notification data to the second device.

18. The system of claim 15, wherein the memory further comprises instructions that, when executed by the at least one processor, further cause the system to:
    generate, based on the first notification data, second notification data, wherein the first notification data includes a first command to output a first audio indication at a first volume level and the second notification data includes a second command to at least one of output a second audio indication at a second volume level or output a visual indication; and send the second notification data to at least the second device and the fourth device.

19. The system of claim 15, wherein the memory further comprises instructions that, when executed by the at least one processor, further cause the system to:

determine, based on at least the first arbitration decision, that a first acoustic noise was detected by both the first device and the second device;

associating the first device and the second device with a first group of devices;

determine, based on at least the second arbitration decision, that a second acoustic noise was detected by both the third device and the fourth device;

associate the third device and the fourth device with a second group of devices;

determine that the first group of devices is separate from the second group of devices by determining at least one of:

that the selection data does not include an arbitration decision between any of the first group of devices and any of the second group of devices, or that the selection data includes a third arbitration decision between the first device and the third device, and the third arbitration decision indicates that a difference between a third signal strength value of third audio data received from the first device and fourth signal strength value of fourth audio data received from the third device is greater than a threshold value;

associate the first group of devices with the first acoustic region; and associate the second group of devices with the second acoustic region.

20. The system of claim 15, wherein the memory further comprises instructions that, when executed by the at least one processor, further cause the system to:

determine a first device identifier associated with the first device;

determine a second device identifier associated with the second device;

determine a first network address associated with the first device;

determine a second network address associated with the second device;

generate a first virtual group associated with the first acoustic region, the first virtual group including at least the first device and the second device, wherein the first virtual group is generated using the first device identifier, the first network address, the second device identifier and the second network address; and determine to send a future notification to the virtual group via the first device, wherein the first device is configured to relay the future notification to the second device.

21. The system of claim 15, wherein the memory further comprises instructions that, when executed by the at least one processor, further cause the system to:

determine a first device identifier associated with the first device;

determine a second device identifier associated with the third device;

determine a first network address associated with the first device;

determine a second network address associated with the third device;

generate a virtual group including at least the first device and the third device wherein the first virtual group is generated using the first device identifier, the first network address, the second device identifier and the second network address;

determine to send a future notification to the virtual group via the first device, wherein the first device is configured to relay the future notification to the third device;

associate the virtual group with the first acoustic region and the second acoustic region;

determine to send second notification data to at least the first acoustic region and the second acoustic region; and send the second notification data to the virtual group via the first device, wherein the first device is configured to relay the second notification data to at least the third device.

22. The system of claim 15, wherein the first notification data comprises an incoming communication request associated with a user profile, the user profile associated with the first acoustic region and the second acoustic region.

* * * * *